US009070216B2

(12) United States Patent
Golparvar-Fard et al.

(10) Patent No.: US 9,070,216 B2
(45) Date of Patent: Jun. 30, 2015

(54) FOUR-DIMENSIONAL AUGMENTED REALITY MODELS FOR INTERACTIVE VISUALIZATION AND AUTOMATED CONSTRUCTION PROGRESS MONITORING

(71) Applicant: The Board of Trustees of the University of Illinois, Urbana, IL (US)

(72) Inventors: Mani Golparvar-Fard, Champaign, IL (US); Feniosky A. Peña-Mora, New York City, NY (US); Silvio Savarese, Ann Arbor, MI (US)

( * ) Notice: Subject to any disclaimer, the term of this patent is extended or adjusted under 35 U.S.C. 154(b) by 146 days.

(21) Appl. No.: 13/712,362

(22) Filed: Dec. 12, 2012

(65) Prior Publication Data

US 2013/0155058 A1    Jun. 20, 2013

Related U.S. Application Data

(60) Provisional application No. 61/570,491, filed on Dec. 14, 2011.

(51) Int. Cl.
| | |
|---|---|
| *G06T 19/20* | (2011.01) |
| *G06T 19/00* | (2011.01) |
| *G06T 17/00* | (2006.01) |
| *G06Q 10/06* | (2012.01) |
| *G06Q 10/10* | (2012.01) |
| *G06T 7/00* | (2006.01) |

(52) U.S. Cl.
CPC ........... *G06T 19/006* (2013.01); *G06T 17/00* (2013.01); *G06T 2210/04* (2013.01); *G06Q 10/06311* (2013.01); *G06Q 10/103* (2013.01); *G06T 7/001* (2013.01); *G06T 2207/10028* (2013.01); *G06T 2207/20076* (2013.01); *G06T 2207/30132* (2013.01)

(58) Field of Classification Search
None
See application file for complete search history.

(56) References Cited

U.S. PATENT DOCUMENTS

| | | | | |
|---|---|---|---|---|
| 6,363,170 B1 * | 3/2002 | Seitz et al. | ..................... | 382/154 |
| 2013/0060540 A1 * | 3/2013 | Frahm et al. | ..................... | 703/2 |

OTHER PUBLICATIONS

Bhotika, Rahul, et al. "A probabilistic theory of occupancy and emptiness." Computer Vision—ECCV 2002. Springer Berlin Heidelberg, 2002. 112-130.*

(Continued)

*Primary Examiner* — Jason M Repko
*Assistant Examiner* — Diane Wills
(74) *Attorney, Agent, or Firm* — Lowenstein Sandler LLP

(57) ABSTRACT

A method for monitoring construction progress may include storing in memory multiple unordered images obtained from photographs taken at a site; melding the multiple images to reconstruct a dense three-dimensional (3D) as-built point cloud model including merged pixels from the multiple images in 3D space of the site; rectifying and transforming the 3D as-built model to a site coordinate system existing within a 3D as-planned building information model ("as-planned model"); and overlaying the 3D as-built model with the 3D as-planned model for joint visualization thereof to display progress towards completion of a structure shown in the 3D as-planned model. The processor may further link a project schedule to the 3D as-planned model to generate a 4D chronological as-planned model that, when visualized with the 3D as-built point cloud, provides clash detection and schedule quality control during construction.

23 Claims, 32 Drawing Sheets

(56) References Cited

OTHER PUBLICATIONS

Golparvar-Fard, Mani, et al., "D4AR—A 4-Dimensional Augmented Reality Model for Automating Construction Progress Monitoring Data Collection, Processing and Communication", (A.S. Kazi, G. Aouad, and A. Baldwin eds); Journal of Information Technology in Construction, ITcon, 14:129-153 (2009).*

Zhang, Yongyue, et al., "Segmentation of brain MR images through a hidden Markov random field model and the expectation-maximization algorithm." Medical Imaging, IEEE Transactions on 20.1 (2001): 45-57.*

Wu, Chun-Hsin, Jan-Ming Ho, and Der-Tsai Lee. "Travel-time prediction with support vector regression." Intelligent Transportation Systems, IEEE Transactions on 5.4 (2004): 276-281.*

Abeid, Jorge, et al., "Photo-Net II: a computer-based monitoring system applied to project management," *Automation in Construction*, 12:603-616 (2003).

Abeid, Jorge, et al., "Time-Lapse Digital Photography Applied to Project Management," *J. Constr. Eng. Manage.* 128:530-535 (2002).

Abudayyeh, Osama, "Audio/visual information in construction project control," *Advances in Engineering Software*, 28:97-101 (1997).

Agarwal, Sameer, et al., "Building Rome in a Day," *12th International Conference on Computer Vision*, 2009 IEEE, pp. 72-79 (2009).

Akinci, Burcu, et al., "A formalism for utilization of sensor systems and integrated project models for active construction quality control," *Automation in Construction*, 15:124-138 (2006).

Alves, Nuno M., et al., "Integrated computational tools for virtual and physical automatic construction," *Automation in Construction*, 15:257-271 (2006).

Arman, Farshid, et al., "Model-Based Object Recognition in Dense-Range Images—A Review," *ACM Computmg Surveys*, 25(1):6-43 (Mar. 1993).

Arya, Sunil, et al., "An Optimal Algorithm for Approximate Nearest Neighbor Searching in Fixed Dimensions," *Journal of the ACM*, 45(6):891-923 (Nov. 1998).

Besl, Paul J., et al., "A Method for Registration of 3-D Shapes," *IEEE Transactions on Pattern Analysis and Machine Intelligence*, 14(2):239-256 (Feb. 1992).

Bosché, Frédéric, "Automated recognition of 3D CAD model objects in laser scans and calculation of as-built dimensions for dimensional compliance control in construction," *Advanced Engineering Informatics*, 24:107-118 (2010).

Bosché, Frédéric, et al., "Automated Recognition of 3D CAD Objects in Site Laser Scans for Project 3D Status Visualization and Performance Control," *J. Comput. Civ. Eng.*, 23:311-318 (2009).

Chang, Chih-Chung, et al., "LIBSVM: A Library for Support Vector Machines," ACM Transactions on Intelligent Systems and Technology (TIST), 2(3), Article No. 27, pp. 1-39 (Apr. 2011).

Cordova, Francisco, et al., "Validation of Vision Tracking at Egnatia Odos Motorway," *Construction Research Congress*, downloaded from ascelibrary.org on Nov. 27, 2012, Copyright ASCE (2009).

Cornelis, Nico, et al., "3D Urban Scene Modeling Integrating Recognition and Reconstruction," *Int J Comput Vis*, 78:121-141 (2008).

Dai, Fei, et al., "Photo-Based 3D Modeling of Construction Resources for Visualization of Operations Simulation: Case of Modeling a Precast Façade," *Proceedings of the 2008 Winter Simulation Conference*, Mason, S. J., Hill, R. R., Mönch, L., Rose, O., Jefferson, T. and Fowler, J. W. (eds), pp. 2439-2446 (2008).

Debevec, Paul E., et al., "Modeling and Rendering Architecture from Photographs: A hybrid geometry- and image-based approach," *Proceeding SIGGRAPH '96 Proceedings of the 23rd annual conference on Computer graphics and interactive technique*, pp. 11-20 (1996).

Du, Shaoyi, et al., "An Extension of the ICP Algorithm Considering Scale Factor," ICIP, 5:193-196 (2007).

Echeverry, Diego, et al., "Sequencing Knowledge for Construction Scheduling," *J. Constr. Eng. Manage.*, 117:118-130 (1991).

El-Omari, Samir, et al., "Integrating 3D laser scanning and photogrammetry for progress measurement of construction work," *Automation in Construction*, 18:1-9 (2008).

Ergen, Esin, et al., "Tracking Components and Maintenance History within a Facility Utilizing Radio Frequency Identification Technology," *J. Comput. Civ. Eng.*, 21:11-20 (2007).

Everett, John G., et al., "Cranium: Device for Improving Crane Productivity and Safety," *J. Constr. Eng. Manage.*, 119:23-39 (1993).

Fan, Rong-En, et al., "LIBLINEAR: A Library for Large Linear Classification," *Journal of Machine Learning Research*, 9:1871-1874 and A.1-A.25 (2008).

Freund, Yoav, et al., "A Short Introduction to Boosting," Journal of Japanese Society for Artificial Intelligence, 14(5):771-780 (Sep. 1999).

Furukawa, Yasutaka, "High-Fidelity Image-Based Modeling," Dissertation, University of Illinois at Urbana-Champaign, pp. 1-137 (2008).

Furukawa, Yasutaka, et al., "Accurate, Dense, and Robust Multi-View Stereopsis," *IEEE Transactions on Pattern Analysis and Machine Intelligence*, 32(8):1362-1376 (Aug. 2010).

Furukawa, Yasutaka, et al., "Reconstructing Building Interiors from Images," *12th International Conference on Computer Vision*, IEEE, pp. 80-87 (2009).

Gilligan, Brian, et al., "VDC Use in 2007: Significant Value, Dramatic Growth, and Apparent Business Opportunity," Stanford University, Copyright 2007 by Center for Integrated Facility Engineering, CIFE Technical Report #TR171, pp. 1-40 (Dec. 2007).

Golparvar-Fard, Mani, et al., "Application of Visualization Techniques for Construction Progress Monitoring," *Proceeding of the 2007 ASCE International Workshop on Computing in Civil Engineering*, pp. 1-8 (2007).

Golparvar-Fard, Mani, et al., "Automated Progress Monitoring Using Unordered Daily Construction Photographs and IFC-based Building Information Models," *ASCE J. of Comput. Civ. Eng.*, Copyright 2012 by the American Society of Civil Engineers, Submitted Dec. 21, 2011, accepted Feb. 9, 2012; posted ahead of print Feb. 11, 2012, pp. 1-60 (2012).

Golparvar-Fard, Mani, et al., "$D^4$AR—A 4-Dimensional Augmented Reality Model for Automating Construction Progress Monitoring Data Collection, Processing and Communication," A.S. Kazi, G. Aouad, and A. Baldwin eds): *Journal of Information Technology in Construction, ITcon*, 14:129-153 (2009).

Golparvar-Fard, Mani, et al., "Integrated Sequential As-Built and As-Planned Representation with D4AR Tools in Support of Decision-Making Tasks in the AEC/FM Industry," *J. Constr. Eng. Manage.*, 137:1099-1116 (Feb. 2011).

Golparvar-Fard, Mani, et al., "Visualization of Construction Progress Monitoring with 4D Simulation Model Overlaid on Time-Lapsed Photographs," *Journal of Computing in Civil Engineering*, Copyright ASCE, pp. 392-404 (Nov./Dec. 2009).

Gordon, Chris, et al., "Combining Reality Capture Technologies for Construction Defect Detection: A Case Study," *In: Proceedings of EuropIA International Conference*, Istanbul, Turkey, pp. 99-108 (2003).

Hartmann, Timo, et al., "Areas of Application for 3D and 4D Models on Construction Projects," *J. Constr. Eng. Manage.*, 134:776-785 (2008).

Horn, Berthold K.P., "Closed-form solution of absolute orientation using unit quaternions," *J. Opt. Soc. Am. A*, 4(4):629-642 (Apr. 1987).

Huber, Daniel F., et al., "3D Modeling Using a Statistical Sensor Model and Stochastic Search," *In: Proceedings of the IEEE Conference on Computer Vision and Pattern Recognition (CVPR)*, 1:858-865 (Jun. 2003).

Huertas, Andres, et al., "Detecting Changes in Aerial Views of Man-Made Structures," in *Proceedings of the Sixth International Conference on Computer Vision (ICCV98)*, pp. 73-80 (1998).

Ibrahim, Y.M., et al., "Review of Photographic/Imaging Applications in Construction," *The Built & Human Environment Review*, 1:99-117 (2008).

Ibrahim, Y.M., et al., "Towards automated progress assessment of workpackage components in construction projects using computer vision," *Advanced Engineering Informatics*, 23:93-103 (2009).

Jaselskis, Edward J., et al., "Implementing Radio Frequency Identification in the Construction Process," *J. Constr. Eng. Manage.*, 129:680-688 (2003).

(56) References Cited

OTHER PUBLICATIONS

Kim, Hyungeun, et al., "Comparison of construction photograph and VR image in construction progress," *Automation in Construction*, 17:137-143 (2008).

Kiziltas, Semiha, et al., "Technological Assessment and Process Implications of Field Data Capture Technologies for Construction and Facility/Infrastructure Management," *ITCon*, 13:134-154 (2008).

Koo, Bonsang, et al., "Feasibility Study of 4D CAD in Commercial Construction," Stanford University, Copyright 1998 by Center for Integrated Facility Engineering, CIFE Technical Report #118, pp. 1-135 (Aug. 1998).

Koo, Bonsang, et al., "Formalization of Construction Sequencing Rationale and Classification Mechanism to Support Rapid Generation of Sequencing Alternatives," *J. Comput. Civ. Eng.*, 21:423-433 (2007).

Leung, Sze-wing, et al., "Using a real-time integrated communication system to monitor the progress and quality of construction works," *Automation in Construction* 17:749-757 (2008).

Levoy, Marc, et al., "The Digital Michelangelo Project: 3D Scanning of Large Statues," *Proc. Siggraph*, pp. 1-14 (2000).

Lowe, David G., "Distinctive Image Features from Scale-Invariant Keypoints," *International Journal of Computer Vision*, 60(2):91-110 (Nov. 2004).

Lukins, Timothy C., et al., "Towards Automated Visual Assessment of Progress in Construction Projects," *Proceedings of the British Machine Vision Conference*, Warwick, UK, pp. 1-10 (2007).

Navon, R., "Research in automated measurement of project performance indicators," *Automation in Construction*, 16:176-188 (2007).

Navon, Ronie, et al., "Assessing research issues in Automated Project Performance Control (APPC)," *Automation in Construction*, 16:474-484 (2007).

Nistér, David, "An Efficient Solution to the Five-Point Relative Pose Problem," In: *Proceedings of the 2003 IEEE Computer Society Conference on Computer Vision and Pattern Recognition (CVPR'03)*, 2:195-202 (2003).

Nuntasunti, Suchart, et al., "Beyond Webcam: A Site-Web-Site for Building Construction," NIST Special Publication SP, 2003—iaarc.org, pp. 1-6. (2003).

Ordóñez, Celestino, et al., "Two photogrammetric methods for measuring flat elements in buildings under construction," *Automation in Construction*, 17:517-525 (2008).

Park, H.S., et al., "A New Approach for Health Monitoring of Structures: Terrestrial Laser Scanning," *Computer-Aided Civil and Infrastructure Engineering*, 22:19-30 (2007).

Peterson, Forest, et al., "Project Monitoring Methods Exploratory Case Analysis: Industry Responses," Stanford University, Copyright 2009 by Center for Integrated Facility Engineering, CIFE Technical Report #WP112, pp. 1-12 (Apr. 2009).

Poku, Stephen E., et al., "Construction Scheduling and Progress Control Using Geographical Information Systems," *J. Comput. Civ. Eng.*, 20:351-360 (2006).

Pollefeys, M., et al., "Detailed Real-Time Urban 3D Reconstruction From Video," *International Journal of Computer Vision*, 78(2-3):143-167 (Jul. 2008).

Quinoñes-Rozo, C.A., et al., "Digital image reasoning for tracking excavation activities," *Automation in Construction*, 17:608-622 (2008).

Reinhardt, Jan, et al., "The preliminary design of a wearable computer for supporting Construction Progress Monitoring," Bauhaus-Universität Weimar, Online Publikationen, URN: urn:nbn:de:gbv:wim2-20111215-5901, pp. 1-6, Year of first publication: 2000, Date of Publication (online) (Apr. 2005).

Schindler, Grant, et al., "Detecting and Matching Repeated Patterns for Automatic Geo-tagging in Urban Environments," *IEEE Conference on Computer Vision and Pattern Recognition, CVPR* 2008, pp. 1-7 (2008).

Seitza, Steven M., et al., "Photorealistic Scene Reconstruction by Voxel Coloring," In Proc. Computer Vision and Pattern Recognition Conf., pp. 1067-1073 (1997).

Shih, Naai-Jung, et al., "Point-Cloud-Based Comparison between Construction Schedule and As-Built Progress: Long-Range Three-Dimensional Laser Scanner's Approach," *J. Archit. Eng.*, 10:98-102 (2004).

Shih, Naai-Jung, et al., "The Application of a Panorama Image Database Management Systems (PIDMS) for Information Integration on Construction Sites," *ITcon*, 11:641-654 (2006).

Sinha, Sudipta N., et al., "Interactive 3D Architectural Modeling from Unordered Photo Collections," *ACM Transactions on Graphics (TOG)—Proceedings of ACM SIGGRAPH Asia 2008*, 27(5), Article No. 159, pp. 1-10 (Dec. 2008).

Snavely, Noah, et al., "Modeling the World from Internet Photo Collections," *Int J Comput Vis*, 80(2):189-210 (Nov. 2008).

Soibelman, Lucio, et al., "Management and analysis of unstructured construction data types," *Advanced Engineering Informatics*, 22:15-27 (2008).

Su, Y.Y., et al., "Integration of Construction As-Built Data via Laser Scanning with Geotechnical Monitoring of Urban Excavation," *Journal of Construction Engineering and Management*, Copyright ASCE, pp. 1234-1241 (Dec. 2006).

Teizer, Jochen, et al., "Framework for Real-Time Three-Dimensional Modeling of Infrastructure," *Transportation Research Record: Journal of the Transportation Research Board*, 1913:177-186, Transportation Research Board of the National Academies, Washington, D.C. (2005).

Triggs, Bill, et al., "Bundle Adjustment—A Modern Synthesis," B. Triggs, A. Zisserman, R. Szeliski (eds): *Vision Algorithms '99, LNCS*, 1883:298-372 (2000).

Uffenkamp, V., "State of the Art of High Precision Industrial Photogrammetry," In: *Third International Workshop on Accelerator Alignment*, Annecy, France, pp. II/153-II/165 (1993).

Walters, Russell C., et al., "Using Scanning Lasers for Real-Time Pavement Thickness Measurement," *Computing in Civil Engineering*, downloaded from ascelibrary.org on Nov. 27, 2012, Copyright ASCE (2005).

Wu, Y., et al., "Digital Imaging in Assessment of Construction Project Progress," *Proceedings of the 21st International Symposium on Automation and Robotics in Construction, IAARC*, Jeju, Korea, pp. 537-542 (2004).

Young, Norbert, et al., "The Business of Value of BIM: Getting Building Information Modeling to the Bottom Line," *McGraw Hill Construction, SmartMarket Report*, 52 pages (2009).

Zebedin, Lukas, et al., "Fusion of Feature- and Area-Based Information for Urban Buildings Modeling from Aerial Imagery," D. Forsyth, P. Torr, and A. Zisserman (Eds.): *ECCV 2008, Part IV, LNCS*, 5305:873-886 (2008).

Zhang, Xiaonan, et al., "Automating progress measurement of construction projects," *Automation in Construction*, 18:294-301 (2009).

\* cited by examiner

Algorithm 1: *As-built voxel labeling and image marking*

Input: $\{C_i | i=1,2,\ldots,N\}$ camera list; point cloud model;
$\{M_k | k=1,2,\ldots,N\}$ image marking boards, where
$M_k(u,v)$ is the making of pixel $(u,v)$ in marking board of camera $k$
[for all pixels in the projection of an occupied voxel
on the marking board, $M_s(u,v)=1$]

Output: $\sum_{x,y,z}\left[\sum_3 l(v_{i,j,k})\right]$ where
$\sum_3 l(v_{i,j,k})$ is $[O_b | E_b | B_b]$ labeled with $[0|1]$ 1  Start with $\delta, C$.
2  for all $V_{i,j,k}$ do
3     $n=0$
4     for all $c \in C$ and all pixels $(u,v)$ in $proj_c(v_{i,j,k})$ do
5        $n = n+1 \leftarrow if\ M_c(u,v)=0$
6     end for
7     if $n \geq 20$ then
8        if [voxel contains 3D points] or [$\lambda_v \leq thresh$] then
9           $O_b(i,j,k)=1$;
10          for all $c \in C$ and for all pixels $(u,v)$ in $proj_c(v_{i,j,k})$ do
11             $M_c(u,v)=1$;
12          end for
13       else
14          $E_b(i,j,k)=1$;
15       end if
16    else
17       $B_b(i,j,k)=1$;
18    end if
19 end for

*FIG. 7*

Algorithm 2: *As-planned occupancy/visibility labeling and image marking*

Input: IFC model;
$\{C_i | i=1,2,...,N\}$ camera list;
$\{M_k | k=1,2,...,N\}$ image marking boards, where
$M_k(u,v)$ is the making of pixel $(u,v)$ in marking board $k$
[for all pixels in the projection of an occupied voxel
on the marking board, $M_k(u,v) = 1$]; and
non-overlapping parts of the point cloud model

Output: $\sum_{x,y,z}\left[\sum_3 l(v_{i,j,k})\right]$ where
$\sum_3 l(v_{i,j,k})$ is $[O_p | V_p]$ labeled with $[0 | 1]$

```
1  Start with δ, C.
2  for all v_{i,j,k} do
3      while O_p (i,j,k) = 0 do
4          for all elements in BIM, do
5              if [voxel is inside an element] then
6                  O_p (i,j,k) = 1;
7                  n = 0;
7                  for all c ∈ C and all pixels (u,v) in proj_c(v_{i,j,k}) do
8                      n = n+1 ← if M_c(u,v) = 0
9                  end for
10                 if n ≥ 20 then
11                     V_p (i,j,k) = 1;
12                     for all c ∈ C and for all pixels (u,v) in proj_c(v_{i,j,k}) do
13                         M_c(u,v) = 1;
14                     end for
15                 end if
16             end if
17         end for
18     end while
19 end for
```

*FIG. 8*

Algorithm 3: *Physical progress detection per construction schedule activity- n elements linked.*

Input: $\sum_{x,y,z}\left[\sum_{3}l(v_{i,j,k})\right]_{p}$ where $\sum_{3}l(v_{i,j,k})_{p}$ is $[O_p | V_p]$; and $\sum_{x,y,z}\left[\sum_{3}l(v_{i,j,k})\right]_{b}$ where $\sum_{3}l(v_{i,j,k})_{b}$ is $[O_b | E_b | B_b]$ Output: $Q$ 1  Start with $\delta$ *and* Set $N_x, N_y, N_z$ as inner voxels of all elements $i$ *to* $n$
2  for $i=1:n$
3     Define $t/d, T_i, \Psi(t)$ from IFC element $i$
4     Calculate $P(\theta_p^i)$, $P(\theta_T^i | \eta^i)$, and $\Gamma^i$
5     $\forall i, P(\eta^i | \theta_T^i) \geq \Gamma^i \rightarrow E_i = 1$
6  end for
7  Calculate $Q$

*FIG. 9*

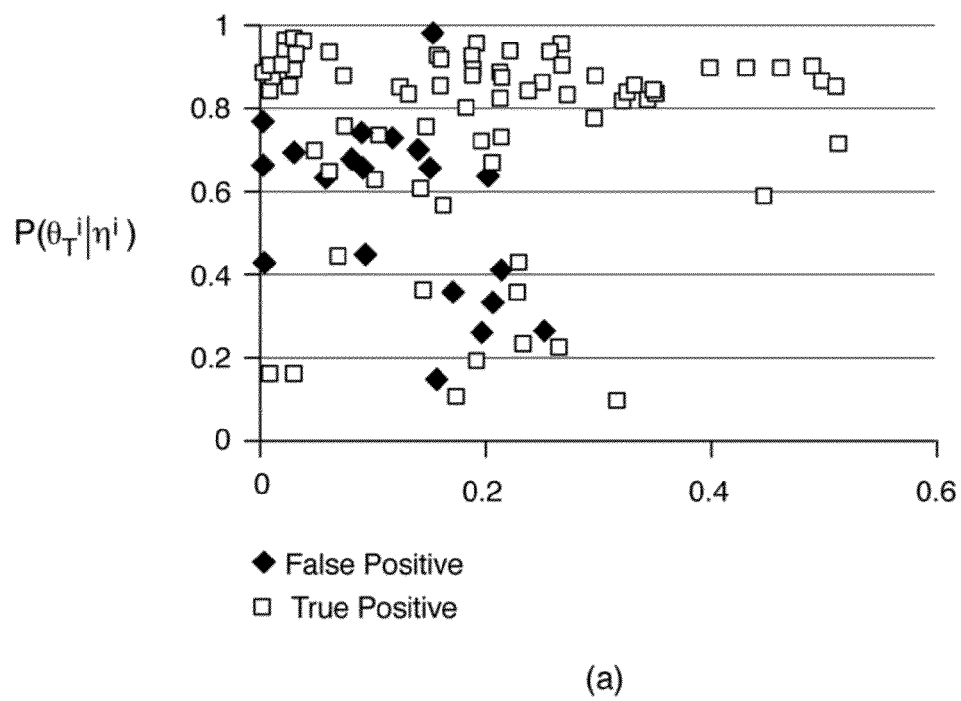
(a)
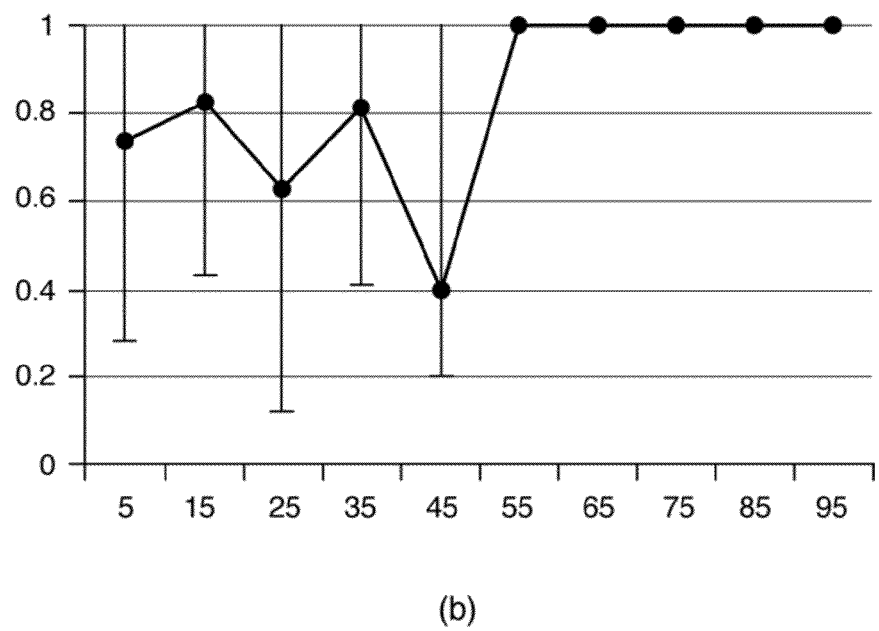
(b)
*FIG. 14*

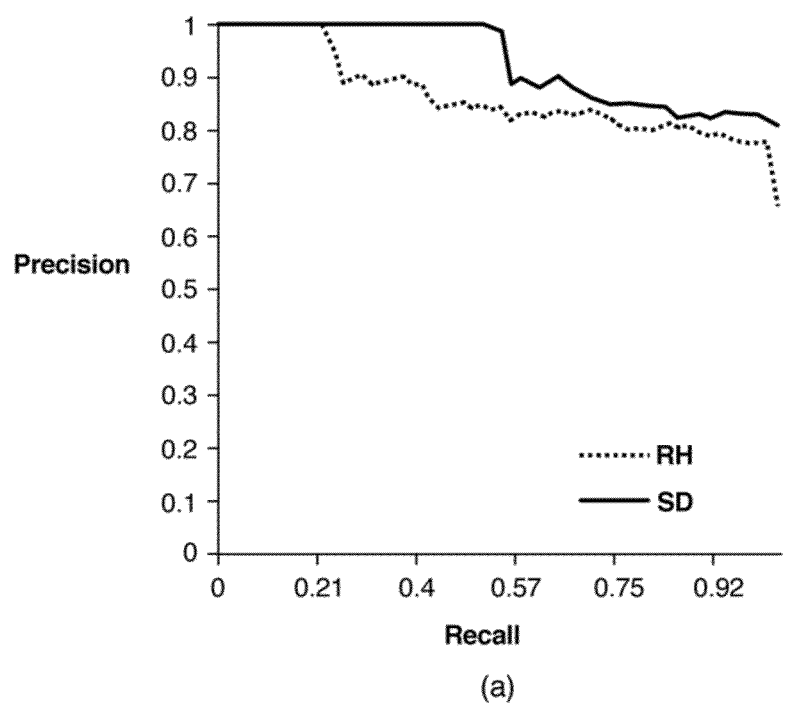
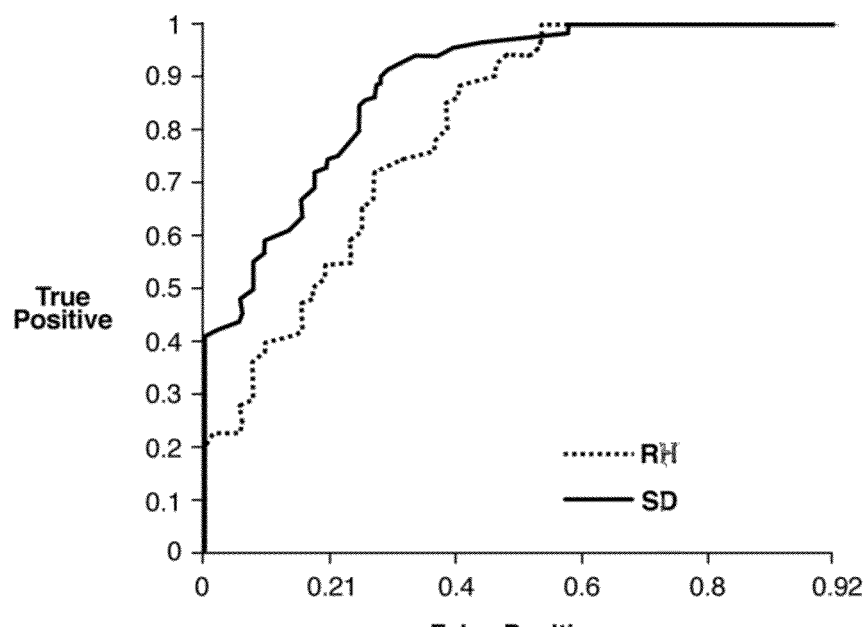
FIG. 15

FIG. 18

| Visibility | Progress | | Scheduled Start | Scheduled Completion | 28 | 29 | 30 | 31 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|---|---|---|---|---|---|
| | | | | | Jul-08 | | | | | | | Aug-08 | | | | | | | Aug-08 | | | | | | |
| | | | | | M | T | W | R | F | S | S | M | T | W | R | F | S | S | M | T | W | R | F | S | S |
| | | SITE | | | | | | | | | | | | | | | | | | | | | | | |
| | | Perform Interim Survey Control and Monitor Set-Up | | | | | | | | | | | | | X | | | | | | | | | | |
| | | RH BUILDING FOOTPRINT | | | | | | | | | | | | | | | | | | | | | | | |
| | | Install Perimeter Subsoil Drain Piping at North Wall | 7/28/08 | 8/1/08 | X | X | X | X | X | | | | | | | | | | | | | | | | |
| | | Construct Rebar Mats & Structures | 7/28/08 | 10/31/08 | X | X | X | X | X | | | X | X | X | X | X | | | | | | | | | |
| 1 | 60% | FRPS Basement Walls & Piers+ | 7/28/08 | 8/15/08 | X | X | X | X | X | X | | X | X | X | X | X | ? | | X | X | X | X | X | | |
| 0.5 | 52% | FRPS Basement Perimeter Foundations+ | 7/28/08 | 7/29/08 | X | X | | | | | | | | | | | | | | | | | | | |
| | | Apply Liquid Membrane at Perimeter Footings | 7/28/08 | 8/1/08 | X | X | X | X | X | | | | | | | | | | | | | | | | |
| | | Perform Elevator Drilling at NW Elevator Shaft | 7/29/08 | 7/30/08 | | X | X | | | | | | | | | | | | | | | | | | |
| 0 | -- | FRPS Basement Interior Foundations | 7/30/08 | 8/5/08 | | | X | X | X | X | | X | X | | | | | | | | | | | | |
| 1 | 86% | FRPS Interior Columns | 8/1/08 | 8/8/08 | | | | | X | X | | X | X | X | X | X | | | | | | | | | |

? Pending owner-permit the contractor was allowed to work on that non-working day to catch-up with lost progress.
+Critical activities in the work schedule.
++Visibility is the percentage of elements that are not fully occluded.

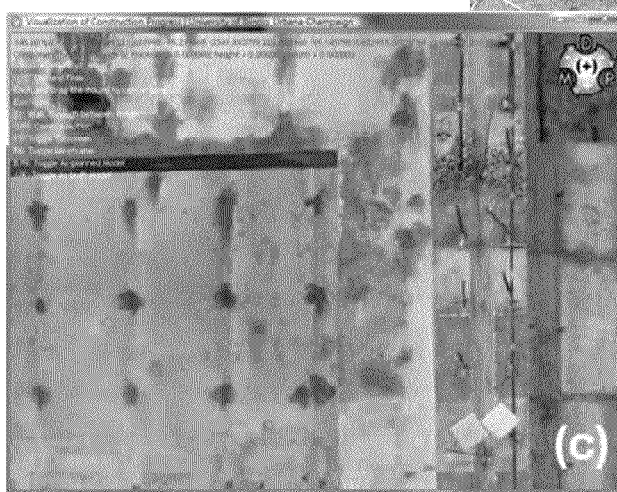
FIG. 30

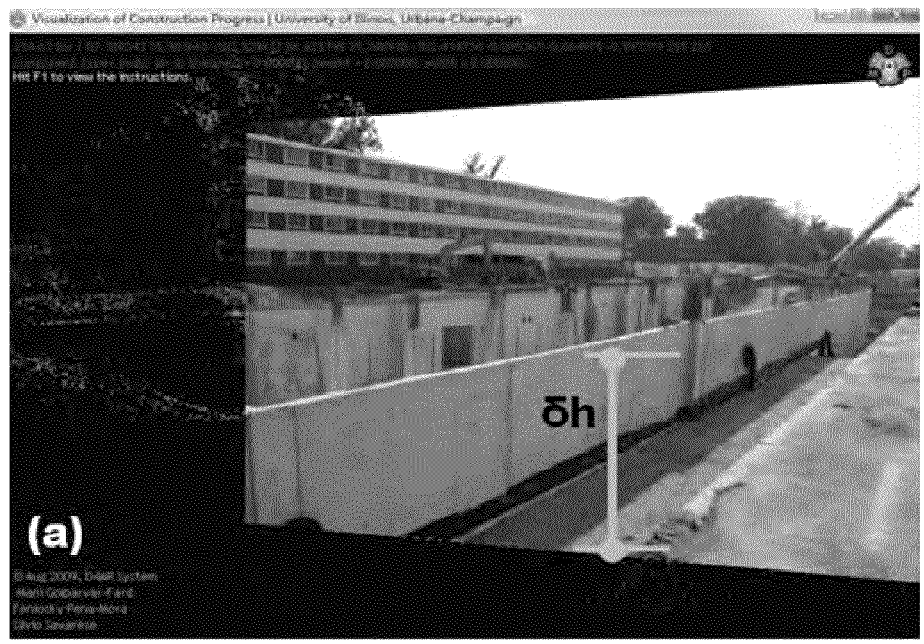
*FIG. 31*

FOUR-DIMENSIONAL AUGMENTED REALITY MODELS FOR INTERACTIVE VISUALIZATION AND AUTOMATED CONSTRUCTION PROGRESS MONITORING

REFERENCE TO EARLIER FILED APPLICATION

This application claims the benefit under 35 U.S.C. §119 (e) of U.S. Provisional Patent Application No. 61/570,491, filed Dec. 14, 2011, which is incorporated herein by this reference.

FEDERALLY SPONSORED RESEARCH

This invention was made with Government support under NSF Grant CMMI-0800500 by the National Science Foundation. The United States Government has certain rights in the invention.

TECHNICAL FIELD

The present disclosure relates to algorithmic modeling of structure site progression to monitor such progression as compared to the final planned versions of constructed buildings, structures or manufactured products. More particularly, the present disclosure discloses modeling that uses a probabilistic model for automated progress tracking and visualization of deviations that melds both an as-planned building information model and an as-built model derived from unordered daily photographs.

BACKGROUND

Accurate and efficient tracking of the as-built (or actual physical) status of structures being built has been repeatedly reported as a critical factor for success of project control. Such information directly supports progress monitoring and control and if automated can significantly impact management of a project. Despite the importance of progress monitoring, current methods for site data collection, processing and representation are time-consuming and labor-intensive. These methods call for manual data collection and extensive as-planned and as-built data extraction from structural drawings, schedules and daily construction (or build) reports produced by superintendents, subcontractors and trades foremen. Similar challenges arise in other fields of manufacture, including in the auto industry or other manufacturing industries.

Quality of the daily progress reports also highly depends on the data collected by field personnel which tends to be based on their interpretation of what needs to be measured, the way it needs to be measured and the way it needs to be presented, and therefore, it may not reveal the actual impact of site circumstances on the construction project. For example, on a daily construction report submitted by a drywall contractor, it may be reported that framing was conducted without specifying the amount of resources being used, the exact location of the work performed or the progress made. Even if progress is measured, it may be conducted in a non-systematic way and metrics may tend to be subjective. For example, a concrete subcontractor reports that 60% of the roof work is complete. This could mean 60% of the planned area/volume of concrete is placed, or that 60% of the planned labor-hours has been spent. Or, it may mean that 60% of the actual requirement has been completed. If the item being referenced is a small work unit, it may not have a significant difference. However, in the case where the references are to the whole task, assumption of input/output proportionality could be very misleading.

Finally, progress-monitoring reports are visually complex. Decision-making for corrective control actions and revision of work schedule typically takes place in contractor coordination meetings. A wide range of individuals with different areas of expertise and interests often attend these meetings. In these face-to-face interactions, progress information needs to be easily and quickly communicated among the participants. However, none of the existing reporting methods (e.g., progress S curves, schedule bar charts and the like) easily and effectively present multivariable information (e.g., schedule and performance) nor do they intuitively reflect information pertaining to the spatial aspects of progress and their associated complexities. Existing representations cause a significant amount of information to be inefficiently presented in coordination meetings. As a result, extra time is often spent in explaining the context in which problems occurred rather than understanding the causes of the problems, evaluating alternatives to solve the problems and discussing corrective actions. Accordingly, prior methods make it difficult and expensive to gather, analyze, and visualize construction progress monitoring data (e.g., actual progress or as-built, expected progress or plan, and their deviations), which needs to be easily and quickly shared among project stakeholders.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIG. 7 is a flow chart of Algorithm 1, as-built voxel labeling and image marking.

FIG. 8 is a flow chart of Algorithm 2, as-planned voxel labeling and image marking.

FIG. 9 is a flow chart of Algorithm 3, tracking physical progress for an activity in the work schedule.

FIG. 14 are diagrams of: (a) the ratio of expected progress $P(\theta_T^i | \eta^i)$ to the expected observable regions, $P(\theta_p^i)$ for progress detection results from RH #1 experiment; and (b) the ratio of accuracy of detection to the percentage of visibility (1-occlusion).

FIG. 15 includes diagrams of (a) a precision-recall graph; and (b) the true positive/false positive graph for the progress detection model.

FIG. 18 is a chart showing progress reported the RH construction schedule with a progress monitoring date of Aug. 27, 2008.

FIG. 30 is a series of images illustrating interactive zooming, which captures high-resolution images along with the implemented, interactive zooming that allows the quality of the finished surface to be studied remotely.

FIG. 31 are two images that: (a) illustrate how trench depth can be measured; and (b) visualize the foundation work where the section that needs to be formed for concrete placement is color-coded in red (circled part in greyscale picture).

DETAILED DESCRIPTION

Figure 1:
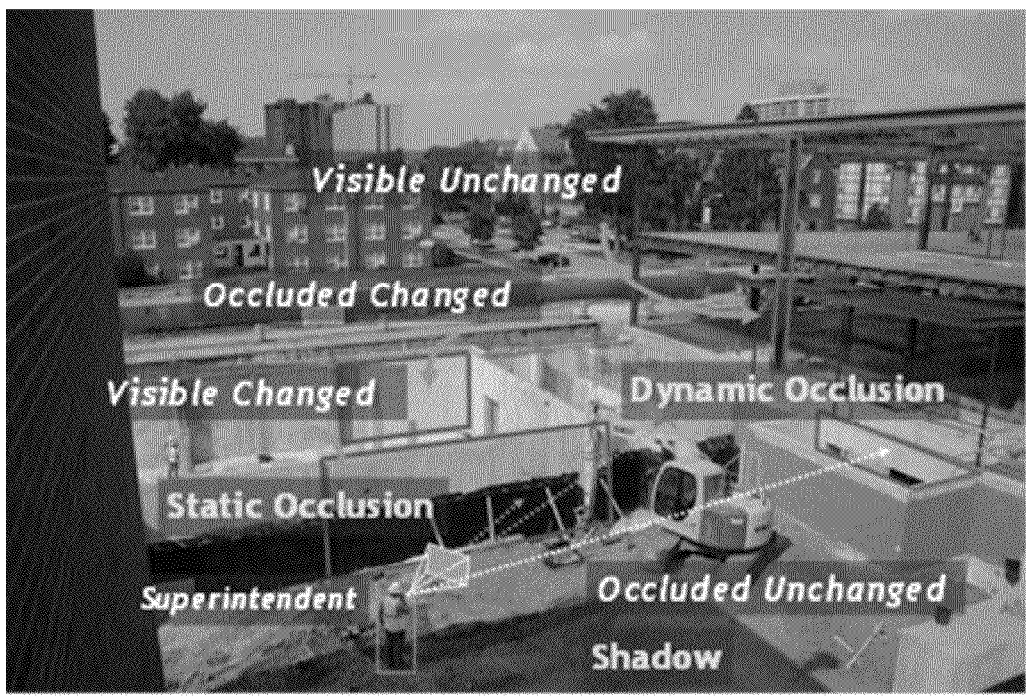
FIG. 1 is a picture of the student dining (SD) hall construction project at the University of Illinois at Urbana-Champaign, Ill. on Aug. 27, 2008.

By way of introduction, the present disclosure discloses: (1) generating as-built three-dimensional (3D) and four-dimensional (4D) (3D+time) point cloud models using low resolution images; (2) generating an augmented reality environment by superimposing a building information model with the as-built point cloud model; and (3) automated progress monitoring using the building information model integrated with a 3D or 4D point cloud model.

While the present disclosure primarily focuses on application of the disclosed monitoring principles to the construction industry, the principles are also equally applicable to other building and manufacturing industries as well and are intended to cover additional applications. For example, the disclosed embodiments may be applied to the automotive industry in being able to track the construction of an engine or an automotive chassis. Further by way of example, the creation of an airplane or any manufactured component could be tracked as disclosed herein. Finally, semiconductor chips have become more complex and oftentimes multi-layered and formed in stages. Accordingly, the present embodiments may also be applied to monitoring and ensuring complete creation of different phases of manufacturing a semiconductor chip. Any of these scenarios may be the subject of building or a construction site as those terms are referred to herein.

Previous works have not implemented automated detection of progress deviations. The present disclosure introduces volumetric and dense reconstruction of an as-built scene grounded in image-based reconstruction in which a patch-based multi-stereo algorithm may be designed for building interiors that predominately consists of piece-wise planar surfaces. The images may be widely distributed and have less overlap than previously required as the focus is to use the images that are already available on the construction sites to construct the as-built scene for comparison with the planned scene.

Cheap and high-resolution digital cameras, low cost memory and increasing bandwidth capacity have enabled capturing and sharing of construction photographs on a truly massive scale. For example, on a 200,000 square foot (S.F.) building project in Champaign, Ill., the construction management team collects an average of 250 photos per day. Such a large and diverse set of imagery along with the photos contractors and their subs take (about 25 photos per day for each work package) as well as the photos owner take (about 25-50 photos per day), enable the as-built scene to be fully observed from almost every conceivable viewing position and angle during construction of the project. The availability of such rich imagery, which captures dynamic construction scenes at minimal cost, may enable geometrical reconstruction and visualization of as-built models at high resolution, which may have broader impacts for the architecture, engineering, and construction (AEC) community.

In the meantime, Building Information Models (BIMs) are also increasingly turning into binding components of AEC contracts. For example as of July 2009, Wisconsin establishes itself as the first state requiring BIM models for public projects. In a recent survey, McGraw-Hill Construction (2009) reports that 49% of AEC companies are already using BIM, a growth of 75% from 2007. While the application of BIMs is increasing, Gilligan and Kunz (2007) reports that significant attention is placed towards project design and system clash detection. If linked with project schedules, BIMs can form detailed chronological models that allow four-dimensional (4D)—meaning three-dimensional (3D) plus a time-based dimension—clash detection and schedule quality control to be conducted. Furthermore, BIMs may serve as a powerful baseline for progress tracking as well as visualization of discrepancies. Application of these models during construction phase may be increased with the investigation of further potential added values from integrating BIMs with as-built models.

Nonetheless, linking unordered photo collections with as-planned models for the purpose of monitoring construction progress is challenging. First, such imagery is usually unordered, un-calibrated, with widely unpredictable and uncontrolled lighting conditions. Second, visibility order and occlusions should be considered for successful alignment and measurements. In particular, one should account for two types of occlusions: (1) Static occlusions: self-occlusions caused by progress itself (e.g., a façade blocking observation of elements at interior) or occlusions caused by temporary structures (e.g., scaffolding or temporary tenting); and (2) Dynamic Occlusions: rapid movements of construction machinery and workers during the time photographs are taken. Developing computer vision techniques that may effectively work with such imagery to monitor building element changes has been a major challenge.

These challenges are addressed herein, and based on a priori information (4D BIM), a new approach for monitoring as-built elements using unordered photographs is presented. First using Structure-from-Motion (SfM) techniques, an as-built point cloud model may be generated and photographs automatically registered. Subsequently, the as-built point cloud model may be registered over the as-planned model and improved by Multi-View Stereo (MVS). At this stage, a new voxel coloring algorithm may be used to generate a volumetric reconstruction of the site, labeling different areas according to consistent visual observations while fully accounting for occlusions. The same labeling process may be conducted on the as-planned model to identify occupied and visible areas for progress monitoring.

Finally, a Bayesian probabilistic model may be introduced to automatically recognize progress deviations by comparing measurements of progress with dynamic thresholds learned through a Support Vector Machine (SVM) classifier. Not only does this model quantify progress automatically, but it also accounts for occlusions and recognizes if reconstructed building elements are missing because of occlusions or because of changes. This makes the presented model the first probabilistic model for automated progress tracking and visualization of deviations that melds both as-planned models and unordered daily photographs in a principled way. The presented model may use existing information without adding the burden of explicit data collection on project management teams. Herein, this model may be validated through tracking and visualizing progress on two building projects.

Underlying Hypotheses for Automated Physical Progress Monitoring

The detection of progress deviations may be based on a priori information such as available in a 4D Building Information Model (BIM), as well as daily construction photographs. Suppose interest in monitoring progress of "form/pour/strip (FPRS) basement concrete columns" activity. In the proposed approach, the Work Breakdown Structure for the 4D model may be governed by the level of detail presented in the schedule; i.e., if FPRS of all the basement concrete columns are linked to this activity, all those elements will turn into a base line for tracking progress and progress for those will be reported in a mutually independent fashion. In other terms, it may be assumed that the construction operation sequence (i.e., workflow) within any given activity is unknown. Secondly, progress may be defined as the observation on the day placement of an element is expected and operational details (e.g., forming stage of columns) may not be considered. The formulation presented in this paper may account for operational details.

Currently, a superintendent or a field engineer walks around the site all day, every day to observe progress from all possible viewpoints. Subsequently, these measurements are compared with paper-based plan information (e.g., construction drawings and schedules), and deviations are reported back to the project manager. It is assumed that at several stages of this observation, site images are captured to visually document the work progress. Since these images are collected from different viewpoints and lighting conditions, they challenge any vision-based system by: (1) generating swift intensity changes within a short distance of the image; and (2) generating two types of occlusions. These two types of occlusions include: (a) static occlusions, or self-occlusions caused by progress itself, e.g., a façade blocking observation of progress at interior, or occlusions caused by temporary structures, e.g., scaffolding or temporary tenting; and (b) dynamic occlusions, which include rapid movements during the time photographs are taken, e.g., movement of construction machinery and crew.

FIG. 1 highlights the technical challenges of a vision-based progress monitoring system, showing different areas of a construction site with various real-world issues due to passage of time, including areas categorized as: visible unchanged, occluded changed, occluded unchanged, visible changed, which may be observed under static occlusion (progress on the project itself), dynamic occlusion (movement of equipment and workers) and shadows.

In regards to the as-planned model, it may be assumed that (1) an intelligent frame correction (IFC)-based BIM is generated based on the most updated construction drawings. ASIs (Architect's Supplemental Instructions), RFIs (Requests for Information), RFPs (Requests for Proposal) or change orders are reflected in the revised plan model; (2) the most updated project schedule may be used to generate the underlying 4D model. For the as-built model, it may further be assumed that the photographs are all collected on one particular day or in a short period of time (e.g., a couple of days) where no significant progress is made in construction. In the proposed approach there is no need to infer temporal order from images. Rather, such information may be automatically extracted from exchange image file format (EXIF) tag of JPEG images (available in all cameras). Finally, for registration of as-planned and as-built models, it may be assumed that at least three distinct control points are available so that the as-planned model may be superimposed with the as-built sparse point cloud model. Finally, it is presumed that there will be a registration error, and that error needs to be considered in the formation of the monitoring module.

Overview on the D$^4$AR Progress Visualization and Automated Monitoring

Figure 2:
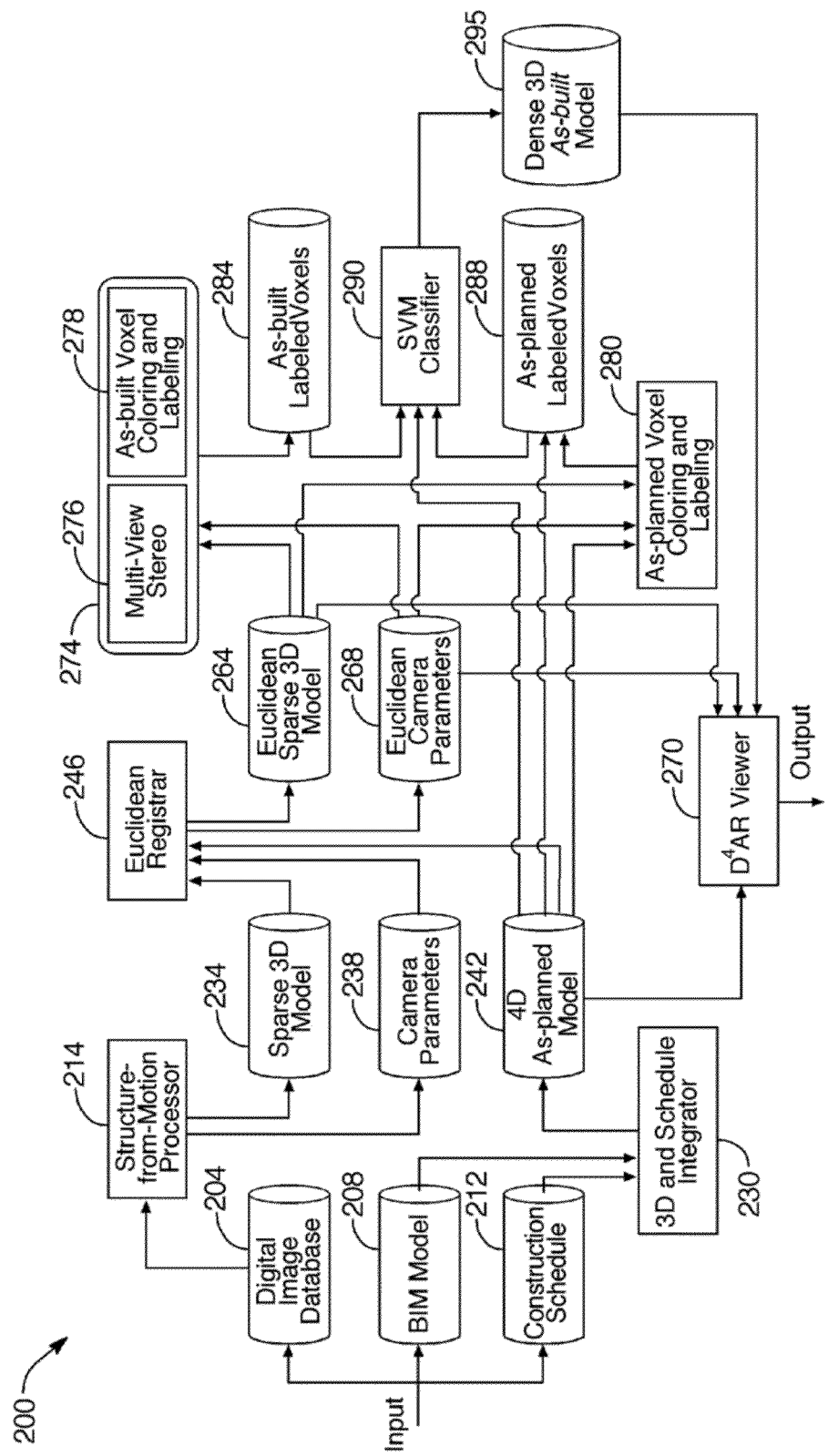
FIG. 2 is a system diagram of data and processes in a proposed tracking, analysis and visualization system for executing the disclosed methods.

FIG. 2 is a block diagram and data flow of a system 200 for tracking, processing, analyzing and visualizing the aggregation of daily construction photographs, IFC-based BIM as well as a construction schedule to generate the D$^4$AR models and to automatically measure progress deviations. The system 200 may include several modules or processors, including but not limited to a number of process modules executable by a processor and software code within a computer system, and databases showing aggregation and flow of data within the computer system. The computer system may be distributed across multiple computing systems, as may be the databases that provide for data flows between modules. After discussing an overview of the system 200, some of the process and data flow of FIG. 2 may be described in more detail.

The system 200 may include a digital image database 204, a building information model (BIM) database 208 and a construction schedule database 212. Daily photographs taken at a construction site may be uploaded and stored in the digital image database 204 to be provided to a structure-from-motion (SfM) processor 214. Data from the BIM model database 208 and the construction schedule database 212 may be provided to a 3D and schedule integrator 230, which with the help of the user, may schedule different phases of a construction project over time with respect to different milestones to be completed within three dimensions of a construction site, and thus generate a 4D as-planned model of the site. The fourth dimension is considered the passage of time.

The 3D and schedule integrator 230 may generate a 4D as-planned model of the construction project, data for which may be stored in a 4D as-planned model database 230. The schedule may be fused into the IFC-based BIM by manually linking image elements to activities and creating a 4D baseline model for progress monitoring.

The SfM processor 214 may apply an SfM algorithm to the digital image data and generate a sparse 3D model, data for which may be stored in a sparse 3D model database 234, and camera parameters, data for which may be stored in a camera parameters database 238. Data from the sparse 3D model and camera parameters may be supplied to a Euclidean registrar 246 for registering the sparse 3D model within the system 200. Using SfM techniques, the SfM processor 214 may generate an underlying 3D geometry for the as-built scene that sets a baseline for visual navigation through registered imagery in the scene. Generation of the 3D geometry and creation of the as-built scene may be completed by the SfM processor 214 calculating camera pose (e.g., location, orientation, and field of view) and the Euclidean registrar 246 calculating sparse 3D Cartesian coordinate information of the as-built model. The Euclidean registrar 246 may then superimpose the 3D IFC-based BIM with the integrated as-built point cloud and camera model (camera 3D positions and viewing directions).

For example, the Euclidean registrar 246 may create a Euclidean sparse 3D model that may be stored in a Euclidean sparse 3D model database 264 and Euclidean camera parameters that may be stored in a Euclidean camera parameters database 268. These two sets of data may then be fed into a voxel processor 274 configured to execute a multi-view stereo (MVS) algorithm 276 to improve density of the reconstruction.

The results of the MVS algorithm may be placed into an as-built voxel coloring and labeling algorithm 278 developed to get a dense reconstruction of the as-built site and label scene for as-built occupancy. The voxels processor 274 may send as-built voxel colored/labeled image data to be stored in an as-built, labeled voxels database 284. The as-built, labeled voxels may include categories of occupied (O); empty (E); and blocked (B).

Executing a similarly structured voxel-coloring algorithm, an as-planned voxel colorer and labeler 280 may label the 4D as-planned scene for occupancy and visibility, data for which may be saved in an as-planned, labeled voxels database 288. The as-planned, labeled voxels may be categorized as occupied (O) and visible (V).

These two labeled, as-built and as-planned spaces may be fed into a Bayesian model and used to assess progress through a Support Vector Machine (SVM) classifier 290. Finally, the detected as-built elements, camera parameters plus 4D BIM may be stored in a detected dense 3D as-built model database 295 and be fed into a four-dimensional augmented reality (D⁴AR) viewer 270 to visualize the as-built and as-planned models, and to visualize progress deviations in an integrated fashion. In the following sections, the SVM and other steps designed for progress tracking are presented.

Reconstructing Underlying As-Built Representation Using Structure-from-Motion

Recently, the inventors sparsely reconstructed and visualized the as-built scene from unordered daily photographs. The work is based on a SVM technique (276) to automatically reconstruct an as-built point cloud model from a set of images (no manual intervention at any stage). Execution of the SVM algorithm may include the following steps: (1) analyzing images and extracting Scale-Invariant Feature Transform (SIFT) feature points from images; (2) matching image features across the image set; (3) finding an initial solution for the 3D locations of these features points, calibrating cameras for an initial image pair and reconstructing the rest of the observed scene plus estimating motion of the cameras based on a bundle adjustment algorithm; and (4) registering point cloud models that are generated for each day to build a 4D as-built model that includes the passage of time.

Figure 3:
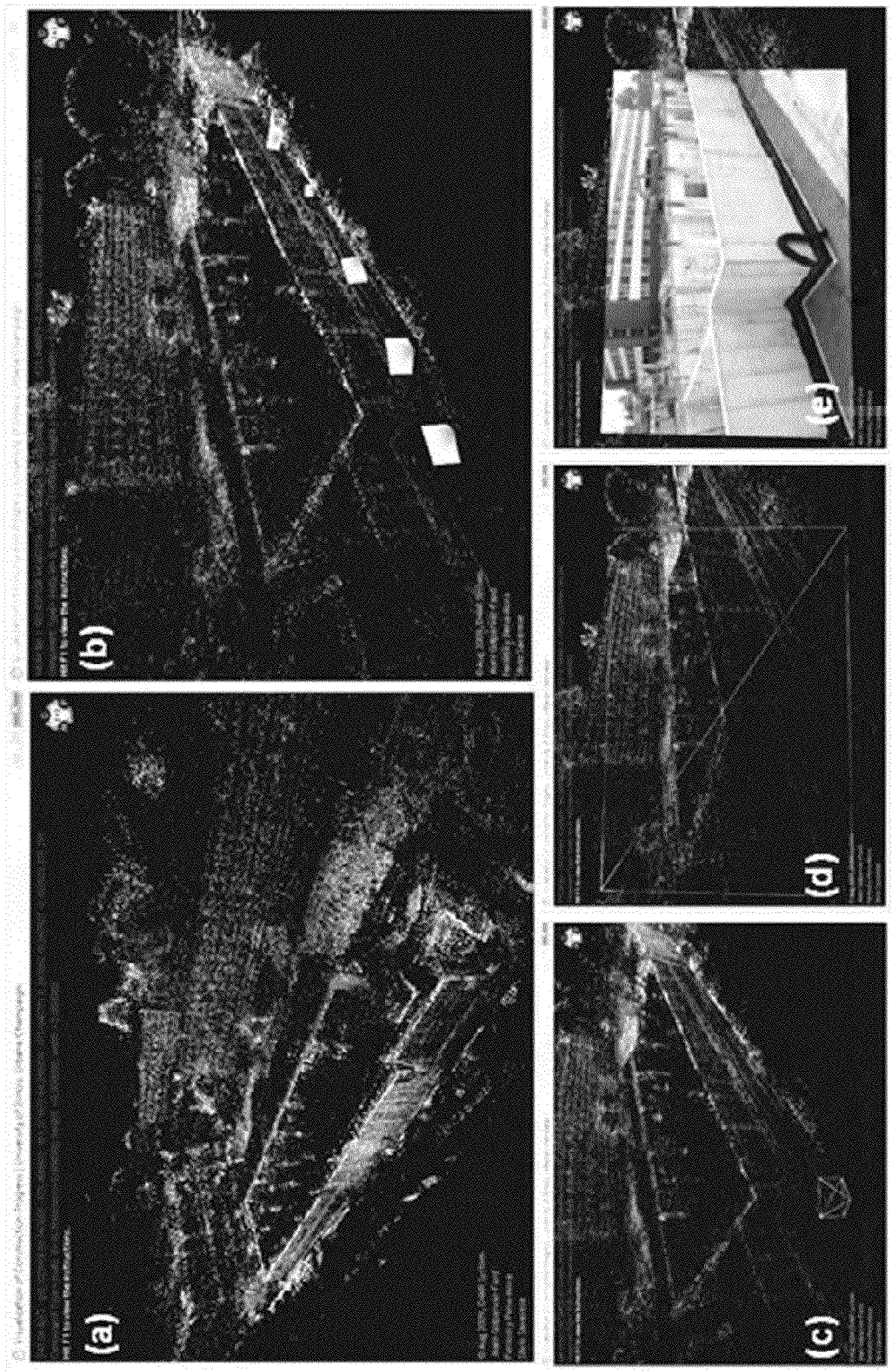
FIG. 3 is a series of images: (a) synthetic bird-eye-view of the as-built point cloud model reconstructed; (b) five camera frustra representing location/orientation of a superintendent when site photographs were taken; (c) one camera frustum is rendered and its location/orientation is visualized; (d) an as-built point cloud observed through camera frustum (same camera as (c)); and (e) camera frustum textured visualizing photograph registered over the 3D point cloud.

To present how these steps are formed, two sets of 112 and 160 images were chosen that were taken on Aug. 20 and Aug. 27 of 2008 during construction of the Ikenberry Residence Hall (RH) in Champaign, Ill. In both cases, a field engineer causally walked along the sidewalk of the project and took images within a few minutes. FIGS. 3(*a*) and 3(*b*) represent the sparsely reconstructed scene from the same image subset and illustrate five registered cameras in the D⁴AR environment. Once a camera is visited, the camera frustum may be texture-mapped with a full resolution of the image so users (i.e., owner, project executive, or the architect) can interactively zoom in and visually acquire information on progress, quality, safety and productivity as well as workspace logistics of a construction site. FIGS. 3(*a*) and 3(*b*) visualize the as-built point cloud model from synthetic views. FIG. 3(*c*) shows location of a camera frustum. FIG. 3(*d*) shows the site through the same camera viewpoint. FIG. 3(*e*) demonstrates the image textured on a viewing plane of the camera.

Aligning the As-Built and As-Planned Models

In order to align the as-built point cloud model with the as-planned model, transformation between these two Cartesian coordinate systems may be found. For alignment of an as-built point cloud model that is reconstructed from photos collected at a time (t), an as-planned model that shows progress up to time ($t_0$) ($t_0 \leq t$) may be used. The alignment transformation may be formed as a rigid-body motion and hence may be decomposed into rotation and translation. In SVM, however, the scale may be unknown. In addition, the point cloud model produces a significantly large number of points that do not belong to the building model itself (e.g., generated from the façade of surrounding buildings, machinery, or even people and plants on or around the site). Further, the vertices extracted from the as-planned model are also very sparse and thus may not reveal a good representation of the expected progress. Therefore, in the proposed approach, the users may be allowed to select a set of corresponding control points from the as-built point cloud or the registered imagery and have those associated with the as-planned model. These points could be surveying control points or a set of points that represent the geospatial location of the site. In the case studies presented herein, these points are mostly chosen from corners of the foundation walls and columns as their detection and correspondence may be visually easier.

The unknown uniform scaling adds one more degrees of freedom to the original transformation problem (overall 7 Degrees Of Freedom (DOF)). Therefore, three points known in both coordinate systems may be theoretically sufficient to permit determination of these seven unknowns. In practice, however, these measurements are not exact; and, if more than three points are used, greater accuracy may be sought. By adding additional points, instead of directly solving the transformation that exactly maps the measured coordinates of points from one system into the other, the sum of squares of residual errors may be minimized. Let there be n points from an as-planned and as-built model for registration. The points in these coordinate systems may be denoted by $\{r_{b,i}\}$ and $\{r_{p,i}\}$, respectively, where i is the number of corresponding points which ranges from 1 to n, and $r_{p,i}$ be the Cartesian coordinates of the as-built and as-planned model, respectively. The transformation has the following form Equation (1):

$$r_p = sR(r_b) + T \tag{1}$$

where s is a uniform scale factor, T is the translational offset and $R(r_b)$ is the rotated version of the planned model. Minimization of the sum of the squared errors is formulated as:

$$\Sigma_1^n \|e_i\|^2 = \Sigma_1^n \|r_{i,p} - sR(r_{i,b}) - T\|^2 \tag{2}$$

To solve for this transformation, a closed-form solution provides a least square problem of absolute orientation. The error ($\Delta e$) can be measured in mm using the following formula, Equation (3):

$$\Delta e_{mm} = \overline{w}_{CCD,mm} \times \Delta e_{pixels} / \overline{w}_{pixels} \tag{3}$$

where $\Delta e_{pixels}$ is the error in pixels, $\overline{w}_{pixels}$ is the image width in pixels and finally $\overline{w}_{CCD,mm}$ is the CCD (Charged Coupled Device) width of a camera in mm. Images used in the as-built reconstruction module do not necessarily need to be shot with the same camera. Rather, for each image (and/or camera), the focal length and the CCD width may be initialized for the SVM process through extracting the EXIF tag of JPEG images. Later on, the focal length may be accurately calculated through the Bundle Adjustment stage. In the proposed approach and the developed system, the user may only need to initially register the as-planned and as-built models. From then after, any new point cloud model may only need to be registered to the underlying point cloud models. In order to automatically register several point clouds, an Iterative Closest Point (ICP) algorithm that may also solve for scale is developed. For initialization of the ICP algorithm, Scale-Invariant Feature Transform (SIFT), feature key points from the previous as-built reconstruction may be used.

The ICP algorithm and SIFT method may automatically find a random set of points from each point cloud model and automatically align the new point cloud model to the former one, in turn having the new point cloud model registered with the as-planned model. This generates 4D as-built point cloud models wherein the user can navigate the as-built scene both spatially and chronologically. The 4D as-built point cloud models registered with the 4D as-planned models also enable the expected and the actual project schedules to be compared.

Figure 4:
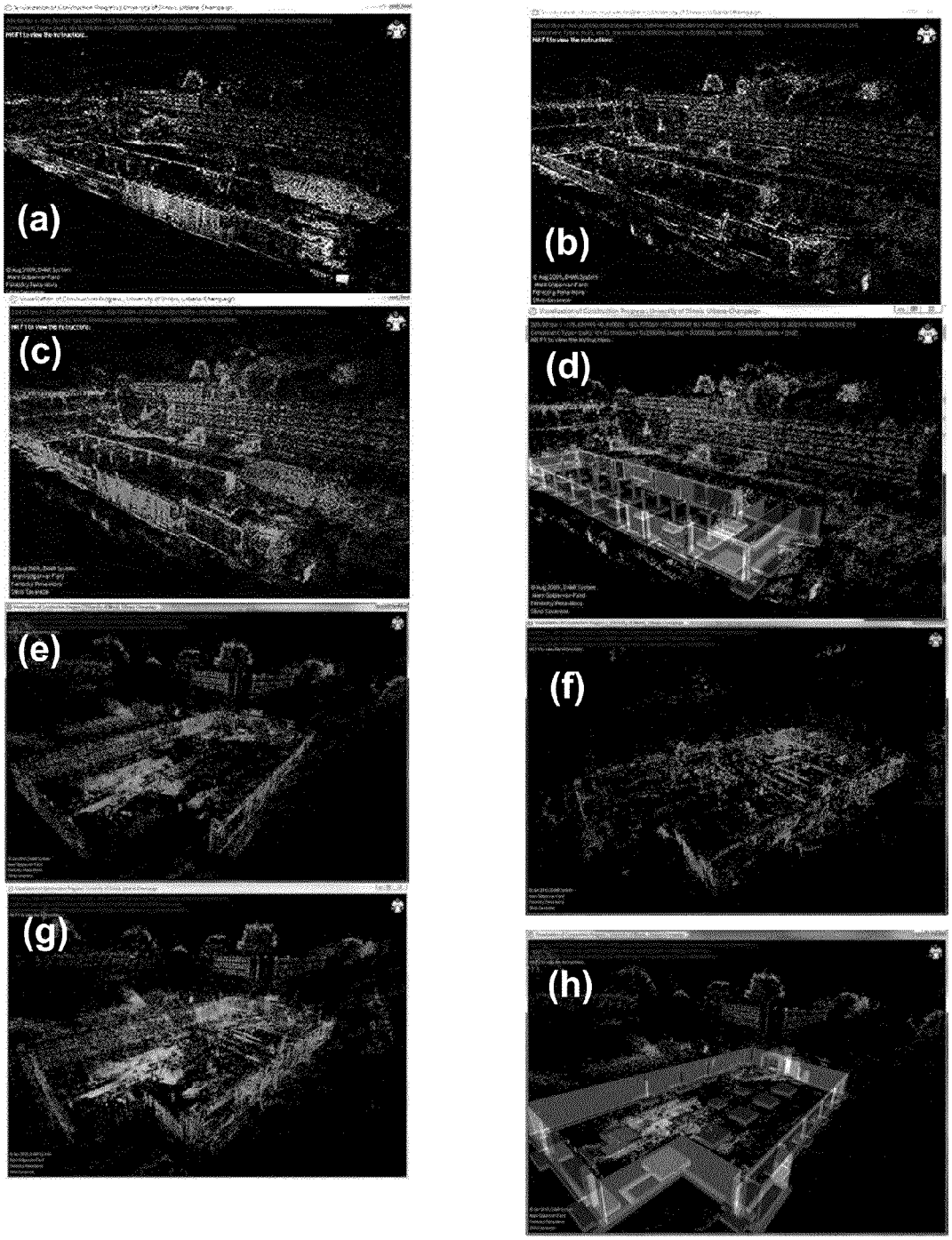
FIG. 4 is a series of images showing point cloud to point cloud and point cloud to Building Information Model (BIM) registrations: (a) point cloud model reconstructed from 112 images from residence hall (RH) project (Aug. 20, 2008); (b) point cloud model reconstructed from 160 images from RH project (Aug. 27, 2008); (c) superimposed point clouds with violet point cloud as (a) and orange point cloud as (b); (d) registration of BIM with point cloud in (b); (e) point cloud reconstructed from 288 images from SD project (Jul. 7, 2008); (f) point cloud model reconstructed from 118 images from SD project (Jul. 24, 2008); (g) superimposed point clouds with red point cloud as (e) and blue point cloud as (f); (h) registration of BIM with point cloud in (e).

FIG. 4 shows eight snapshots from the two case studies: RH (Residence Hall—FIGS. 4(*a*) through 4(*d*)) and SD (Student Dining—FIGS. 4(*e*) through 4(*h*)) construction projects. In FIGS. 4(*a*) and 4(*b*), the 3D point clouds are reconstructed using 112 and 160 photographs collected from, respectively, outside of the RH basement along the side-walk and in FIGS. 4(*e*) and 4(*f*) the 3D point clouds are reconstructed using 288 and 118 photographs collected from, respectively, inside and around the SD basement. Finally, in FIGS. 4(*d*) and 4(*h*), registration of IFC-based BIM with a point cloud model in FIGS. 4(b) and 4(e) is visualized. Table 1 reports high accuracies for both point cloud/point cloud and point cloud/BIM registrations. In the disclosed approach, the registration accuracy may be insensitive to how the control points are selected. Since usually more than the minimum number of control points (three) is selected, such interactive selection errors are minimized.

TABLE 1

Registration errors measured on reconstructions shown in FIG. 4.

| RH Project | Test Case # | BIM + point cloud (4-a) | BIM + point cloud (4-b) | Point clouds (a) and (b) |
|---|---|---|---|---|
| RH#2 | Image Size | 2144 × 1424 | 1715 × 1139 | — |
|  | # of feature points | 62,323 | 43,400 | — |
| RH#3 | # of corresp. Points | 7 | 7 | Randomly chosen by ICP |
|  | $\Delta e_{mm}$ | 0.20 mm | 0.65 mm | 0.43 mm |

| SD Project | Test Case # | BIM + point cloud (4-e) | BIM + point cloud (4-f) | Point clouds (e) and (f) |
|---|---|---|---|---|
| SD #1 | Image Size | 2144 × 1424 | 2573 × 1709 | — |
|  | # of feature points | 61,638 | 31,661 | — |
| SD #2 | # of corresp. Points | 9 | 9 | Randomly chosen by ICP |
|  | $\Delta e_{mm}$ | 0.73 mm | 0.69 mm | 0.70 mm |

Automated Progress Monitoring Problem Setup and Notation

In order to detect progress, the integrated as-built and as-planned scene ($\Omega$) may be discretized into a finite set of opaque voxels (volume element in space) along the dominant Euclidean axes. This discretization is in form of $n_x\delta_x \times n_y\delta_y \times n_z\delta_z$ wherein each voxel (v) occupies a finite homogenous volume of the scene $(\delta_x,\delta_y,\delta_z)$ and has a consistent visual appearance. This approach enables and supports progress reasoning in small volumes of space. In the proposed model, voxels may be assumed to be equilateral; therefore, the resolution of the voxel grid may be determined by $\delta$. Given an image $\Pi_i$ $proj_i(v)$ may be used to denote the re-projection of the voxel over the image i. The eight defining corners of each voxel may be projected into the image 2D plane. Next, the bounding values for each axis may be kept to form the 2D re-projection bounding box. The following formulas may be used to represent this transformation:

$$\forall k \in \{1, 2, \ldots, 8\} \rightarrow \begin{bmatrix} u \\ v \\ 1 \end{bmatrix}_k = K_i [R_i \mid T_i] \begin{bmatrix} x \\ y \\ z \\ 1 \end{bmatrix}_k \quad (4)$$

$$proj_i(v) = [\min(u_k, v_k) \ldots \max(u_k, v_k)] \quad (5)$$

wherein k is the index of the voxel corners, and $K_i$, $R_i$, and $T_i$ are the intrinsic camera parameters, rotation and translation, respectively, of the camera i in the scene.

Voxel Traversing and Labeling

The next step may be to traverse the integrated as-built and as-planned scene. In this process, each voxel may be assigned two sets of labels (as-built and as-planned) as well as a color. Within this step, the expected and actual progress of each voxel is sensed. The system may need to traverse the voxels in a certain order; otherwise, the reconstruction results may not be unique. In order to address this issue, an ordinal visibility constraint may be introduced to allow locating certain invariant voxels whose colorings are uniquely defined. Rather than only using this constraint to address uniqueness of the solution, the proposed approach finds the voxels that are occupied by as-built and as-planned components and are visible from the set of cameras (i.e., observable progress). As a result of this constraint, voxels are traversed in an increasing distance from the set of cameras.

First, the voxels in the layer immediately adjacent to the camera may be visited; then all voxels that are in the next layer immediately adjacent to the first layer may be visited. Using this approach, when a voxel is visited, all other voxels that can occlude the current one from the set of cameras may already be visited. This strategy proactively considers static and dynamic occlusions from the set of cameras and labels and colors each voxel based on a consistent visibility from projections of a voxel on all images.

Before traversing the scene, the integrated as-built and as-planned scene may be transformed to a new coordinate system wherein the axes are aligned with the dominant axes of the as-planned site. This may minimize the search space, since reasoning for expected progress may only need to be executed in areas in which observable progress is expected. To consider for ahead-of-schedule activities, this area may only contain those BIM components that are expected to be observed from the 3-week look-ahead schedule; i.e. (1) the work breakdown structure is more detailed; (2) the elements that are not yet constructed has a smaller chance of self-occluding the as-planned model.

Figure 5:
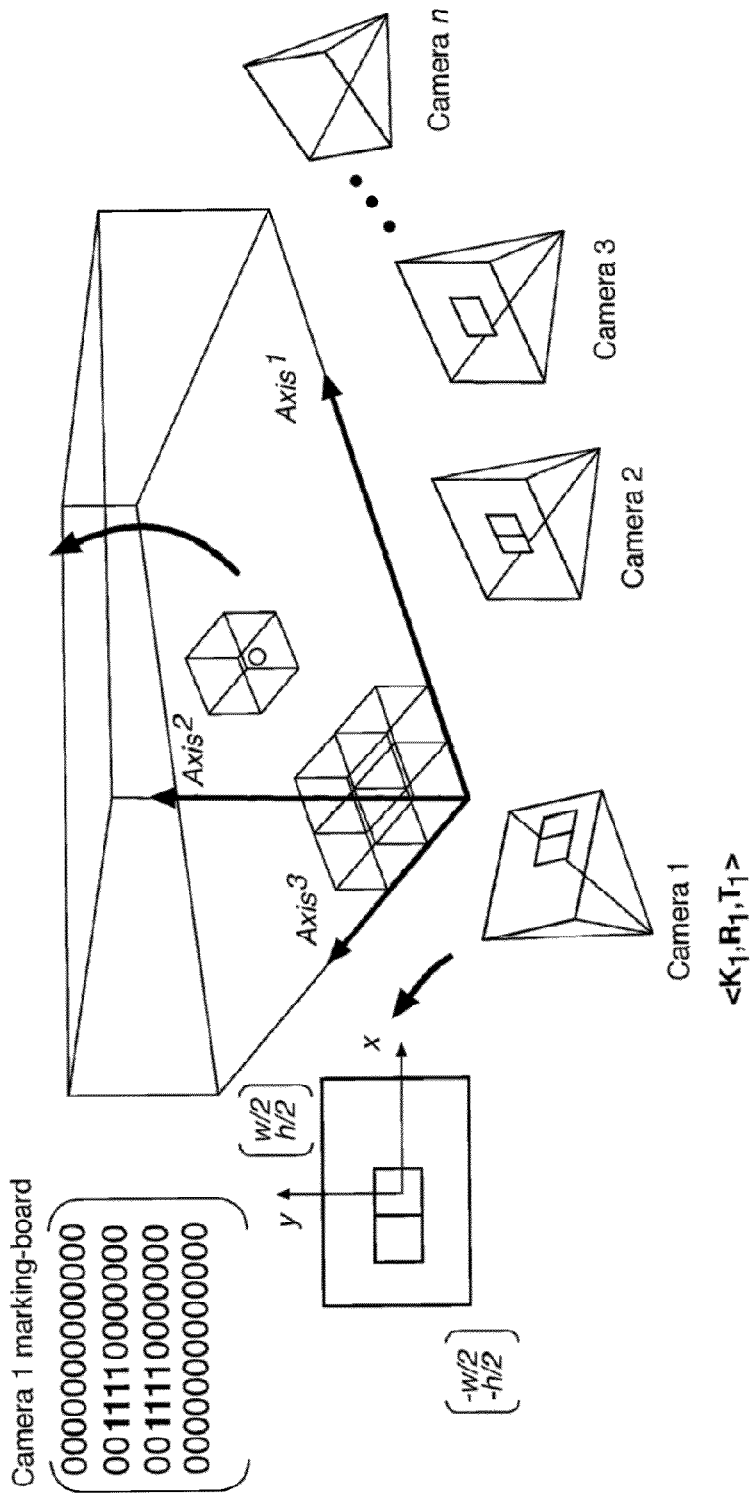
FIG. 5 is a graphical representation of as-built site and camera configurations showing re-projections of the voxel on camera frusta 1 and 2; marking for camera-1 shown on the left side; where the voxel is detected as Occupied; and where pixels shown as belonging to re-projection of the voxel on all images are marked "1."

Thus, the scene may be traversed from the closest voxel to the convex hull of the cameras (rough approximation of the scene boundaries) in a plane normal to the convex hull and eventually in a front-to-back order. See FIG. 5, axis 1 to 3 directions. In the case where the camera goes all around the building, the voxels may be analyzed in an increasing distance from the set of cameras. All the voxels that are in the layer immediately adjacent to the camera convex hull are visited. Subsequently, all the voxels in the next layer immediately adjacent to the first layer may be analyzed. This process is repeated until all voxels are visited. In this case, where the cameras are all looking outward in a similar fashion, the voxels that are in the layer immediately adjacent to the camera convex hull may be first visited. Subsequently, voxels in the succeeding layers adjacent to the first layer may be analyzed layer by layer. As the algorithm marches through the voxels, the visibility constraint may be verified. The labeling process may occur as follows: For every voxel ($v_{i,j,k}$) in the scene, two sets of labels $l(v_{i,j,k})$ may be defined: (1) as-built and (2) as-planned labels. For each image, a marking board may also be generated where each pixel is initially marked with "0" and when a pixel satisfies the consistent visibility constraint, the pixel label may be changed to "1."

As-Built Labeling.

For the as-built scene, the algorithm may first check if a voxel already contains reconstructed SIFT or MVS points. In this case, that voxel is labeled as Occupied ($O_b$), and may be subsequently projected on all images that observe that voxel [Equations (4) and (5)] and if the re-projection (i.e., the boundaries of the voxel projection) falls within the image boundaries, then the pixels inside the projected voxel will all be marked as "1" [See Equation (6)].

$$\forall i \in C_1, \ldots, C_n, \text{ if } proj(v_k) \in \left\{ \begin{bmatrix} -w/2 \\ -h/2 \end{bmatrix} - \begin{bmatrix} w/2 \\ h/2 \end{bmatrix}_i \right\} \rightarrow \qquad (6)$$

$$\forall m, n \in proj_i(v_k), Mark_i(m, n) = 1$$

If a voxel does not contain reconstructed SIFT or MVS points (which is more often the case), the visual consistency may be controlled. In the absence of noise or quantization effects, an occupied as-built voxel that is at least partly visible from an image may have an equal radiance on all projected pixels. In presence of these effects, correlation of pixel radiances may be evaluated to quantify voxel consistency:

$$\lambda_v = \frac{(n-1)SD^2}{\sigma_0^2} \leq thresh \qquad (7)$$

where SD is the standard deviation of color values, $\sigma_0^2$ is the accuracy of irradiance measurement (sensor color measurement error), and n is the number of images that observe the voxel. If $\lambda_v$ is less than a maximum allowable correlation error (thresh), that voxel may be labeled as visually consistent ($O_b$); then the labeled voxel may be projected on all observing images and the pixels associated with the voxel on the marking-board may be labeled accordingly. In the conducted experiments, there may be a minimum allowable number of re-projected pixels for each voxel from all images (n>20 pixels). If the consistency control on the pixel radiances is not satisfied, the voxel may be labeled as Empty ($E_b$), and finally, if the condition on the minimum allowable number of pixels is not satisfied, e.g., the voxel may be occluded from all views and hence the voxel is denoted as Blocked ($B_b$). In the experiments conducted for this paper, thresh was set to 1. This threshold is computed through a trade-off on completeness versus accuracy for as-built reconstruction. The strategy of marking voxel projections by generating a marking-board for each image accounts for both complete and partial occlusions.

Figure 6:
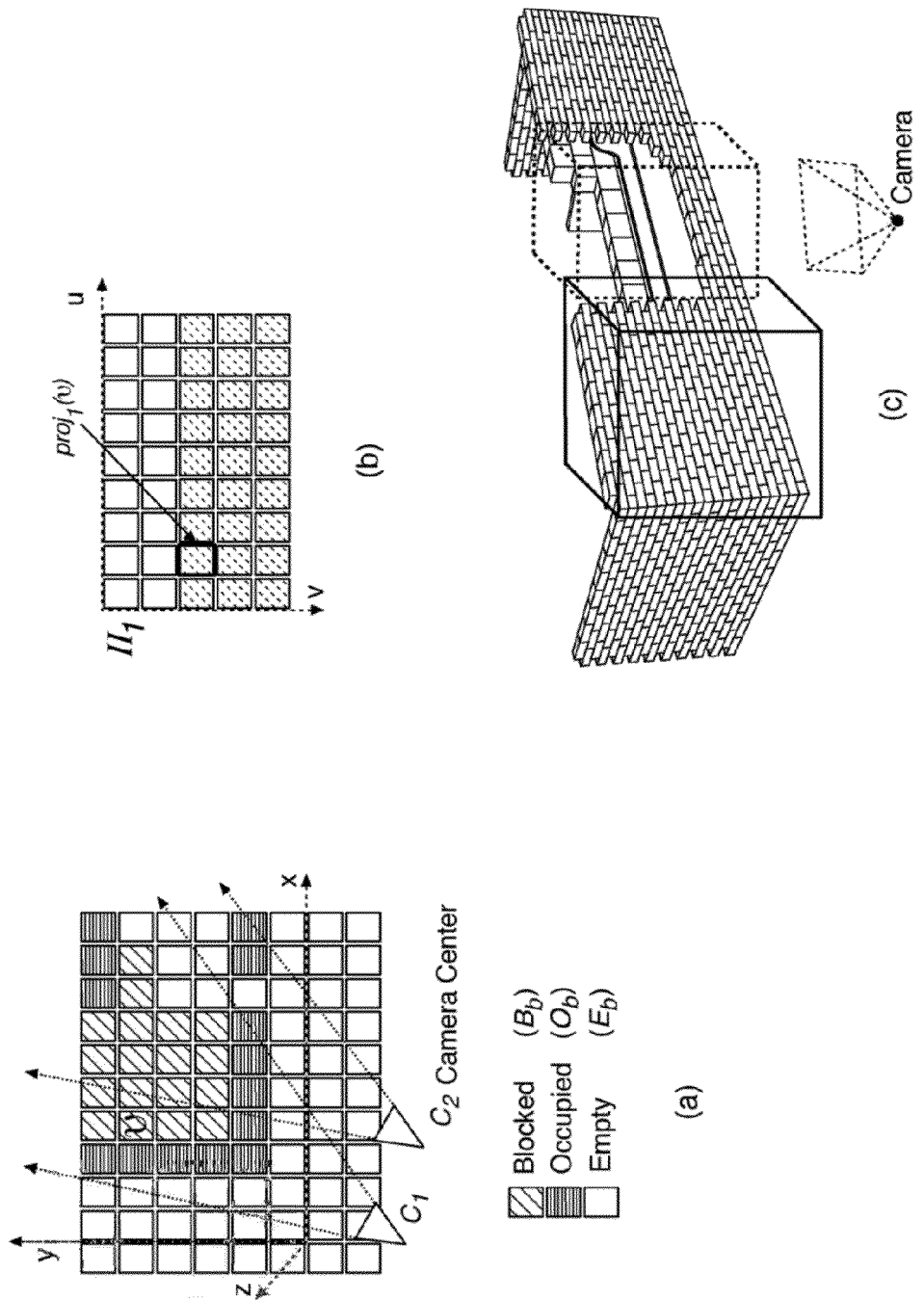
FIG. 6 is a diagram showing: (a) plan view of discretization of a scene to voxels along dominant axes, each voxel with respect to displayed camera configuration is either occupied (Op), blocked (Bb) or empty (Eb); (b) image 1 (Π1) from camera configuration in (a) is shown, wherein proj1(v) displays the projection of voxel (v) from (a) over Π1 which is marked (color coded different from unmarked voxel re-projections); and (c) progress versus unchanged observations.
Figure 10:
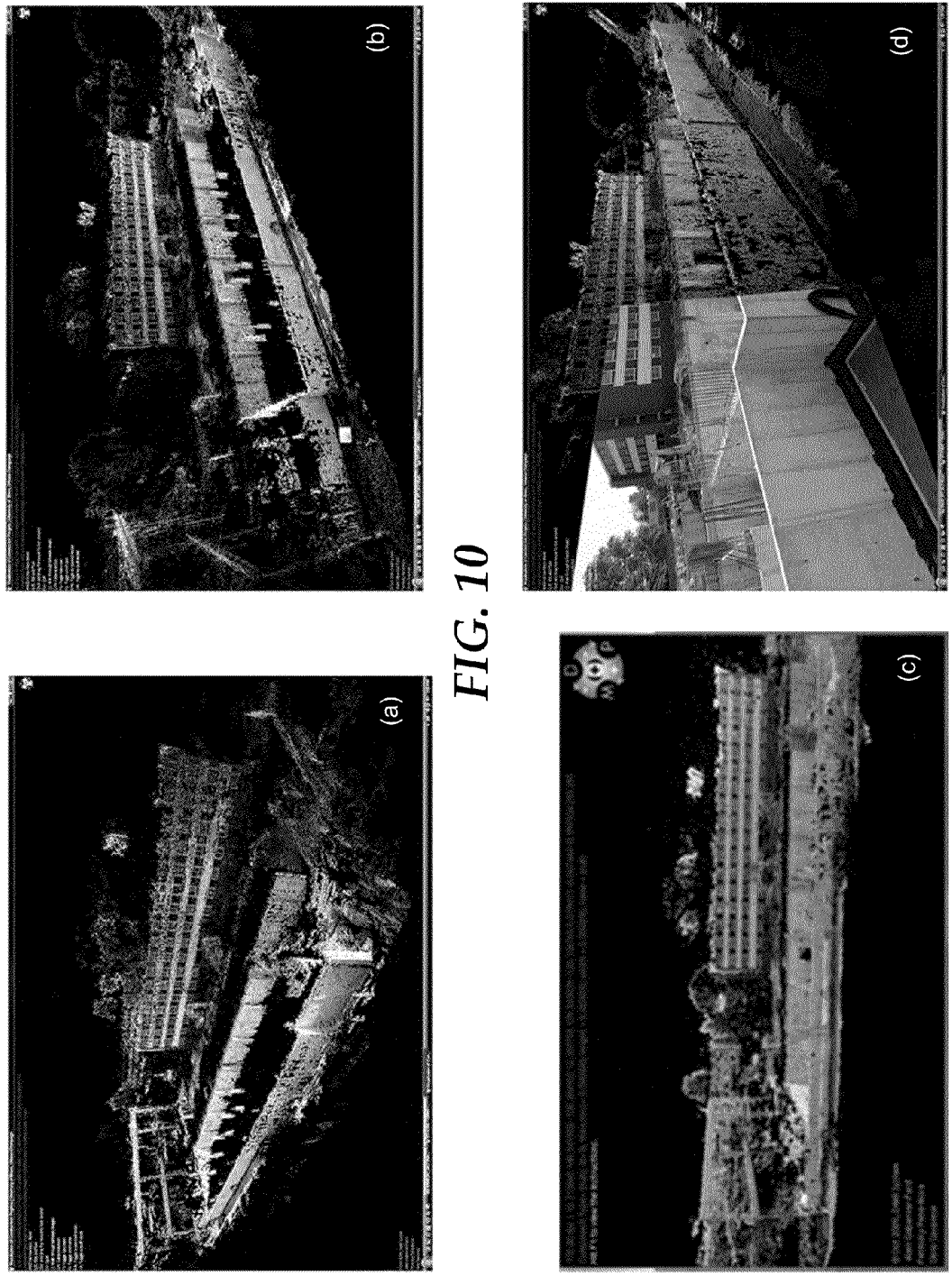
FIG. 10 is a series of images that illustrate the dense, as-built reconstruction for the same RH dataset presented in FIG. 4(b).
Figure 11:
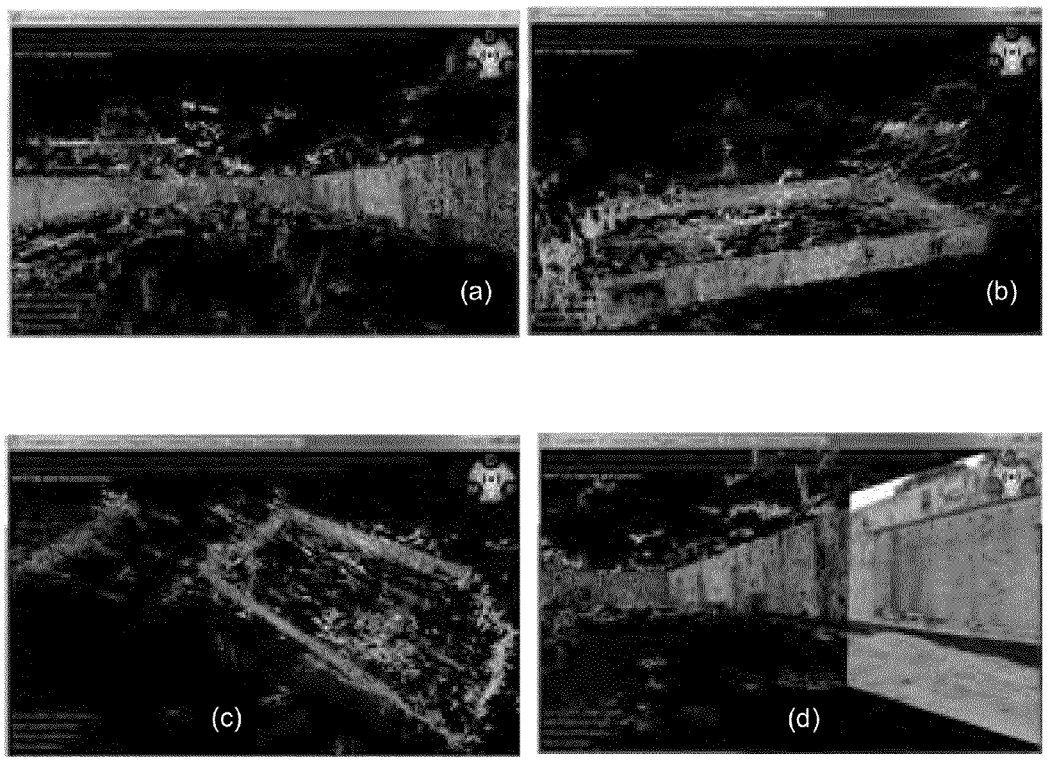
FIG. 11 is a series of images that represent the dense reconstruction of the SD dataset.

This process has at least three outputs. First, all voxels may be labeled in the as-built model as [$O_b|E_b|B_b$] (visually consistent (occupied), empty or blocked), enabling reasoning about presence of full and partial occlusions (both static and dynamic). Second, a dense point reconstruction may be created through joint visualization of the sparse point cloud and the centroid of all occupied voxels. Third, the as-built range images may be created based on observations. FIG. 6(a) shows a plan-view of voxel labeling while in 6(b) re-projected voxel shown in 6(a) is marked on the image as $proj_i(v)$. In FIG. 6(c), the unchanged versus progress observation concept is visualized. FIG. 7 summarizes the as-built occupancy/visibility labeling and marking algorithm, Algorithm 1. If a voxel contains at least one feature point or has consistent visual appearance, it will be labeled as occupied where 20 is the minimum number of unmarked pixels expected per projection of each voxel.

As-Planned Labeling.

The as-planned model by itself accounts for static occlusions. Nonetheless, in order to consider dynamic occlusions, the non-overlapping areas of the as-built scene (e.g., reconstruction of excavators, temporary structures) are placed over the corresponding as-planned voxels. The as-planned scene is traversed in a similar fashion to that of the as-built. Hence, if a voxel has at least one of its corners inside an IFC element, that voxel may be labeled as Occupied [$O_p$]. Subsequently the voxel may be projected on all images that observe it and the corresponding pixels on a similarly generated as-planned marking-board may be marked with "1." In this case, the depth value of each voxel is kept as another marking layer for the image.

Based on location and depth of all IFC elements, the disclosed as-planned labeling strategy automatically generates as-planned depth maps and segments images into visible IFC elements. In case of non-overlapping as-planned and as-built areas, the consistency from the as-built marking layer is controlled. Those voxels that pass the consistent visibility check may be projected on the images and their corresponding pixels may be marked. This projection may further consider occlusions because if a voxel projection contains a minimum number of unmarked pixels, than the voxel can be labeled as Visible [$V_p$]. As mentioned previously, in the proposed model, all labels are independent from one another and are marked with binary values (either 1 or 0). In addition to labeling voxels, image pixels may also be marked so that if a pixel is observed, the pixel is labeled with '1' and if not observed, remains as '0.' See FIG. 5, left side. Such labeling enables reliable and consistent reasoning about progress in full and partial visible areas. FIG. 8 summarizes the as-planned occupancy/visibility labeling and marking algorithm, Algorithm 2. If a voxel is filled by an IFC element, it will be labeled as occupied and if it is observable from at least one camera, it may be marked as Visible where 20 may be the minimum number of unmarked pixels expected per projection of each voxel, for example.

Probabilistic Model for Progress Detection and Discriminative Learning

Once partial visibility and occlusion as well as the as-built and as-planned occupancies are labeled across the scene, the progress detection may be formulated. In the proposed progress detection model, progress (observation per expected as-planned element i) may be formulated as a binary value ($E^i$): $E^i=1$ if progress is detected and $E^i=0$ if not. First, for the purpose of generating a proper baseline for progress monitoring, and given the underlying level of detail in the 4D BIM, the underlying IFC-based 4D BIM may be broken down into several independent elements.

For example in case of "FPRS basement concrete columns" activity, the progress detection algorithms may need to check the observation of expected columns attached to this activity (Elements i as $E^i$). Assume that each element $E^i$ attached to this activity includes n voxels. A set of probability events may be introduced. For example, within a given volume in the scene ($\omega_i$): let $\eta$ be the event of observing an as-built element (any tangible physical element), $\theta_p$ be the event of observing as-planned element and $\theta_T$ be the event that an as-planned element is expected to be observed from the 4D as-planned model. The probability of observing progress for element $E^i$ associated with a given scheduled activity (duration=n days) may be defined as a conditional probability of the form:

$$P(\eta^i | \theta_T^i) = \frac{P(\theta_T^i | \eta^i) P(\eta^i)}{P(\theta_T^i)} \qquad (8)$$

where $P(\theta^i_T|\eta^i)$ is the probability of observing the expected as-planned element given some evidence of occupancy; $P(\eta^i)$ is the probability of observing the as-built element (a function of confidence in coloring and labeling of the voxel, as well as those occupied voxels that belong to the as-built element— the current system assumes this is equal to "1"); and $P(\theta^i_T)$ is the probability of observing the expected progress for element i. For each element under an ideal situation, where there is no occlusion and no partial visibility, each of these probabilistic values can be directly measured; however, since occlusions are predominant, these probabilities need to be measured within the expected volume of observable progress. In this case, each of these probabilities may be computed as follows:

For the as-built:

$$P(\theta_T^i \mid \eta^i) = \left[\frac{\sum O_b}{\sum O_b + \sum E_b}\right]_{\theta_P^i} \quad (9)$$

For the as planned:

$$P(\theta_P^i) = \left[\frac{\sum V_p}{\sum O_p}\right]_{\theta_P^i} \quad (10)$$

$$P(\theta_T^i) = \left(\frac{t}{d}\right) V \quad (11)$$

where $P(\theta_p^i)$ is the expectation of observable progress for element i (percentage of visibility from the camera set), d is the total duration of construction activity, t represents the $t_{th}$ day within this duration (d), and V is the volume of the expected as-built element. In other words, Equation (9) represents the percentage of voxels that are occupying the expected visible voxels for the element i; Equation (10) measures the percentage of those voxels that are expected to be occupied and are visible; and finally Equation (11) is representing the volumetric percentage of progress for those cases in which monitoring is conducted during the time the element is expected to be completed and is not finished.

In order to classify progress $E^i$ and under the condition of partial visibility of a given as-planned element, $P(\eta^i|\theta^i_T)$ should be compared with a threshold Choosing an optimal value for the threshold for each element may be problematic. For example, given a 10% probability for observing progress $P(\theta_p^i)$ and 25% for observing as-planned elements given an evidence of occupancy $P(\theta^i_T|\eta^i)$, measurement of $P(\eta^i|\theta^i_T)$ may be susceptible to noise and inaccuracy in reconstruction. Therefore, such a measurement perhaps may not be reported as detected progress. This selection of threshold is particularly difficult, because (1) to achieve a desired accuracy, for different element types with different materials, different thresholds should be used; and (2) progress monitoring task with partial visibility is subjective by nature and may need an expert's opinion as to whether it has taken place or not. Thus a machine learning methodology may be used to estimate such dynamic thresholds in a principled way. The threshold (P) may be expressed as:

$$\Gamma^i = f(\theta_p^i(t), p(\eta^i|\theta_T^i), t|d, T_i, \psi(t), \delta, \text{thresh}, \epsilon_{Reg}, \epsilon_{Rec}) \quad (12)$$

where t is construction activity duration from t=0 to d, $T_i$ is the element type (e.g., column, beam, foundation), $\psi(t)$ is the visual appearance of the element i (e.g., concrete, formwork, steel), $\delta$ voxel resolution, thresh the voxel consistency threshold, and $\epsilon_{Reg}$ and $\epsilon_{Rec}$ are the accuracy in registration of as-planned model over point cloud model and the accuracy of underlying reconstruction pipeline.

TABLE 1

Registration errors measured on reconstructions shown in FIG. 4.

| RH Project | Test Case # | BIM + point cloud (4-a) | BIM + point cloud (4-b) | Point clouds (a) and (b) |
|---|---|---|---|---|
| RH#2 | Image Size | 2144 × 1424 | 1715 × 1139 | — |
|  | # of feature points | 62,323 | 43,400 | — |
| RH#3 | # of corresp. Points | 7 | 7 | Randomly chosen by ICP |
|  | $\Delta e_{mm}$ | 0.20 mm | 0.65 mm | 0.43 mm |

| SD Project | Test Case # | BIM + point cloud (4-e) | BIM + point cloud (4-f) | Point clouds (e) and (f) |
|---|---|---|---|---|
| SD #1 | Image Size | 2144 × 1424 | 2573 × 1709 | — |
|  | # of feature points | 61,638 | 31,661 | — |
| SD #2 | # of corresp. Points | 9 | 9 | Randomly chosen by ICP |
|  | $\Delta e_{mm}$ | 0.73 mm | 0.69 mm | 0.70 mm |

For sake of simplicity at this stage, as shown in Table 1, it may be assumed there are minimal errors in (1) as-built and as-planned registration, and (2) the underlying module for as-built reconstruction. The threshold P may be learned by casting the problem into a linear classification problem; that is, by learning the hyper-plane that separates the two classes in a multi-dimensional feature space. The feature space may be defined by $P(\eta^i|\theta^i_T)$, $\theta_p(t)$, t/d, $T_i$, $\psi(t)$, $\delta$, and thresh. The two classes may include progress=1 and no-progress=0. The optimal hyper-plane that separates the two classes may be learned in a supervised fashion using a linear support vector machine (SVM). Once the classifier is learned, given a new observation (that is a measurement of progress $P(\eta^i|\theta^i_T)$) along with the measured features, $(\theta^i_p(t), t/d, T_i, \psi(t), \delta,$ and thresh), the progress binary value may be determined by feeding observation into the classifier and retaining the output.

The progress deviations at individual element level may be expanded to represent deviations at schedule activity level. Progress for a given schedule activity which is linked to n mutually independent elements in the IFC-based BIM may be formulated as:

$$Q = P[\{\eta^i; i=1 \ldots n | \theta_p^i; i=1 \ldots n\}] \quad (13)$$

where $P[\{\eta^i; i=1 \ldots n|\theta_p^i; i=1 \ldots n\}]$ is the probability of observing progress for a schedule activity, given its mutually independent sequence conditions (e.g., construction of column-slab; column-column and column-wall are considered mutually independent). In this case, progress is formulated as Equation (14).

$$q = \frac{\sum_n E^i \times V_p^i}{\sum_n V_p^i} \quad (14)$$

where $V_p^i$ is the volume that is expected to be observed and occupied for each element associated with the construction schedule activity. FIG. 9 summarizes progress detection process for each construction schedule activity.

EXPERIMENTS AND RESULTS

In order to verify the robustness of the proposed reconstruction pipeline, and validate the automated progress detection module, three different experiments are conducted. The image datasets for these experiments were collected under different viewpoint and lighting conditions. These datasets are two photo collections of 112 and 160 images from the RH project and a 288-image dataset from a Student Dining (SD) project. In both RH project datasets, a significant amount of occlusion is observed since the images were not taken from inside the basement area. Rather, the images were all taken along a sidewalk of the project. See locations of the camera frusta in FIG. 3(b). The spatial resolutions of these images were synthetically reduced to about 2M pixels to test robustness of the proposed approach to the quality of images. The voxel resolution was initially set to ⅕ foot (~0.06 m). The IFC-based 4D BIMs for RH and SD projects have relevant schedule activities that are connected to 152 and 321 elements respectively. See FIG. 15 for the relevant part of the RH project schedule. FIGS. 10(a) through 10(d) and FIGS. 11(a) through 11(d) illustrate the results of dense reconstruction for the case presented in FIG. 4(b) (RH 160) as well as the SD project. All the snapshots in this case are taken from synthetic views in a three-dimensional (3D) virtual environment (none of these views exist in an image dataset; rather each is a result of synthetic 3D visualization).

Figure 12:
FIG. 12 is a series of images in which (a) and (d) illustrate the sparse structure-from-motion point cloud models, while (b) and (e) illustrate the dense point cloud which is the result of structure-from-motion and multi-view stereo; (c) and (f) illustrate the result of structure-from-motion, multi-view stereo and voxel coloring/labeling combined.

FIG. 12 illustrates the distinct contribution of the MVS as well as voxel coloring/labeling algorithms on the density of the as-built point cloud models. Compared to MVS, the impact of voxel coloring/labeling in increasing the density of the point cloud is marginal (~5-20%), though it enables the scene and all voxels to be labeled both for expected and actual occupancy and visibility.

Figure 13:
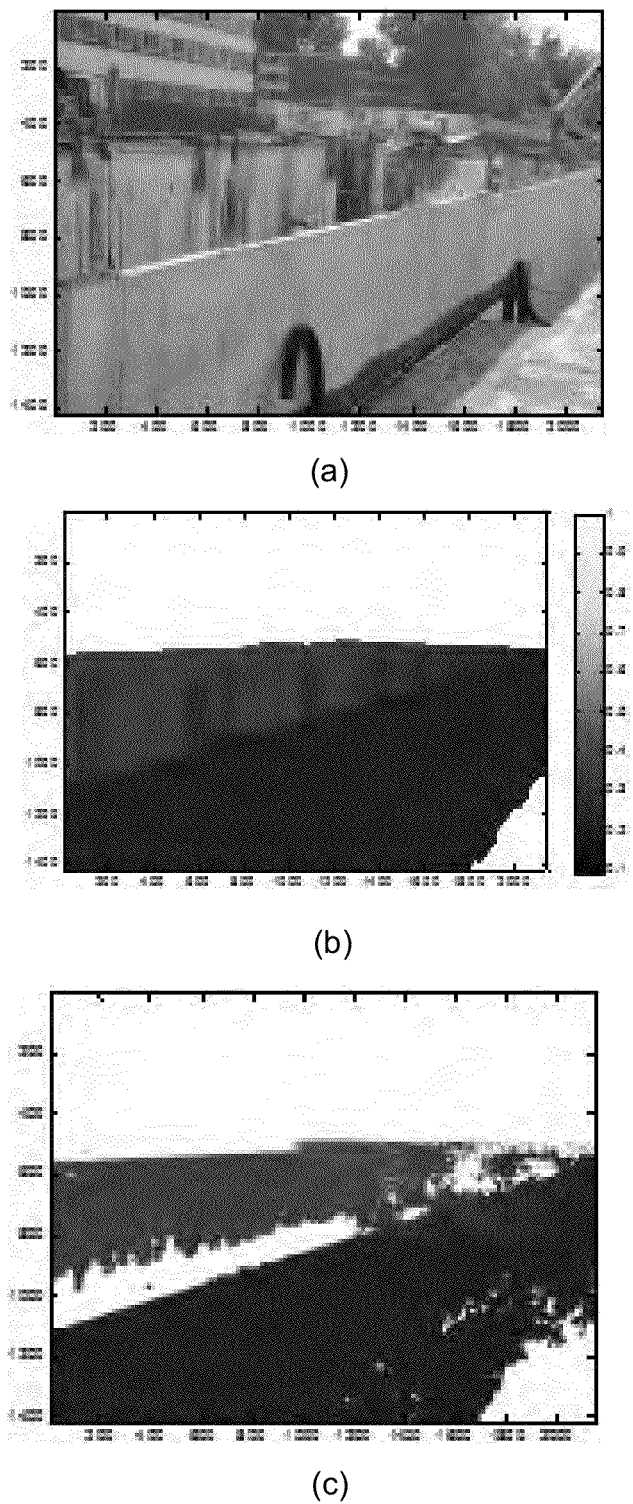
FIG. 13 includes (a) an image taken on the RH project dated Aug. 27, 2008; (b) range image generated for the expected intelligent frame correction (IFC) elements in which color-coding shows the ratio of depth along the camera line-of-sight compared to the rear foundation wall; and (c) the expected as-built progress voxels detected and projected back on the image plane.

FIG. 13 shows the results of traversing, labeling, and re-projecting detected areas of as-built and as-planned environments. For the same image plane shown in FIG. 13(a), range images for both as-planned and as-built environments are generated. Based to the depth from the camera plane, FIG. 13(b) illustrates the re-projection of voxels occupied by the IFC elements. In order to visualize the depth, a color-coding scheme is represented where depth is visualized in relationship to the furthest elements from the camera plane (in this case, the rear foundation wall). In FIG. 13(c), the consistently observed as-built voxels are re-projected back. A combination of FIGS. 13(b) and 13(c) allows specific areas within each image—where IFC-elements are supposed to be observed—to be automatically segmented and visualized. Automatic segmentation and visualization may robustly take occlusions into account as all the elements that are located closer in the line-of-sight to the camera may be be detected first (ordinal visibility constraint introduced in this research). Such detection may further enable a texture recognition algorithm to be created to detect $P(\eta^i)$ and account for progress details accordingly. For example, consider a concrete foundation wall that will be further prime-coated and insulated. Since the system is based on an IFC as-planned platform and is linked to the schedule, expected progress information may be queried from the 4D BIM and given the time the image is captured (extracted from the EXIF tag of the JPG image) and which the visual appearance of the surface will be known.

Automated Detection Accuracy

In the conducted experiments, performance of progress the detection model may be analyzed using a number of common object recognition metrics. Particularly the following metrics may be used. First, recall may be used, which may include the fraction of recognized IFC-model elements (TP=true positive) relevant to the total number of model elements that are used for the detection model (TP+FN=true positive+false negative). Recall may show the sensitivity of the detection model. Second, precision may be used, which may include the fraction of relevant IFC-model elements relevant to the total number of model elements that are recognized (TP+FP=true positive+false positive). In the proposed approach, the SVM kernel machine classifies progress with a binary value (progress/no progress).

In experiments, the SVM model was trained over the RH 112 image dataset and the hyper-plane that separates the progress/no-progress categories was automatically learned. The results from the experiments show that if visibility (the observable part) of an as-planned element is less than 20% and the volumetric reconstruction is only able to reconstruct 50% of that observable part, progress may not be detected. The performance of the training is cross-checked by asking two field engineers and a superintendent to label the classification results. The accuracy of training was experienced to be 87.50%. Table 2 shows an example of how SVM classification has been accounted for two classes of concrete columns and foundation walls. In this example, the detection feature vector values are shown. In the proposed approach, as more experiments are conducted, the outcomes can be added to increase the accuracy of the SVM linear classifier. The performance of the classifier is further tested and validated on RH 160 and SD 288 image datasets. The results of average accuracy for the experimental datasets are presented in Table 3.

TABLE 2

Supervised SVM learning of the detection threshold for $T_i$ = (i = 0 column; i = 1 wall) and $\Psi(t)$ = concrete.

| Γ  | $\theta_p(t)$ | $p(\eta\|\theta_T)$ | t/d  | T | δ    | th |
|----|------|------|------|---|------|----|
| −1 | 0.16 | 0.16 | 1.00 | 0 | 0.20 | 1  |
| −1 | 0.24 | 0.84 | 1.00 | 1 | 0.20 | 1  |
| +1 | 0.32 | 0.75 | 1.00 | 0 | 0.20 | 1  |
| +1 | 0.35 | 0.84 | 1.00 | 1 | 0.20 | 1  |
| −1 | 0.36 | 0.24 | 1.00 | 0 | 0.20 | 1  |
| +1 | 0.36 | 0.71 | 1.00 | 1 | 0.20 | 1  |
| +1 | 0.37 | 0.80 | 1.00 | 0 | 0.20 | 1  |
| +1 | 0.41 | 0.79 | 1.00 | 1 | 0.20 | 1  |
| −1 | 0.43 | 0.21 | 1.00 | 0 | 0.20 | 1  |
| +1 | 0.46 | 0.89 | 1.00 | 1 | 0.20 | 1  |
| +1 | 0.49 | 0.88 | 1.00 | 0 | 0.20 | 1  |
| +1 | 0.51 | 0.85 | 1.00 | 1 | 0.20 | 1  |
| −1 | 0.52 | 0.25 | 1.00 | 0 | 0.20 | 1  |
| −1 | 0.57 | 0.43 | 1.00 | 1 | 0.20 | 1  |
| +1 | 0.63 | 0.75 | 1.00 | 0 | 0.20 | 1  |
| +1 | 0.71 | 0.89 | 1.00 | 1 | 0.20 | 1  |

TABLE 3

Average accuracy of SVM binary detection for training and testing datasets.

|          | Dataset | # of images | # of IFC elements | Detection accuracy |
|----------|---------|-------------|-------------------|--------------------|
| Training | RH #2   | 112         | 152               | 87.50%             |
| Testing  | RH #1   | 160         | 152               | 82.89%             |
|          | SD      | 288         | 321               | 91.05%             |

The correlation between progress which is expected to be detected, (P(θTi|ηi)) and the expected observable regions, (P(θpi)) was also studied. FIG. 14(a) shows the results of the experiment on the RH 112 training dataset. As the figure indicates, a majority of false detections happen for below 20% of the observable progress $P(\theta pi)$. This further illustrates that in presence of severe occlusion and poor reconstruction, no decision on progress should be made. To further investigate the sensitivity of the detection model to presence of occlusions, the relationship between the accuracy to the percentage of visibility was studied. As observed from FIG. 14(b), there is no linear relationship between the percentage of occlusion and the accuracy of automated progress detection. Rather, the relationship between observed $P(\theta Ti|\eta i)$ and the expected observable $P(\theta pi)$, controls how the "progress" and "no-progress" categories are classified. Based on several experiments with different levels of occlusion, the standard deviations of the detection accuracies are calculated and visualized in this figure.

In order to examine the precision and sensitivity of the detection model, precision-recall and true-positive/false-positive graphs may be further analyzed. FIG. 15 illustrates the results over the experimental datasets. These graphs are only drawn for the elements that were expected to be detected and not for those elements that are fully occluded. Given the formation of this approach with a significant amount of occlusion in the dataset in the training dataset, the results seem promising, yet it shows the approach is not sensitive to formation of the hyper-plane.

Figure 16:
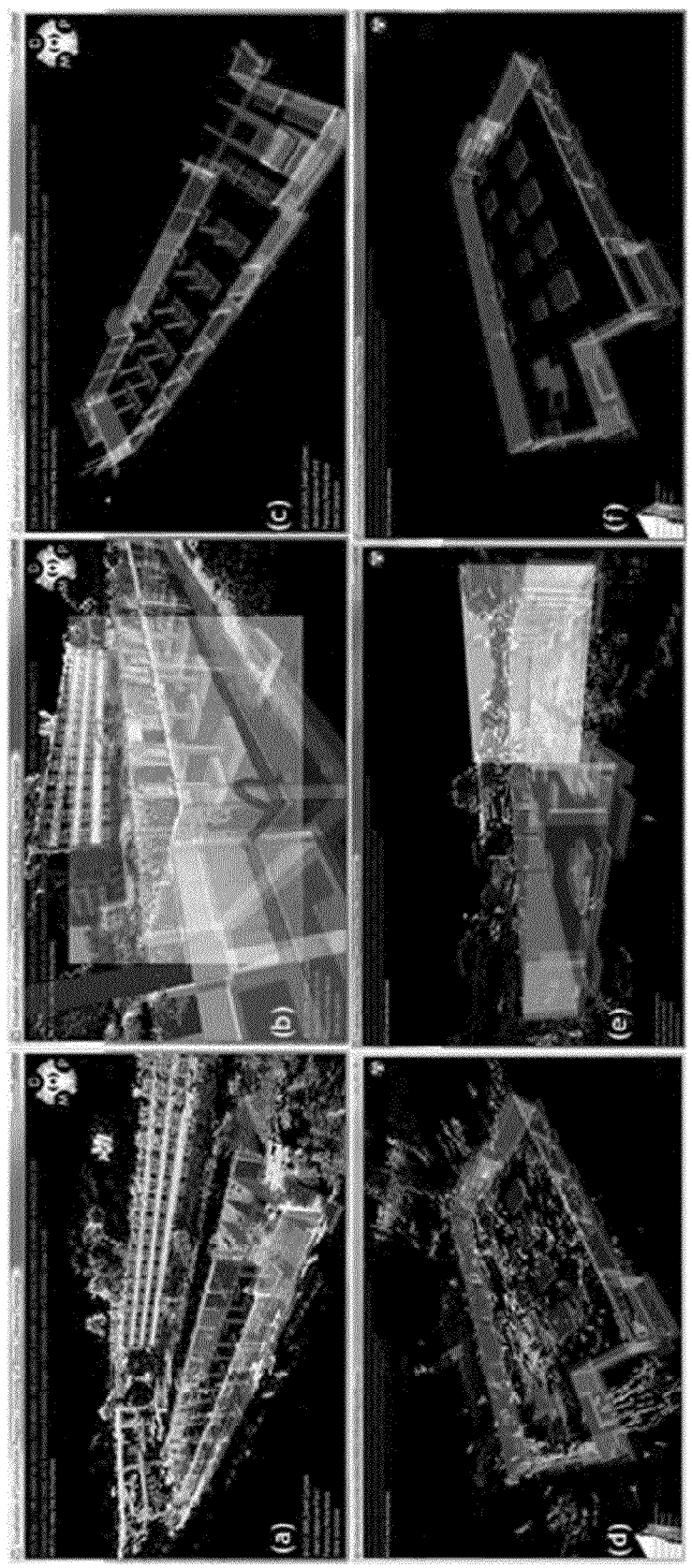
FIG. 16 is a series of images of: (a) visualized progress for RH project over the D$^4$AR (four dimensional augmented reality) environment; (b) semi-transparent view of RH progress from a camera view point; (c) RH progress detection results color-coded over the IFC-based BIM; (d) visualized progress for SD project over the D$^4$AR environment; and (e) semi-transparent view of SD progress from a camera view point. (f) SD progress detection results color-coded over the IFC-based BIM.

Finally, to represent progress and color-coded changed and unchanged elements with red and green, the same D4AR modeling platform reported in (Golparvar-Fard et al. 2009a) and the color-coding scheme presented in (Golparvar-Fard et al. 2009b) are used. FIG. 16 shows the results of visualizing the outcome of the progress detection model. In these cases, the behind or on-schedule IFC elements are color-coded with red and green accordingly. For those elements for which progress is not reported, the color remains gray. Such color-coding scheme facilitates observation of the accuracy of progress detection, yet if needed, allows corrections to be made on a case-by-case basis.

Figure 17:
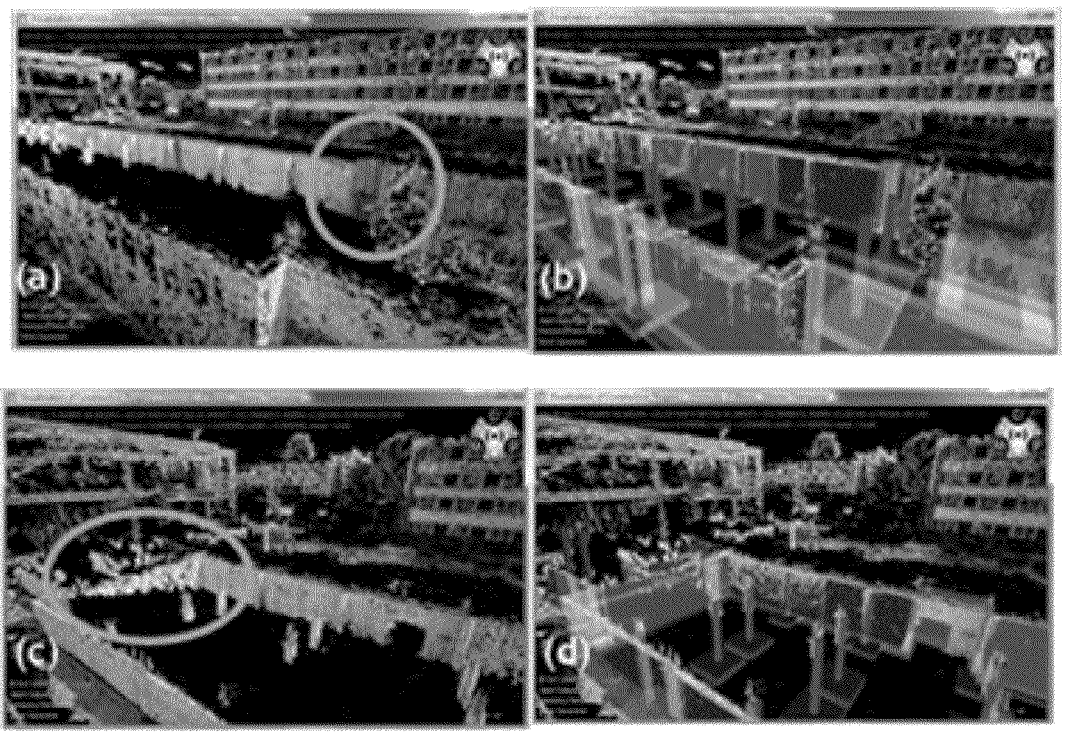
FIG. 17 is a series of images showing: (a) and (b) false positive as the formwork should not be detected as evidence of progress; and (c) and (d) missed positive (false negative) as the wall should be detected for progress though it is severely occluded.

FIG. 17 illustrates few examples of the detection's false positives and missed positives (false negative in proper statistical terms). As observed, since the detection model does not contain operational details (e.g., forming stages), the formwork is falsely detected as a finished concrete element. In FIG. 17(c), the highlighted wall should have been detected, but due to occlusions, the element is not properly reconstructed and consequently not detected.

According to Equation (14) and based on detected progress per element $P(\eta i|\theta Ti)$, progress can be reported at schedule-activity level. FIG. 18 presents a part of the RH project schedule and illustrates what activities are tracked for progress. Since some elements may not be visible at all, a metric for visibility per schedule-activity is also reported which gives an indication of reliability of progress values. As observed, given the accuracy of the detection engine at this stage, progress may still be reported at schedule-activity level. Since the exact timing of each operational stage (e.g., forming/pouring) is not known, progress cannot be reported at any finer level of detail. Yet with Equation Error! Reference source not found, it may be expected that when the material/texture recognition is incorporated and $P(\eta i)$ is measured, without a need for a detailed WBS, progress information can be reported at a finer levels of detail. In all of the experiments conducted, $P(\eta i)=1$.

Accordingly, disclosed herein is a significantly improved algorithm for dense reconstruction and robust registration for 4D as-built point cloud models from daily site photo collections. Accordingly, a robust vision-based method comprised of SVM, MVS and voxel coloring algorithms is presented and used for reconstruction. Furthermore, registration is enhanced, allowing 4D as-built point cloud models to be automatically generated through superimposition of various point cloud models, in turn semi-automatically registering them over 4D IFC-based BIM. The superimposition of the BIM over the point cloud requires a user to select matching feature points, and therefore, this step may be done only once at the beginning of the project. The observations and conducted experiments show that the resulting $D^4AR$ visualization has the following abilities:

Data Collection:

The approach may be fully dependent on the daily photo collections; may not have any cost or a need for any manual intervention beyond uploading images into the system and may work even with low quality images taken from a cell phone. The large number of images captured the better for successful automated progress tracking.

As-Built Modeling Automation and Visualization:

This process may be fully automated, i.e., once images are deposited into the system, features may be fully and automatically identified and matched to visualize the underlying as-built point cloud model. The camera configurations may be automatically identified as well.

Occlusion Handling:

Since unordered daily photographs are usually taken with least amount of occlusions, their application may be desirable for automated as-built modeling. The underlying SVM may automatically remove noise and other inconsistent representations, so there may be no need for post processing of the point cloud model. In addition, the contextual semantic information associated with moving objects in the scene may not be fully removed from the point cloud models; rather they may be dynamically captured in registered images.

As-Built Processing Efficiency:

Each point cloud model may be generated in a few hours (computational cost at this stage). Once the underlying model is generated, adding new photographs to the system may be processed in order of seconds.

Augmented Reality Registration:

Registration of the 4D IFC-based BIM may still be semi-automated, as registration may need a set of initial control-points to be manually selected for the automated matching. Manual selection, however, may only need to be done once in the initial stages of the project. Registration of point cloud models over one another may be automatically done using iterative closest point (ICP) algorithms by selecting a subset of points that has consistent visual appearance in point cloud models, e.g., an existing structure which is reconstructed in consecutive point cloud models.

Also disclosed herein is the automated progress monitoring model and the SVM machine learning approach. In presence of a large number of photographs, automated progress monitoring module may result in high precisions. The approach generates range images for each photograph, segments each image based on observed progress as well as dynamic occlusions. A robust 2D segmentation of observed objects over site images. It is shown through multiple experiments that the proposed automated detection may have the following characteristics:

Progress Monitoring Automation:

Except the initial registration step of BIM and point cloud models, monitoring physical progress may be fully automated. Although currently the operational progress details may not be automatically identified, e.g., differentiation of concrete from formwork, the proposed Bayesian model accounts for that, and this in turn facilitates the extension of the proposed algorithms.

Progress Monitoring Accuracy:

The metrics shown in the experiments may be satisfactory given the formation of the disclosed progress tracking model for the first time. Furthermore, the "visibility" metric represented at the schedule activity level highlights those activities and elements that may need to be revisited. Based on this confidence factor, the users may either take more images for an accurate assessment of progress, or manually revisit those elements.

Robustness to Occlusions:

In the proposed statistical model for automation of monitoring, the threshold for detection of different types of elements under partial visibility may be dynamically learned. Yet, the metrics for comparison of different automated monitoring models may need to be set using similar construction case studies.

Computational Efficiency:

The progress deviations are currently computed over a few hours. Since the frequency of progress monitoring in most cases is not expected to be more than one observation per day, this computation time may be acceptable.

An automated approach for tracking, analysis and visualization of progress using daily site photographs and 4D IFC-based BIMs is presented. In the proposed approach, images can have low qualities, yet robustly generate dense as-built point cloud model. Subsequently, the underlying point cloud model is registered with other point cloud models as well as the as-planned model, generating an integrated 4D as-built and as-planned model for progress visualization. The as-built and as-planned voxel coloring and labeling algorithm demonstrates high accuracy in labeling of a construction scene for occupancy and visibility. The SVM kernel machine shows promising results in detecting progress. Overall, the presented results mark the approach presented herein to be the first of its kind to fully take advantage of already-available daily site photographs and IFC-based 4D BIMs for automated progress tracking and analysis. Application of the $D^4AR$ modeling system may be perceived to minimize the time required for as-built data collection and as-planned data extraction; removing subjectivity of progress detection through an automated systematic detection; and, finally, the interactive visualization to minimize the time required for discussions on coordination of progress possibly leading to a better decision-making for project control.

$D^4AR$ Tools in Support of Decision-Enabling Tasks in the AEC/FM Industry

The significant advancement in digital imaging and widespread popularity of digital cameras for capturing a comprehensive visual record of construction performance in Architecture/Engineering/Construction and Facility Management (AEC/FM) industry have triggered an extensive growth in the rate of site photography, allowing hundreds of images to be stored for a project on a daily basis. Meanwhile collaborative AEC technologies centering around Building Information Models (BIM) are widely being applied to support various architectural, structural, as well as pre-construction decision-enabling tasks. These models, if integrated with as-built perspective of a construction project, have great potentials to extensively add value during construction phase of the project.

The remainder of this disclosure discusses recent developments from research efforts in (1) automated acquisition of as-built point cloud models from unordered site daily photo collections and geo-registration of site images; (2) automated generation of 4D as-built point cloud models, as well as (3) semi-automated superimposition of the integrated as-built model over fourth dimensional (4D or $D^4$) (3D+time) BIM to generate integrated 4D as-built and as-planned visualizations. Also to be discussed include the limitations and benefits of each modeling approach, the motivations for development of $D^4AR$ (4D Augmented Reality) environments for integrated visualization of as-built and as-planned models, as well as perceived and observed applications and benefits in seven case studies. Not only does a $D^4AR$ model visualize construction processes and performance deviations, but it may also be used as a tool for automated and remote monitoring of progress and safety, quality control and site layout management, enabling enhanced coordination and communication.

Over the last decade there has been a significant growth in digitography, the capture of digital images and videos, in the AEC/FM industry. Nowadays, it is common for owners, contractors as well as architects and engineers to take meaningful photographs of their work several times on a daily basis. In construction where time is a major factor of profit, it is easy to understand why practitioners started to adopt digital photography even before the consumer market took off. Continuously taking snapshots, disseminating them within minutes over the Internet and finding ways to communicate through this medium adds value to work processes. An extensive literature review on application of photography in AEC/FM industry and its value in identifying and solving various construction management programs indicates construction images are mostly being used for:

1. Visualization of Construction Operations and their Sequences.

Images provide easy-to-understand and detailed visuals of construction operations serving as (1) powerful coordination and communication tools among project participants, (2) safety or construction methodology education tool for workers (in case of self-performing contractors) and for subcontractors (usually in case of construction management), and even as (3) marketing tools. The ability of annotating over these images enhances their application as flexible communication media.

2. Progress Monitoring and Tracking of Construction Crew and Machinery.

Photographs captured from different viewpoints on a daily basis or time-lapsed images serve as a powerful media for remote and quick analysis of construction performance and/or track construction entities. Availability of such visual data supports more frequent monitoring and can reduce the time required for analysis of progress.

3. Productivity Measurements.

Video streams and time-lapsed images allow contractors to manually measure and analyze performance of their work force and machinery away from the jobsites and revise work processes or sequence of activities to improve productivity.

4. Accident Investigation.

Visual data provide powerful pieces of evidence for parties involved in an accident and also for project management to properly file accidents for safety referencing and documentation purposes.

5. Dispute Resolution.

The as-built report of a project is a common legal tool in support of a contractor's claim for compensable delay. These reports, especially when compared to an as-planned project, show the impact of other party's decisions and shortcomings on the active critical path activities. In different steps of such dispute resolution process or even in case of litigation, images and videos (especially in cases where software tools lock out images from tampering) serve as excellent compelling pieces of evidence documenting work as it progresses which significantly facilitates the resolution of disputes, supporting valid legal claims, adding creditability to the as-built project as well as abolishing erroneous or unfounded disputes.

6. Quality Assurance/Quality Control.

If high-resolution images are captured from proper viewpoints with an appropriate amount of lighting, quality of the finished surfaces can be remotely tracked, analyzed and controlled.

Currently, photography of a construction project with a 10-megapixel camera costs only about a few hundred dollars and it does not need much training. Instead of taking several pages of notes on a job sites, field engineers and superintendents may come back from construction sites with photo dairies with minimal notes where each photo is already stamped with the date and time it was captured. For these reasons, photography has evolved into a significant part of documentation and further justifies growth of their application within the AEC/FM industry.

A set of detailed observations from seven ongoing construction projects—daily construction photo collections plus time-lapsed photographs collected between September 2006 and September 2009—as well as literature review reveals that, although there is a great potential for new applications with these extensive sources of information, such applications are adversely affected by the significant amount of data that needs to be organized, annotated, indexed—referred to as Digital Asset Management. For example, some contractors currently catalogue their images into subsequently-numbered folders, and later on, tag those images with metadata such as "Rodbuster" or "Ironworkers." When they need an image, they may need to search on the basis of location and content and this in turn induces a tedious and sometime error prone task. In addition, it is time consuming and sometimes difficult to sort these images chronologically as well as based on their geospatial locations, requiring observing and studying construction operations and their sequences. All these challenges call for a more sophisticated approach to organize construction daily images allowing them to be interactively browsed within a geo-spatial configuration.

Conducted observations disclose that if photographs are used to reconstruct 4D (3D+time) geometrical representation of the as-built scene, and images are geospatially and chronologically registered within a 3D virtual environment, the images form powerful visualizations that could be used as a source for as-built data extraction, analysis as well as communication and coordination. Such an integrated environment may allow photographs to be browsed and situated, on demand, based on their location and the time captured.

During the same period of time, there has also been a significant growth in application of Building Information Models (BIM). BIM as a collaborative AEC technology supports architectural and structural perspectives while its application could be extended to the preconstruction stage of a project, linking schedule to the model and the resulting 4D model to be used for clash prevention, constructability analysis, as well as generating construction schedules. Currently, the benefits of BIM are well perceived by many AEC/FM companies and these models are being widely adopted. As an example, currently General Services Administration (GSA) requires all AEC firms working with them to include BIM as a part of their work proposals. The application of BIM is also a binding module in some recent AEC contracts. For example, as of Jul. 1, 2009, Wisconsin established itself as the first state requiring BIM on large public projects and even American Institute of Architects (AIA) has established protocols as extensions to contracts on how BIM could be developed and managed throughout the course of a project.

Recent literature reviews and surveys demonstrate that despite the significant value BIM adds in clash prevention and evaluation of time-space conflicts, their application has been mostly limited to the design and pre-construction stages. Less value has been experienced by practitioners from application of these models in support of field construction management and operation. Limited research has been conducted on methods to augment BIM with other information and implement those models to gain value beyond the pre-construction stage. There is still a substantial amount of information that is being collected on construction fields in forms of as-built, photographs, schedules, submittals, RFIs, or change orders which is transferred to project participants in file cabinets. There will be further benefits if this data is incorporated into or melded with BIM and/or an image-based 3D representation of as-built projects. Since success of every construction project is linked to the ability of accessing both as-built and as-planned project information in an efficient manner, integrated representation of these models becomes more attractive.

Subsequent to using a prototype implementation for testing over seven different cases from two ongoing construction projects, the results demonstrate that the disclosed all-inclusive integrated modeling approach provides flexibility in studying as-built, sorting and browsing daily site images geospatially and chronologically from a model-based perspective. While integrating the models with BIM may not only create a potential to overcome limitations associated with visualizing such models independently, but also may create a window of opportunity for extending application of BIM within the construction phase. Also to be discussed include observed and perceived applications and benefits of these models for remote progress monitoring, revision of work schedules, as well as safety management, quality assurance/control and site logistics management.

Application of photography and videotaping might seem to some practitioners as a peripheral activity within the AEC/FM industry, but in today's business environment, low cost of cameras, ease of use, as well as the possibility of quick exchange of images over the Internet has evolved their applications to vital elements for communications and coordination. Nowadays site photographs are captured in two forms: (1) still photographs casually captured from ongoing activities under different viewpoints; and (2) time-lapsed photographs and videos. Table 4 show a comparison in application of time-lapsed photos to daily photologs that are casually collected. Instead, a new way of looking into how superintendents perceive construction performance and how application of unordered daily photographs can catalyze perception of various events that make up construction cycles is introduced in this disclosure.

TABLE 4

Comparison of time-lapsed images with daily photologs.

Digital Asset Management (DAM)

| | Daily site photologs | Time-lapsed images |
|---|---|---|
| Ease of capturing images | Almost at no cost | Cameras and enclosures are expensive<br>Requires permission usually from the owners<br>Require frequent maintenance<br>Requires access to power and cable/wireless transmission |
| View Range | If a large set of images are used, they can capture everything that is not embedded (both at exterior and interior) | Captures only what is in range or in the view<br>Cameras may be equipped with Zoom/Pan/Tilt functionality at a cost to cover wider areas, but it may only capture what is not occluded by static occlusions (e.g., natural construction progress) and dynamic occlusions (e.g., temporary structures, machinery)<br>Multiple cameras usually needed to cover wider areas<br>Monitoring interior may be significantly challenging due to range issues |
| Remote Analysis | Possible | Possible |
| Weather and Illumination Conditions | Many images captured over a short period of time usually capture consistent illumination<br>Weather conditions may not affect the camera itself but slightly affect quality of images | Since the viewpoint is usually consistent, sever changes of illumination may be observed throughout a day<br>Weather conditions severely affect the camera itself and quality of images making it impossible to see through during precipitations and cloudy days |
| Suitability for Progress Monitoring | Remote and quick analysis if a large number of images are collected | Remote and quick analysis if not obstruct by occlusion |
| Suitability for Productivity Analysis | Static analysis of productivity is possible<br>Allows stop-motion analysis if significant number of images or video is collected | Dynamic analysis of productivity is possible<br>Allows stop-motion analysis to be performed if small sequences of time are considered |
| Storage | Requires significant amount of digital storage | Requires a massive amount of digital storage specially if small time-steps are used |

Figure 19:
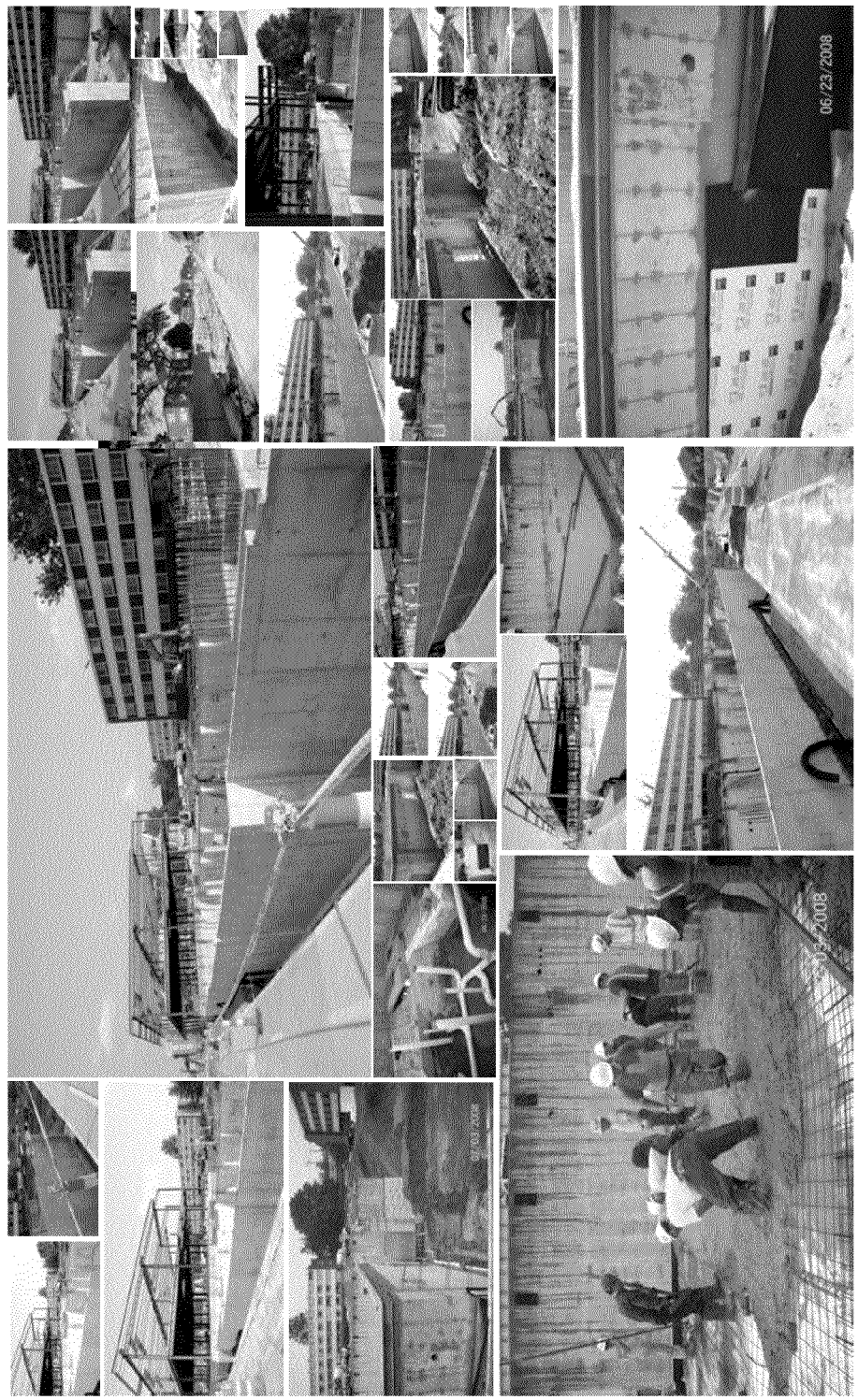
FIG. 19 shows various images exemplary of those are captured on a daily basis at a construction site.

Field engineers and superintendents perceive a lot of information about construction performance and geometrical configuration of components by moving through and around construction sites on a daily basis. As the field engineer walks through the job site, progress information is gradually sensed over time. Through these observations, field engineers usually take many photographs and vary the composition to capture ongoing activities naturally with the least amount of occlusion. In this research, this issue was observed first-hand as one of the authors has been actively involved in construction of two concurrent building projects. For example, in these projects, field engineers take about 250 photographs per day. In addition, these two projects include 18 different work packages, and for each work package, contractors take about 20 to 25 photos per day. Adding the photographs that the owner representatives take (about 20 per day) in addition to other photos taken by executives and regional safety directors for each contract, it is easy to see the wealth of visual information which is available to be harvested. Since field engineers naturally find the best viewpoints to capture site images, these photographs have one great attribute in common, namely, the least amount of occlusion on documenting critical construction activities. This wealth of visual information motivates application of techniques that enable both the underlying structure of the building components as well as the motion of the cameras (motion of the field engineer with camera) to be captured and represented in a virtual environment. FIG. 19 illustrates some of these images that are taken for progress monitoring, documenting quality and safety, site layout management as well as productivity analysis.

As observed from Table 1, if proper techniques for application of these daily photo logs are used, significant benefits could be observed. One of the challenging research tasks is to automatically figure out the 3D geometry of the site from an unordered collection of images as well geo-register these images in a common 3D environment. Over the past decade, several research efforts began addressing concerns mostly with retrieval of images as well as applications of time-lapsed photographs.

More recently, the use of PhotoModeler (2009) was suggested for modeling of precast façades. Modeling with PhotoModeler requires two kinds of human interactions for calibrating cameras and measuring camera configuration: (1) marking and (2) referencing. Marking refers to using manual intervention to identify vertices in photographs and connect those vertices with edges. Moreover, it involves referencing, selecting a vertex and manually linking it to its corresponding vertices across other images. Using "Ringed Automatically Detected Targets," a more recent version of PhotoModeler enables visual targets to be detected and matched across multiple images. Nonetheless, implementation is costly, requires training and a substantial amount of human intervention. If considered throughout the time span of a construction phase, such application is time-consuming and less attractive. The following sections provide a brief overview on principles for image-based 3D reconstruction.

Image-Based 3D Reconstruction and Principles of Structure-from-Motion

In the last two decades, there has been a dramatic increase in the capability of computer vision algorithms in finding correspondences between images that are sequentially captured, calibrating and registering cameras, and ultimately reconstructing 3D geometry of a scene, a process formally known as Structure-from-Motion (SfM). This process goes well back to early techniques in photogrammetry. In more recent decades, however, due to an increase in performance of computers and digital imaging, automated collection and processing significant numbers of images in a reasonable time is becoming feasible. Substantial research progress was achieved when Triggs et al. (1999) presented bundle adjustment method, which is a statistical optimization solution to the problem of finding geometrical location of feature points and orientation of cameras.

Finding structure from motion is analogous to the perception of a field engineer from a site. As a field engineer walks through a site, the complete structure of the scene may be observed. In structure from motion, similarities between images may be found and components reconstructed in three dimensions based thereon. To find correspondences between images, first a set of feature points (points that are potentially distinct enough that could be observed under different viewpoints such as scales and lighting conditions) may be independently found in each image and their motions from one image to another computed. The trajectories of these feature points may be used to reconstruct their 3D geometrical positions and estimate motion of camera(s) used to capture those.

A possible solution to understanding the underlying geometry of field activities using SfM solution involves the following steps: (1) extract feature points from images; (2) find an initial solution for the structure of the scene observed and motion of the cameras; (3) extract the 3D locations of these features points and calibrate camera matrices; (4) represent the scene with 3D geometrical locations of these points as well as cameras that observed those; (5) infer geometrical, textural, and/or reflective properties of the scene; and (6) interpret those as information regarding the construction site or ongoing activities. The disclosed solution (1) allows images that capture dynamic construction scene to reconstruct the as-built project and be accurately registered; (2) automatically register daily cloud models over one-another; and (3) register the 4D point cloud models over as-planned models, thus enabling remote navigation in an augmented reality environment both in space and time. A detailed mathematical description of computer-vision steps is not within the scope of this disclosure; instead, the steps that form the process will be detailed in the $D^4AR$ modeling section.

Building information models provide the ability of performing photorealistic renderings and allow design-development reviews and system clash detection be studied in virtual environment. BIM also facilitates communication of design and coordination of working system, cost estimation and automated generation of bills of quantities. During construction phase of a project, these models can be helpful in analyzing construction operations by allowing project managers to determine site management strategies, facilitating contractor coordination, planning of site logistics or access routing, as well as studying integrity of schedule and construction sequences (e.g., site accessibility, trade coordination, temporal structures, lay-down areas use, different construction methods or means).

Despite significant benefits of BIM during design and pre-construction stages, their value within the construction phase of a project is not yet well perceived by practitioners. Based on an investigation over a significant number of projects where BIM has been implemented, experts report that only if these models are generated at the design phase, engineers can subsequently use them to generate design visualizations and later on construction managers can use them to plan construction of the facility. Application of these models during the construction phase can increase if modeling detailed operations and site layouts is simplified; and, further value may be added by integrating BIM with as-built projects. Not only can integrating BIM with rich, as-built imagery overcome challenges in modeling, but it also may augment the benefits of each visualization technique. The modeling approach presented in the following sections is a step forward in minimizing these challenges.

Research in the area of integration of as-built and as-planned models during construction phase of a project goes back to early efforts in comparing laser scanning point cloud models with CAD models. Laser scanners only provide Cartesian information about the as-built project. The sheer volume of the data that needs to be interpreted, the cost (about 100K USD), and need for training and expertise for operation and other existing technical challenges makes application of laser scanners less attractive than techniques which extract point cloud models from images.

$D^4AR$ Model for Integrated As-Built and As-Planned Visualization

The present system and models may include to (1) automatically reconstruct as-built point cloud models from unordered daily site photographs, (2) automatically register point cloud models to generate 4D as-built point cloud models, and (3) semi-automatically superimpose 4D point cloud models over 4D BIM, and use the resulting integrated and sequential augmented reality environment to facilitate remote and quick decision-making. Previous research revealed that the initial road-mapped reconstruction method needed further development to take advantages of daily photo logs over the course of a project by using them to reconstruct 4D as-built models and efficiently register the photo logs with 4D as-planned models. These modifications were mostly based on the following needs: (1) Generating point cloud models from photos captured in one day and superimposing reconstructed point cloud models at different days to generate a 4D, as-built geometry+ imagery model. This step will automatically register all images with the 4D BIM, allowing as-planned and as-built images to be analyzed both in space and time. (2) Matching these point cloud models in an effective way with the 4D BIM so no manual intervention will be required. (3) Forming the underlying framework for manual and automated extraction of information from the integrated model allowing different schedule sequences, operational details, logistics as well as safety and quality issues to be analyzed remotely.

Figure 20:
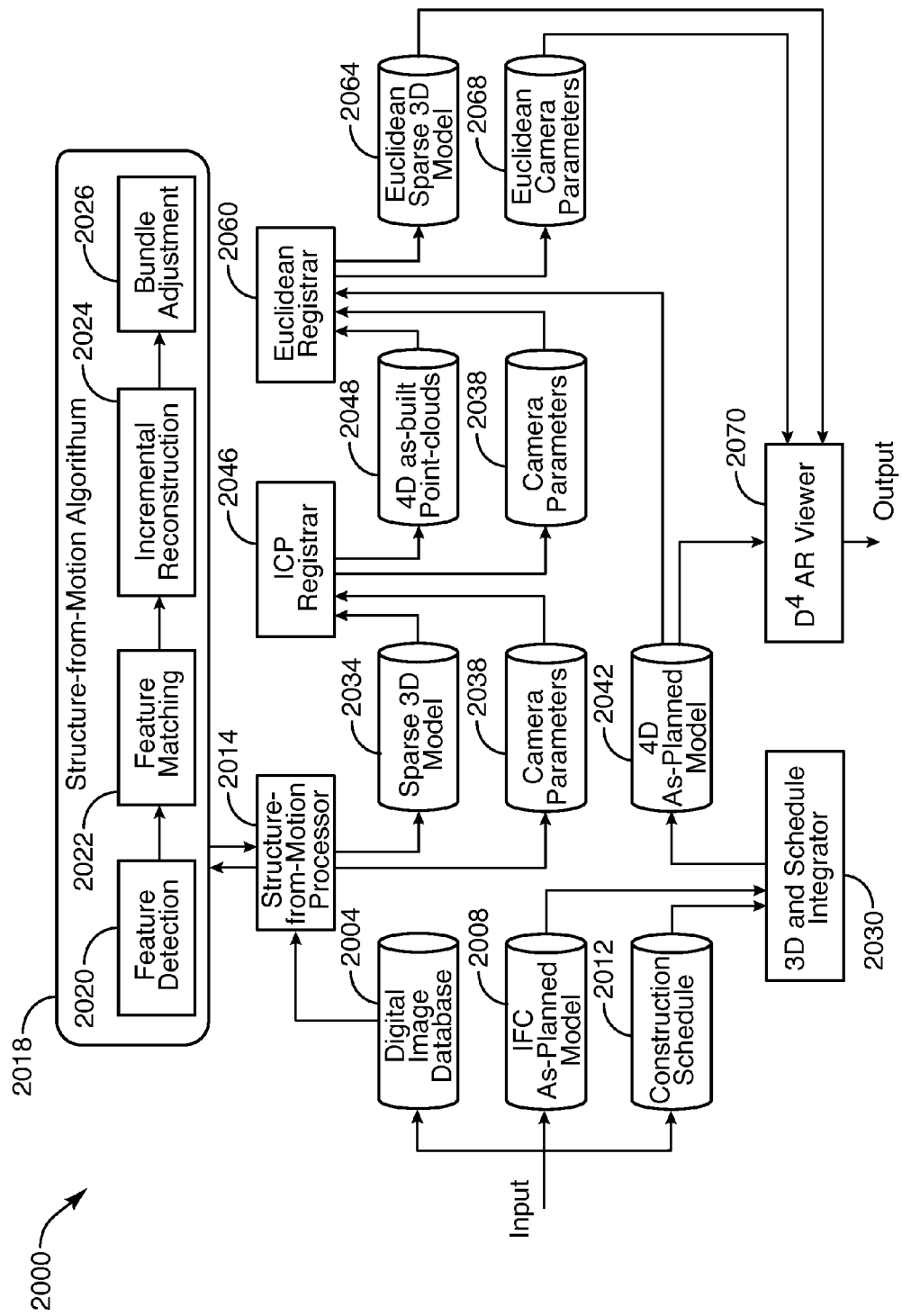
FIG. 20 is a system diagram of data and processes in a proposed D$^4$AR and visualization system.

FIG. 20 is a block diagram of a system 2000 and associated data and processes to execute $D^4AR$ model reconstruction and visualization. As seen, the system developed for $D^4AR$ modeling may include several modules or processors, including but not limited to a number of process modules executable by a processor and software code within a computer system, and databases showing aggregation and flow of data within the computer system. The computer system may be distributed across multiple computing systems, as may be the databases that provide for data flows between modules. After discussing an overview of the system 2000, each processor and database may be described in more detail.

The system 2000 may include a digital image database 2004, an intelligent frame correction (IFC) as-planned model database 2008 and a construction schedule database 2012 in which to store initial data inputs into the system. Photographs collected on a daily basis may be stored in the digital image database 2004. The IFC as-planned model database 2012 may store BIM data that represents a model of the as-planned construction project. The construction schedule database 2012 may store milestones with reference to the as-planned project in relation to dates by which the milestones are to be met.

The digital images may be sent to a structure-from-motion (SfM) processor 2014 that may further process the digital images through a number of SfM image processing steps 2018 to enact as-built reconstruction of a project scene, including but not limited to: feature detection 2020 within the images; feature matching 2022 across multiple images; incremental reconstruction 2024 of the as-built project scene; and bundle adjustment 2026 of multiple chunks of the as-built seen for proper display.

Data from the IFC as-planned model database 2008 and the construction schedule database 2012 may be sent into a 3D and schedule integrator 2030, which may schedule different phases of constructions over time with respect to different milestones to be completed within the 3D construction project.

Data generated by the SfM processor 2014 may be stored in both a sparse 3D model database 2034 and a camera parameters database 2038, which data may be sent to an Iterative Closest point (ICP) registrar 2046 for registering IFC frames of the as-built 3D model over time, to create the fourth, temporal dimension for construction progress tracking. The ICP registrar 2046 may output data for storing in a 4D as-built point-clouds database 2048 and the camera parameters database 2038, which data may then be fed into a Euclidean registrar 2060 for registering portions of the as-built, 4D point-clouds 2048 for tracking over time.

The Euclidean registrar 2060 may then output data for storing in a Euclidean sparse 3D model database 2064 and a Euclidean camera parameters 2068 database. Data from the Euclidean sparse 3D model database 2064 and the Euclidean camera parameters 2068 database may be input into a four dimensional augmented reality ($D^4AR$) viewer 2070. The $D^4AR$ viewer 2070 may combine data of the Euclidean sparse 3D model and camera parameters with the 4D as-planned model from database 2042 to generate output images of progress of a construction project over time as seen by successive as-built point cloud models and daily photographs overlaid on top of the 4D as-planned model.

In summary, photographs collected on a daily basis may be used by the system 2000 to reconstruct daily point cloud models and register the images with respect to an as-built point cloud model. Furthermore, the system 2000 may insure that the 4D BIM is developed and updated to reflect the latest changes in geometry and schedule. And, the system 2000 may register as-built point cloud models from different days over one another using through the ICP registrar 2046. Finally, the system 2000 may superimpose the integrated as-built 4D model over the BIM, allowing all point cloud models and all site photographs to be registered and visualized together with the 4D as-planned model.

As-Built Reconstruction

Several computer vision techniques may be used to reconstruct a point cloud model from a series of photographs. In the present disclosure, the focus is not to synthesize a photorealistic view of the construction site from all viewpoints per se, but to mainly use existing daily images on a construction site without any prior manipulation and automatically reconstruct an as-built geometrical representation, register images in a common 3D environment and provide a sense of the underlying geometry of the construction site. As such, the more challenging problem of creating a full surface model is side stepped. In addition, since the focus is on using existing daily construction images without any prior, self-calibration techniques or even multi-view stereo processing, model-based approaches may not be useful. In this case, an SfM technique may be used to reconstruct an as-built point cloud model from a set of daily images.

The choice among specific the SfM image-processing steps 2018 may include to make sure the system 2000 is fully automated and works with existing unordered and uncalibrated daily photos. Accordingly, the SfM image-processing steps 2018 may include: (1) analyzing images and extracting feature points from images (2018); (2) matching image feature across image set (2022); (3) finding an initial solution for the 3D locations of these features points by: calibrating cameras for an initial image pair; reconstructing the rest of the observed scene (2024); and estimating motion of the cameras based on bundle adjustment (2026); and (4) registering, by the ICP and Euclidean registrars 2046 and 2060, point cloud models that are generated for each day to make a 4D as-built model.

Figure 21:
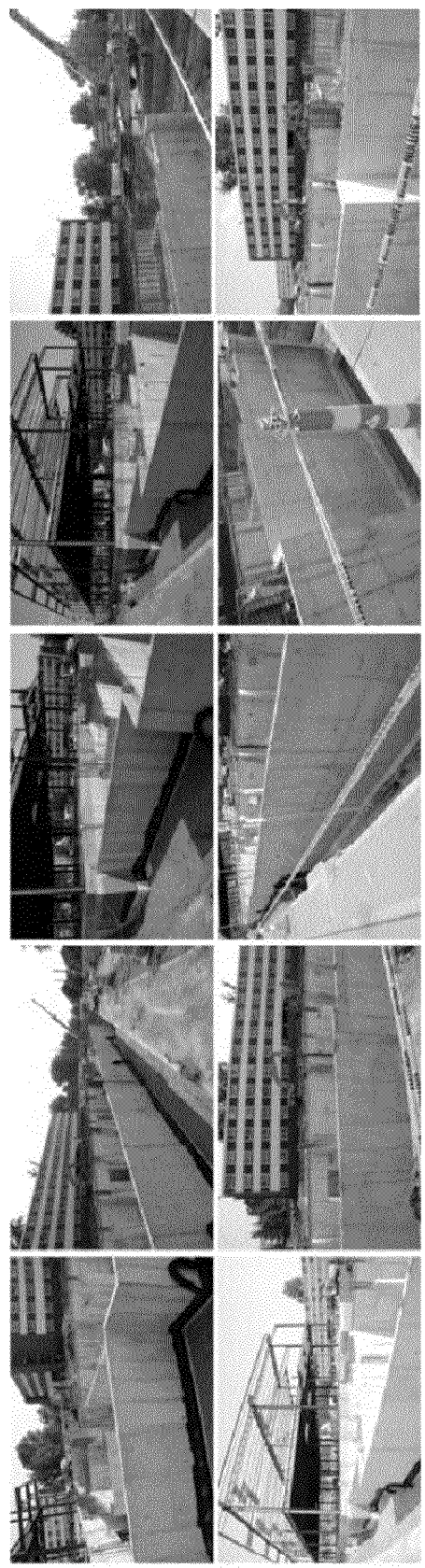
FIG. 21 is a series of images, including a subset of ten images represented from the 160 image set captured by a field engineer while monitoring the Ikenberry Residence Hall (RH) project on a walkthrough along the sidewalk on Aug. 27, 2008.

To present how these steps are formed, two sets of 112 and 160 images that are collected on Aug. 20 and Aug. 27, 2008 on Ikenberry Residence Hall project in Champaign, Ill. are exemplified. In both cases, a field engineer causally walked along the sidewalk of the project and captured these images within a few minutes. FIG. 21 presents a subset from these images, which are shown to roughly illustrate the overlapping parts of these images. The SfM steps may be executed as follows:

Analyzing Images into Distinct Invariant Features

The first step may include to automatically and independently find distinct feature points in each image to be further used to estimate the initial structure of the scene. Since the underlying representation of the images used may be unknown or the dataset could even include non-relevant images, a set of points that are stable under local and global changes in translation, scale, affine transformation, as well as illumination variations may be found. These points may preferably reliably be computed with a high degree of reproducibility in other images. This notion goes back to corner detection techniques, where corner points of objects were mostly used to track 3D CAD objects from 2D images. In practice, however, most corner detectors are sensitive not only to corners, but also to local image regions that have a high degree of variation in all possible directions. Therefore, corners of objects are not tracked.

Figure 22:
FIG. 22 is a series of images taken on Aug. 27, 2008 from Ikenberry Residence Hall projects in grayscale with Scale-Invariant Feature Transform (SIFT) feature locations visualized in cyan (shown in greyscale as overlaid dots and dotted lines).

Instead, the Scale-Invariant Feature Transform (SIFT) keypoint detection technique may be used, which (1) has good invariance to scale changes and view and illumination transformations, (2) is somewhat invariant to affine transformations (non-singular linear transformations and translations), and (3) has standard application in the computer vision domain. The SIFT feature detection technique does not limit the detection to corners of various objects on the construction site. On the contrary, the SIFT feature detection technique allows distinct feature points to be detected from surrounding environment (e.g., trees, machinery, or periphery of the construction site) as well. To verify sensitivity of the developed approach to image resolution, in the conducted experiments, image resolution may be synthetically reduced to 2-3 MPixels. A 3 MPixel image typically generates about 9,000 to 11,000 features. Examples of these detected features and their extent within an image are illustrated in FIGS. 22 and 23 respectively.

Figure 23:
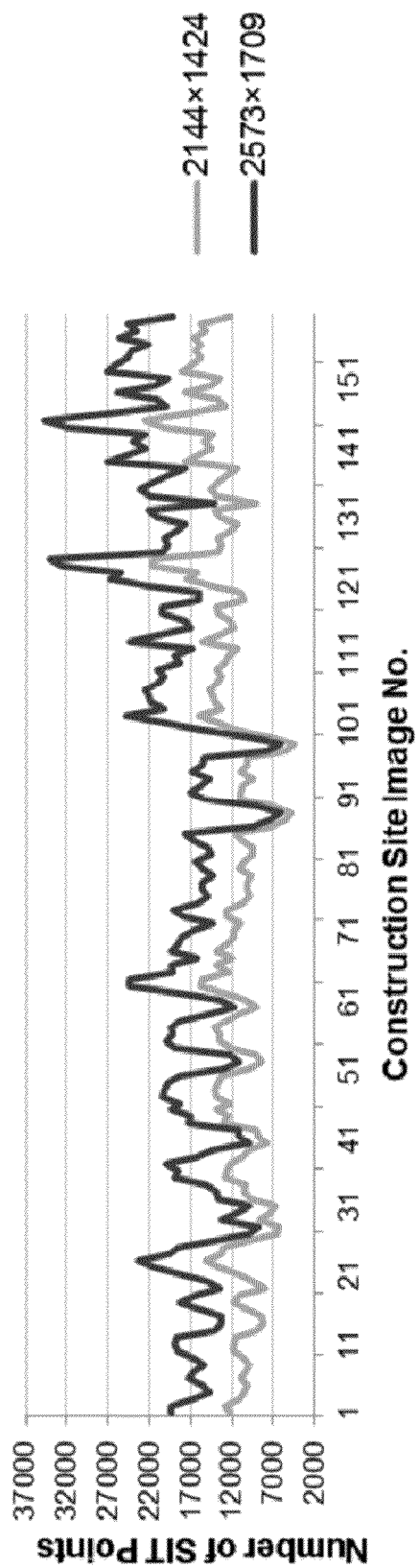
FIG. 23 is a graph of a number of SIFT features on the 160-image subsets taken on Aug. 27, 2009.

As observed in FIG. 23, the image resolutions were synthetically reduced to 36% and 25% of the original resolutions (image resolutions were 2573×1709 and 2144×1424) to confirm that the developed method is not sensitive to low image quality. Even with low resolution images, significant number of SIFT points are detected which enables dense point cloud models to be generated at later stages. It is worth noting that if lower resolution images are captured (as opposed to synthetic change in resolution), more SIFT points could be detected. This is due to interpolation techniques that are commonly used in down sampling of an image, which results in filtering sharp intensity changes.

Matching Image Features Across Image Database

Once the features are detected, the number of matching features in each image pair needs to be detected. To minimize computational time, approximate nearest neighborhood priority (ANN's) search algorithm may be used and each feature point query may be limited to only check a limited part of a SIFT descriptor. Furthermore, the ratio test described by Lowe (2004) may be used for classifying false matches. For a feature descriptor in image i, a 128-dimension vector may be captured for each feature and ensures invariance to image location, scale and rotation for matching. The two nearest neighbors in j, with distances $d_1$ and $d_2$ (distances between feature descriptor vectors) may be found. The system then accepts the match if $d_1/d_2<0.6$.

Figure 24:
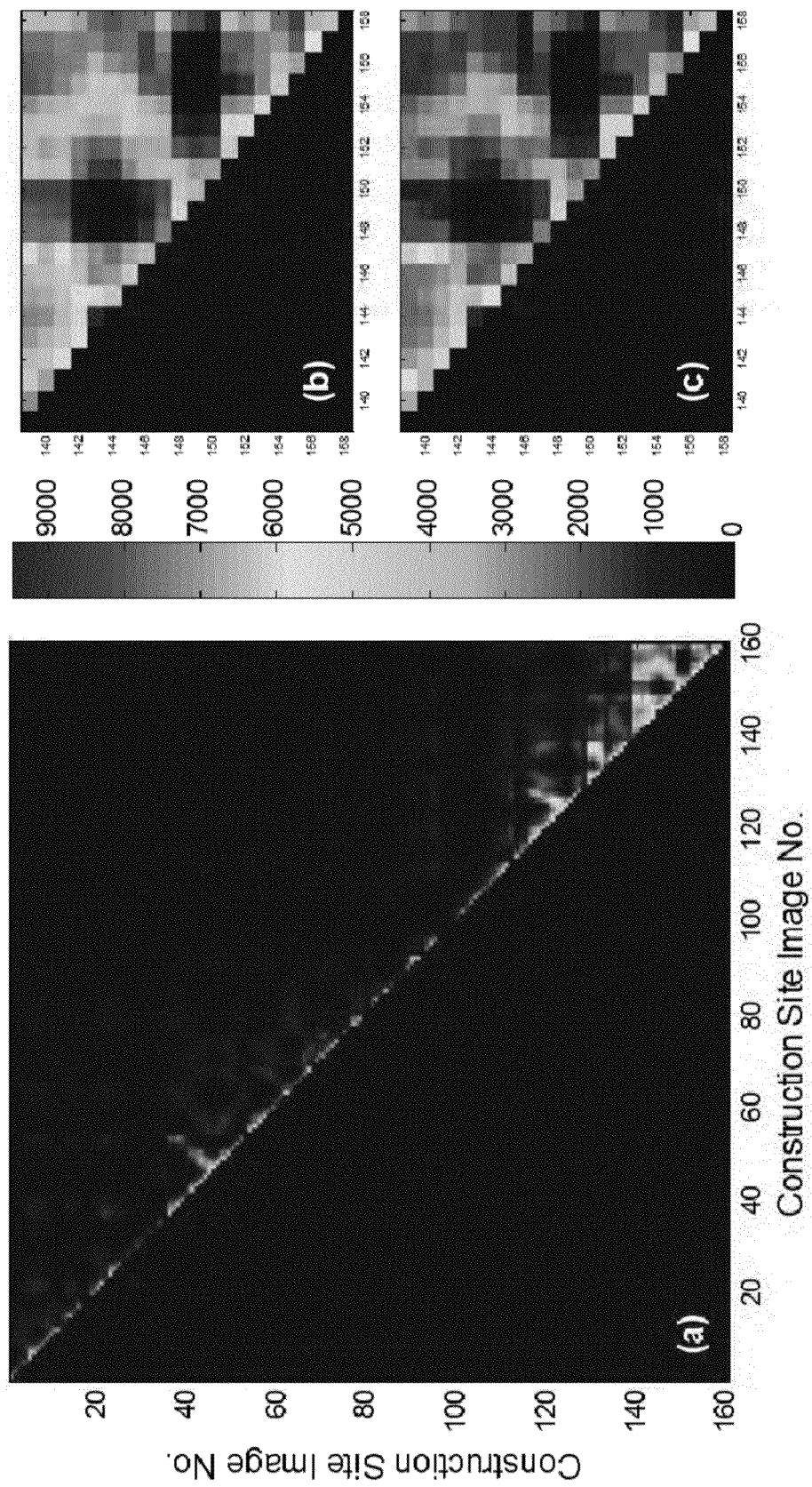
FIG. 24 is a graph showing: (a) the number of matched SIFT features between each image pair where both axes show the camera indices and the colored dots are visualizations of the number of SIFT features in image pairs; and (b) and (c) respectively show the close-ups of 140 and 160 subset before and after fitting fundamental matrix in an RANSAC (RANdom SAmple Consensus) loop.

FIG. 24(a) shows the number of matched SIFT features within the daily image dataset. Since SIFT features may not be completely distinct, there is a possibility that similar patterns especially located in façades of buildings (e.g., symmetrical patterns of façade, similar architectural columns, typical window details) may misleadingly match SIFT points in incorrect 2D locations in the image dataset. Due to the sensitivity of reconstruction algorithm to such false matches, an algorithm may be used to remove such false matches. The underlying assumption for refinement is that accurate matches will be consistent with the motion of the camera (the transformation of the image from one photography location to another). This assumption allows consideration of epipolar geometry between each image pair and consequently fit fundamental matrix. Therefore, once the matching features are detected in an image pair, a fundamental matrix for the pair may be estimated using RANSAC (RANdom SAmple Consensus). The fundamental matrix removes false matches as it enforces corresponding features to be consistent under viewpoint transformation (the transformation that maps an image to another). In the developed model, in each iteration of RANSAC, a fundamental matrix is computed using the 8-point algorithm of Hartley and Zisserman (2004), and then the problem is normalized to improve robustness to noises (See FIGS. 6(b) and 6(c)). If more than one feature in image i matches the same feature in image j, both of such matches are removed, as one of them is a false match because each feature point can only have one matching point in another image). As observed in FIG. 24, a number of matching points in FIG. 24(c) is less than corresponding points in FIG. 24(b) since some of the detected matches are not consistent with the motion of the camera.

Now, camera extrinsic (rotation, translation) and intrinsic parameters (focal length and distortion) may be recovered for each image and a 3D location for each feature point. The recovered parameters should be consistent in that re-projection error, e.g., the sum of distances between the projections of all 3D features and their corresponding image features, may be minimized. This minimization problem can be formulated with a bundle adjustment algorithm. First, extrinsic and intrinsic parameters of a single image pair are estimated. Since bundle adjustment as other non-linear solvers may get stuck in bad local minima, it is suggested to start with a good initial image pair and good estimates for camera parameters in the chosen pair. This initial pair for SfM should have a large number of matches, but also have a large non-homographic baseline, so that the initial scene can be robustly reconstructed. An image pair that is poorly described by a homographic transformation satisfies this condition.

A 2D image homography may be a projective transformation that maps points from one image plane to another image plane. The homography between all image pairs is found using RANSAC with an outlier threshold which stores the percentage of feature matches that are inliers to the estimated homography. Next, the system 2000 may select the initial image pair with the lowest percentage of inliers to the recovered homography, but with at least 100 matches. The extrinsic camera parameters for this pair may be estimated using Nistér's 5-point algorithm (Nistér 2004), and then the tracks visible in the image pair may be triangulated. Finally, the system performs a two-image bundle adjustment for this pair.

Incremental Reconstruction

Next, another image may be automatically added to the bundle adjustment optimization. An image from a camera that examines a largest number of estimated points may be chosen, and that camera's extrinsic parameters are estimated using a Direct Linear Transform (DLT) technique within a RANSAC procedure. For this RANSAC step, an outlier threshold of 0.4% image width or height may be used. To initialize the intrinsic parameters of the new camera for the optimization process, focal length is extracted from the exchangeable image file format (EXIF) tags of JPEG images, which is available in all digital cameras.

Starting from this initial reconstructed scene (2024), the bundle adjustment algorithm is run (2026), allowing only the new camera and feature points the new camera observes to change while the rest of the model may be kept fixed. A feature point is added if it is observed by at least one recovered camera, and if triangulating the location gives a well-conditioned approximation. The conditioning may be computed by considering all pairs of rays that could be used to triangulate that point, and finding the pair of rays with the maximum angle of separation. If this maximum angle is larger than a threshold, then the point may be triangulated. Once the new points are added, another global bundle adjustment using the minimum error solution with the sparse bundle adjustment library of Lourakis and Argyros (2004) may be computed to refine the entire as-built reconstructed scene. Global bundle adjustment may then be repeated for all cameras until no remaining camera observes enough reconstructed 3D points to be reliably reconstructed.

Overall, only a subset of the images may be used for reconstruction of the scene. This subset may not be selected beforehand, but may be determined by the SfM algorithm (2018) as executed by the SfM processor 2014. After the as-built scene is reconstructed (2024), the scene may be used for interactive explorations. An image-based rendering system may be developed in Microsoft C++.NET using DirectX9 graphics library ($D^4AR$ viewer 2070 in FIG. 20).

The following data structure may be used to represent the as-built reconstructed scene: (1) a set of key points, in which each key point consists of a 3D location and a color that is averaged out from all the images from which the key point is being observed; (2) a set of cameras, while the extrinsic parameters and intrinsic parameters are estimated; and (3) a mapping between each point and all the cameras that observe the point. A list of numbers of cameras which observe the point, the location of the point in local coordinates of the image, and the SIFT key point index may all be stored in the camera parameters database 2038. While this information is stored, cameras may be rendered as frusta (camera pyramids).

FIGS. 3(a) and 3(b) show the reconstructed sparse scene from the same image subset of FIG. 3 and illustrate five of the registered cameras. Once a camera is visited in this reconstructed scene, the camera frustum may be texture-mapped with a full resolution of the image so the user may interactively zoom-in and acquire progress, quality, safety and productivity details as well as workspace logistics. FIGS. 3(c) through 3(e) respectively show the location of a frustum, the point cloud model seen from that camera viewpoint, and the camera frustum textured while demonstrating how the image is geo-registered with the as-built point cloud model.

4 Dimensional As-Built Models

To extract time-varying 3D as-built models, the position of cameras and as-built structure may be inferred geospatially and chronologically. As mentioned, SfM techniques are used to deal with the spatial problem for a single day dataset, while here the focus is on the temporal aspect of these models. First, the SfM steps for each daily image collection may be performed (it could also be a set of images taken from a series of days for which no significant change in construction is observed) followed by registering those images over one another. Registering generated point cloud models for each dataset may be formulated as an iterative closest point (ICP) problem, where perspective transformation (unknown scale, rotation and translation) may also be computed. Since the SfM reconstruct the as-built point cloud models with an unknown scale, the ICP problem may be solved based on general rotation and translation as well as scale. Using ICP with scale allows daily point cloud models to be automatically registered and this in turn allows all images captured at different locations and with different timing to be geo-spatially and temporally located within the same virtual environment.

The resulting 4D as-built model allows project participants to select a specific location of a project and study that location within a specific day using all images that have captured ongoing work in that area. It also allows the study of work processes and construction operations conducted in that location over time.

Figure 25:
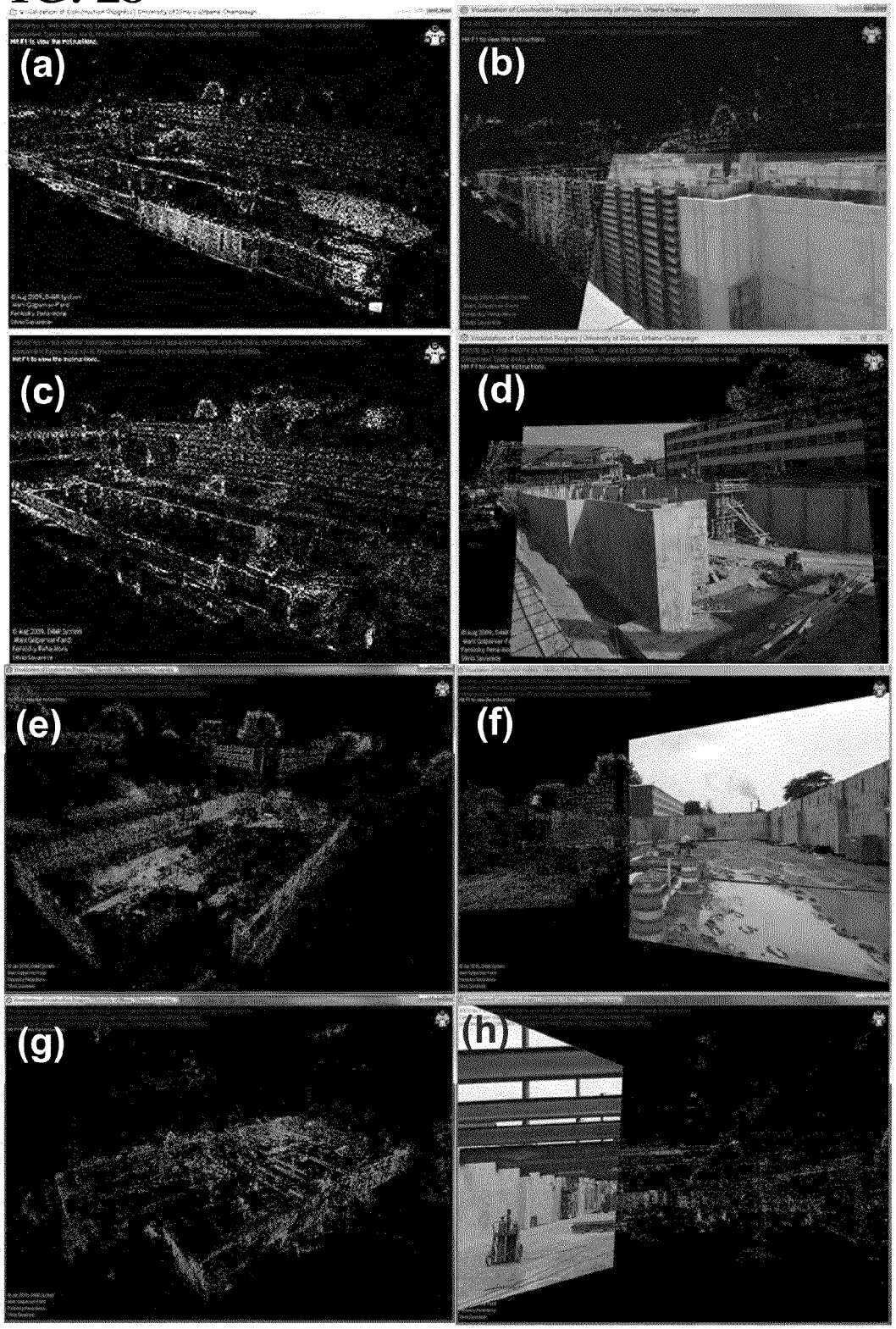
FIG. 25 is a series of images showing visualization of point cloud models as well as registered image for four datasets as follows: (a) and (b), the point cloud model and a registered image generated from 112 images taken on Aug. 20, 2008 from the RH project; (c) and (d), the point cloud model and a registered image generated from 160 images taken on Aug. 27, 2008 from the RH project; (e) and (f), the point cloud model and a registered image generated from 288 images taken on Jul. 7, 2008 from the RH project; and (g) and (h), the point cloud model and a registered image generated from 118 images taken on Jul. 24, 2008 from RH project.

FIG. 25 presents four datasets from two different projects (Residence Hall=RH; Student Dining=SD) as follows. FIGS. 25(a) and 25(b) are of 112 photos collected on Aug. 20, 2008 from the RH project. FIGS. 25(c) and 25(d) are of 160 photos collected on Aug. 27, 2008 from the RH project. FIGS. 25 (e) and 25(f) are of 288 photos collected on Jul. 7, 2008 form the RH project. FIGS. 25(g) and 25(h) are of 118 photos collected on Jul. 24, 2008 from the SD project. Using each dataset, a point cloud model may be generated and all images used for that specific point cloud reconstruction may be geo-registered. Subsequently, using ICP+scale algorithm, these point cloud models may be automatically registered, generating a 4D as-built model of RH and SD projects where the ongoing activities could both be studied geo-spatially and temporally. As observed in FIG. 25(b) in the open area of the basement, foundation walls are formed, while in the subsequent week's observation (FIG. 25(d)) all those foundation walls are already placed and the forms are striped. The same situation is observed in FIG. 25(e) where in about three weeks of time, some of the steel girders and columns are placed.

FIG. 4(c) illustrates the alignment of point cloud models for the RH project depicted in FIGS. 4(a) and 4(b) while FIG. 4(g) illustrates the same for the SD project point cloud models depicted in FIGS. 4(e) and 4(f). FIGS. 25(d) and 25(h) illustrate the registration of RH and SD building information models over point cloud models in FIGS. 4(b) and 4(e) respectively. 4D As-planned Building Information Modeling Module In order to represent the entirety of planned construction and query quantities and shared properties of materials, Industry Foundation Classes (IFC) are used as an underlying data model schema. This module consists of the following non-exhaustive steps: (1) generating an all-inclusive, as-planned model based on architectural and structural drawings at the pre-construction stage; (2) linking the schedule to the as-planned model; and (3) updating the model based on schedule revisions, approved RFIs, RPFs and change orders to continuously revise the as-planned model based on scheduled changes. The details animated within the 4D model may be at a level that allows a proper baseline for automating progress monitoring and model-based recognition to be generated. Here, the level of detail may be based at the construction schedule activity level. The assumption is if a detailed progress monitoring beyond what is already presented in the schedule is required, a detailed schedule could be generated to properly set the baseline for comparisons.

Figure 26:
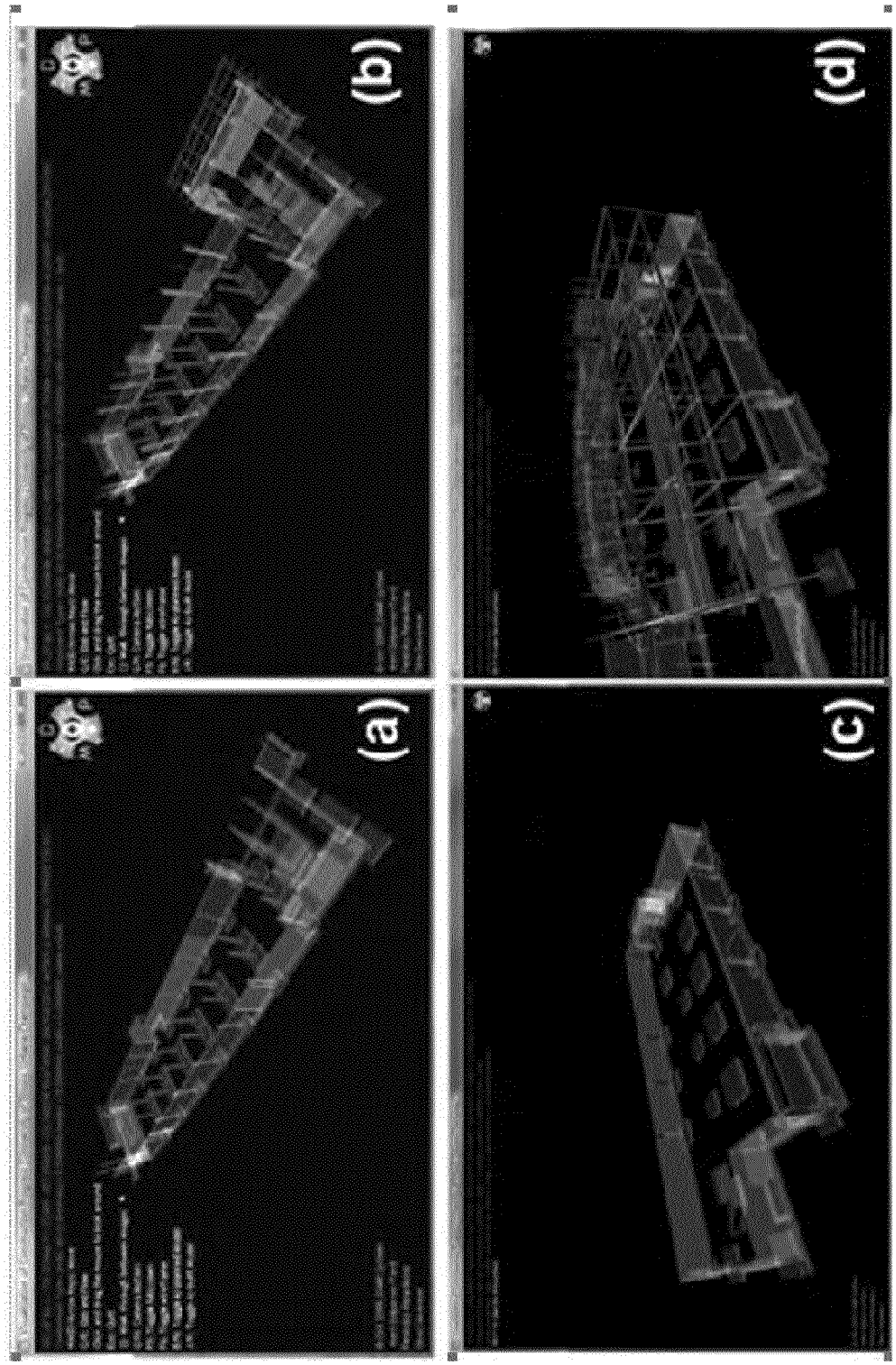
FIG. 26 is a series of images illustrating the 4D models visualized in the D$^4$AR environment, where the interactive user interface allows the schedule to be reviewed over a revision period and information be queried from the as-planned model of the (a), (b) RH project; and the (c), (d) SD project.

In conducted case studies, a third-level schedule (contractor-level) was used for the 4D model. For example, for placing basement foundation walls and piers, there was only one activity indicated in the schedule: "FRPS Basement Walls and Piers." Therefore, only the finished basement walls were visualized in the 4D model and operational details for placing the wall were not included. The 3D model for the project was modeled using a commercially-available architecture and structural software and an IFC 2×3 file was exported. To visualize the 4D model, the system may be extended to parse and visualize IFC-based models in the $D^4AR$ viewer 2070. FIG. 26 shows four snapshots of the 4D models generated for the RH project (FIGS. 26(a) and 26(b)) and the SD project (FIGS. 26(c) and (d)). Choosing the IFC file format may allow quantities and geometrical information of the as-planned model to be easily extracted and earned physical progress to be compared with the planned values.

Registration of As-Built and IFC-Based As-Planned Models Module

The final step of the $D^4AR$ model may be the global location estimation process, which is to align the reconstructed scene with the as-planned model to determine the absolute geocentric coordinates of each camera. The SfM procedure may estimate relative camera locations. In addition, the point cloud model may result in a significantly large number of points that do not belong to the building model itself, e.g., may belong to the façade of surrounding buildings, machinery, or even people and plants on or around the site. Further, the vertices extracted from the as-planned model may also be very sparse and they may not be good representatives as the progress of the as-planned model is not known at this stage. Users are therefore allowed to select a set of corresponding control points from the integrated as-built point cloud model and image-based model and have those associated with the as-planned model. These points may be surveying control points or a set of points that represent the geospatial location of the site. In this case, these points are mostly chosen from corners of the foundation walls and columns as their interactive detection and correspondence was visually easier.

Although the as-built scene visualization can work with relative coordinates, for geo-registration of the as-built scene with as-planned model, the absolute coordinates of the as-built scene may be required. The estimated camera locations are related to the absolute locations by a global translation, rotation, and uniform scale transformation. Therefore, three points known in both coordinate systems will be theoretically sufficient as they provide nine constraints (three coordinates each), more than enough to permit determination of these seven unknowns. However, in practice, these measurements are not exact and if more than three points are used, greater accuracy can be sought. By adding additional points, therefore, finding the exact mapping of point coordinates from one system into another is approximated with minimization of the sum of squares of residual errors. Let there be n points from as-planned and as-built model for registration. The two coordinate system points are denoted by $\{r_{b,i}\}$ and $\{r_{p,i}\}$, respectively, where i is the number of corresponding points that ranges from 1 to n, $r_{b,i}$ and $r_{p,i}$ are the Cartesian coordinates of the as-planned and as-built models, respectively. The following transformation may be formed:

$$r_b = sR(r_p) + T \quad (16)$$

where s is a uniform scale factor, T is the translational offset and $R(r_p)$ is the rotated version of the planned model. Minimization of the sum of square errors of such registration can be formulated as:

$$\Sigma_1^n \|e_i\|^2 = \Sigma_1^n \|r_{i,b} - sR(r_{i,p}) - T\|^2 \quad (17)$$

To get a closed-form solution to the least square problem of absolute orientation, the Unit Quaternions approach suggested in Horn (1987) may be used. The error ($\Delta e$) may be measured in millimeters (mm):

$$\Delta e_{mm} = \frac{\overline{w}_{pixels} \times \overline{f}_{mm}}{\overline{w}_{CCD, width}} \quad (18)$$

where $\overline{f}_{mm}$ is the focal length in mm, $\overline{w}_{pixels}$ is the image width in pixels and finally $\overline{w}_{CCD,width}$ is the CCD (Charge-Coupled Device) width of the camera in mm. In the developed system, this process only needs to be done once for a project, since eventually as more photographs are taken, the new point cloud models generated may be automatically matched with the initial reconstruction and nothing will be changed within the 4D IFC model.

Figure 27:
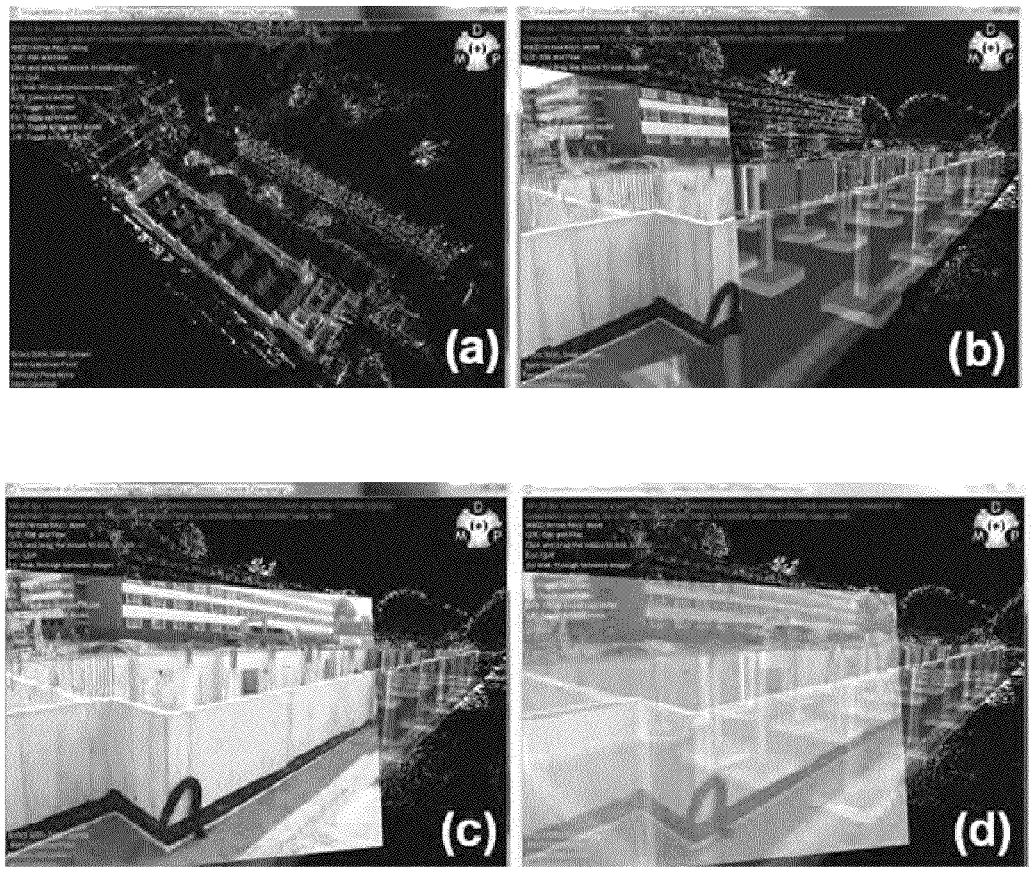
FIG. 27 is a series of images showing: (a) registration of the 3D IFC model over an as-built point cloud model; (b) the D$^4$AR model generated for the RH project from an image point-of-view while the user has interactively yawed the viewing camera to the left; (c) another example of registration; (d) The same images as (c) is semi-transparent allowing a see-through of the construction site to be observed
Figure 28:
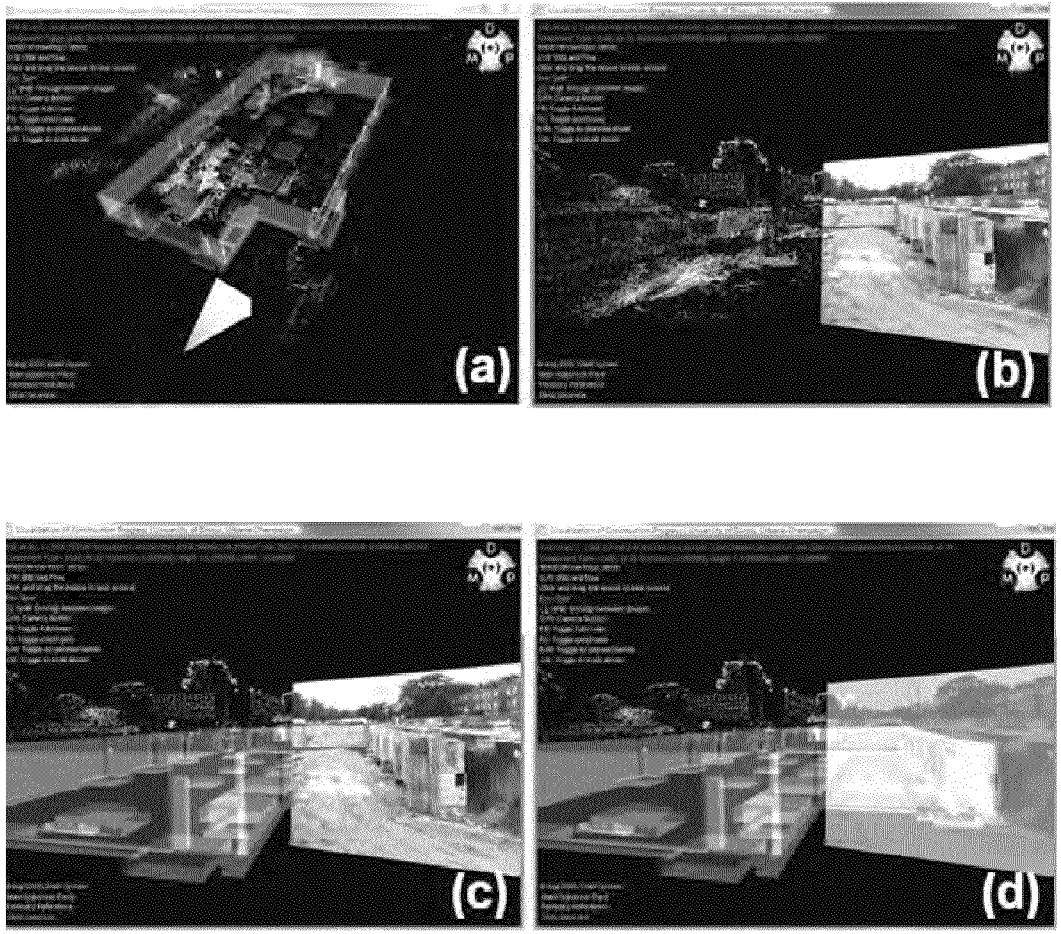
FIG. 28 is a series of images showing: (a) registration of the 3D IFC model over as-built pointcloud; (b) the D$^4$AR model generated for SD project from an image point-of-view while the user has interactively dragged the image to the left; and, while the scene is preserved, the accuracy of registration of 3D, pointcloud and image is illustrated; (c) another example of registration; (d) the same images as in (c) is semi-transparent, allowing a see-through of the construction site to be observed.

FIGS. 27 and 28 illustrate registration of the RH and SD 4D models over a point cloud model generated from 160 and 288 photos collected on Aug. 27, 2008 and Jul. 7, 2008. In both of these figures, from left to right, registration of the as-planned model over a point cloud model may be visualized while registration from two cameras' perspectives as well as a semi-transparent, see-through visualization of the integrated system may be subsequently represented. While the scene of FIG. 27 is preserved, the accuracy of registration of 3D, point cloud and image is illustrated.

Performance Metrics, Factors and Constraints

Overall, technical performance of the D⁴AR system may be based on a generality of images, e.g., relevant reconstruction images divided by total daily construction images. For reconstruction, the accuracy of the reconstruction scene may be expressed as a function of the conditions under which the images are captured. Performance may further be based on the density of the point cloud model, e.g., using low-resolution images and accuracy in registration of the 4D IFC model over the point cloud model. Based on these metrics, a series of validating case studies may be formed. Before such details are presented, implementation tools and architecture of the proposed system may be discussed.

Implementation Tools and Architecture of the D⁴AR System

A number of software packages and libraries were utilized for the development of a prototype that implemented the D⁴AR system. Microsoft Visual C++ .Net along with DirectX 9.0 graphics library were used for coding all aspects of the visualization component, and MATLAB and Visual C++ were used to implement various steps in reconstruction of the scene from the images. The original SIFT implementation of Lowe (2004) as well as Sparse Bundle Adjustment package of Lourakis and Argyros (2004) were used for implementation of the reconstruction steps.

The prototype's architecture may include three components. (1) The first step takes place when daily site images are entered to the system. The developed system analyzes each site image, reconstructs a point cloud model and registers all images automatically. Once a point cloud model is reconstructed, the reconstructed point cloud model may be geo-registered with the initial reconstruction through the ICP plus the scale algorithm. (2) For the purpose of visualizing the IFC as-planned model, IFCEngine.dll (TNO Building and Construction 2008) may be used to parse the IFC file. A series of additional components are designed to allow as-planned and schedule information to be queried, ultimately providing a comprehensive as-planned model which can serve as a rich baseline for monitoring. (3) Finally, the D⁴AR model may be generated and the 4D as-built point cloud model visualized as superimposed over the 4D IFC model.

Testing Process for Integrated Visualization

A series of experiments were conducted on different subsets of daily construction site photographs collected on Student Dining (SD) and Residence Hall (RH) projects by Turner Construction Company. In total, these subsets included photographs taken mostly by the construction management team for the purposes of documenting as-built projects in the traditional way. From these comprehensive visual dataset, 7 different subsets ranging from 52 to 288 images were assembled for the experiments.

Results and Validation

A summary of the conditions and accuracies under which D⁴AR models have been formed are presented in Table 5. This table presents detailed information on these images, conditions under which they were taken, as well as resolutions captured and resolutions used for experimentation. As observed, high generalities (percentage of successfully-registered image/used images) and reasonable densities are observed while computational times are practical.

TABLE 5

Experiments conducted for reconstruction of as-built point cloud models from site images.

| | RH #1⁺ | RH #2 | RH #3 | RH #4 | SD #1 | SD #2 | SD #3 |
|---|---|---|---|---|---|---|---|
| Photos taken (#) | 52 | 112 | 198 | 54 | 288 | 118 | 130 |
| Experimented Photos (#) | 52 | 112 | 160 | 54 | 288 | 118 | 130 |
| Lighting Condition | Sunny, Bright | Sunny, Bright | Sunny, 5 pm | Temporary lighting condition | Cloudy, rain runoff still on the side | Sunny, Bright | Sunny, Bright |
| Original Image Res. | 4354 × 2848 | 4354 × 2848 | 4354 × 2848 | 3872 × 2592 | 4354 × 2848 | 4354 × 2848 | 4354 × 2848 |
| Processed Image Res. | 2144 × 1424 | 1715 × 1139 | 2144 × 1424 | 2323 × 1555 | 2144 × 1424 | 2573 × 1709 | 2573 × 1709 |

TABLE 5-continued

Experiments conducted for reconstruction of as-built point cloud models from site images.

|  | RH #1[+] | RH #2 | RH #3 | RH #4 | SD #1 | SD #2 | SD #3 |
|---|---|---|---|---|---|---|---|
| # of points recovered | 22,261 | 43,400 | 62,323 | 1,293 | 61,638 | 31,661 | 15,100 |
| # of images registered | 52 | 112 | 160 | 22 | 286 | 118 | 123 |
| Generality[++] | 1.00 | 1.00 | 1.00 | 0.41 | 0.99 | 1.00 | 0.95 |
| Computation time[†] | 10 min | 1 hr 49 min | 2 hr 36 min | 10 min | 7 hr 17 min | 3 hr 20 min | 3 hr 57 min |

[+] RH: 4-story Concrete Residence Hall (RH) Project; SD: 2-story Student Dining (SD) Steel/Concrete Project
[++] total # of reconstructed images/total # of images used for experiments
[†] Computational cost benchmarked on Intel ® Core 2 Extreme CPU @ 2.93 GHz with 4.00 GB of RAM.

Table 6 presents accuracy of registration for the case illustrated in FIG. 25 as well as registrations shown in FIGS. 27 and 28. The approach shows high accuracy in registration, though it should be noted that this measurement is based on how the control points are selected (in this case it is assumed that the user correctly selected the points) and it does not count for the inherent registration inaccuracies between the SfM point cloud model and the images. Because usually more than the minimum number of control points (three) is selected, the selection error is minimized (the probability of incorrect selection of all correspondence points is very low).

TABLE 6

Registration error measured on reconstructions shown in FIG. 25.

| RH Project | Test Case # | | BIM + point cloud (9-a) | BIM + point cloud (9-b) | Point clouds (a) and (b) |
|---|---|---|---|---|---|
| | Image Size | | 2144 × 1424 | 1715 × 1139 | — |
| RH#2 | # of feature points | | 62,323 | 43,400 | |
| RH#3 | # of corresp. Points | | 7 | 7 | Randomly chosen by ICP |
| | $\Delta e_{mm}$ | | 0.20 mm | 0.65 mm | 0.43 mm |
| SD Project | Test Case # | | BIM + point cloud (9-e) | BIM + point cloud (9-f) | Point clouds (e) and (f) |
| | Image Size | | 2144 × 1424 | 2573 × 1709 | — |
| SD #1 | # of feature points | | 61,638 | 31,661 | |
| SD #2 | # of corresp. Points | | 9 | 9 | Randomly chosen by ICP |
| | $\Delta e_{mm}$ | | 0.73 mm | 0.69 mm | 0.70 mm |

Figure 29:
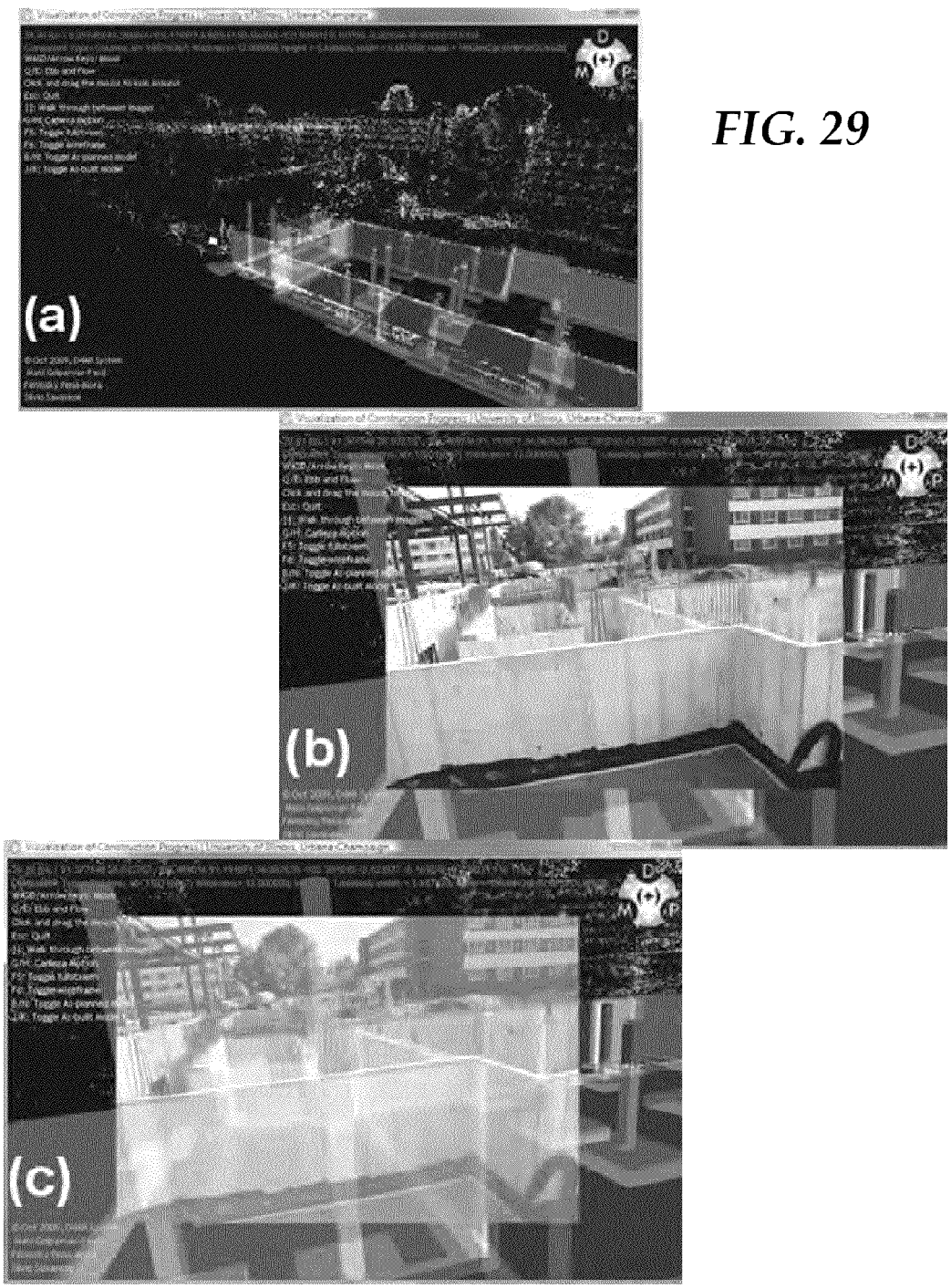
FIG. 29 is a series of images showing: (a) a concrete circular column manually colored with red as behind-schedule; (b) a column seen from a camera viewpoint while image is fully opaque; (c) same viewpoint as that of (b) while image is semi-transparently rendered allowing a see-through on the element.

FIG. 29 illustrates reasonable reconstructions that are generated from the dataset. These datasets contain images that show a wide-range view of the construction site as well as detailed images that are suitable for precise visual observations for quality control and safety. The interactive zooming technique implemented in the system allows these images to be thoroughly visualized in conjunction with the underlying 3D point cloud model as well as the 3D expected as-planned model.

Observed/Perceived Applications and Benefits of the D$^4$AR System

A motivation for developing the D$^4$AR system was to generate a system that geo-registers spatial as-built and as-planned models, allowing construction progress to be measured, analyzed and communicated. However, the availability of various perspectives of the planned model, as-built cloud and site imagery, and the preliminary observations on testing/utilizing D$^4$AR in RH and SD case studies implies a set of applications for the proposed system. Before discussing observed/perceived applications, it is worth noting that within the D$^4$AR system, new progress photographs can be instantly registered. First, the user can open a set of progress images, and position each image onto an approximate location on the as-planned model. After each image is added, the system estimates the location, orientation, and focal length of each new photo by running the SfM algorithm. In this case, first key points are extracted and matched to the key points of the cameras closest to the initial location; then, the existing 3D points corresponding to the matches are identified; and, finally, these matches are used to refine the pose of the new camera. This camera locating process by itself allows those areas that are not comprehensively photographed to be further photographed on-demand and be quickly added to the overall reconstructed scene. Below is a list of observed and perceived applications of the D$^4$AR system 2000.

Progress Monitoring and Revising Work Schedule (1) Remote Monitoring of as-Built Construction.

The as-built visualization system allows project managers, superintendents and other project participants to virtually walk on the construction site, as of the time the scene has been reconstructed and locate themselves in those positions that progress imagery has been taken. Such an interactive user walk-through allows progress to be perceived easily and quickly away from the hustle and bustle of the construction site activities. It also allows the as-built progress be compared with the as-planned 4D model, serving as a baseline for visualizing progress deviations. In this way, behind, on-schedule and ahead-of-schedule elements may be color-coded according to the color spectrum presented in (Golparvar-Fard et al. 2009a), best seen in FIG. 29 by shading (and by color in the original).

(2) Facilitating Schedule Revisions.

The underlying basis of the system that visualizes the 4D, as-planned model allows prompt look-ahead schedule updating. Based on observations of as-built progress, completed construction process and the conditions under which they were completed, as well as the way resources were allocated can be understood. Comparing the as-built observations with the 3D planned model, allows different alternatives to be studied over the 4D model. It further allows constructability analysis to be performed in presence of the as-built imagery and this may enable better decision-making during scheduled revisions by extending application of the 4D model.

Quality Assurance/Quality Control

One application of visualizing the as-built model using point cloud model along with imagery is to facilitate remote visual quality control. For example, in the case of the Student Dining project, the condition of finished surface of the wall is visualized through one of the geo-registered images. As shown in FIG. 30, this area of the wall has suffered from a poor vibration during placement of the concrete and further finishing needs to be conducted to provide the acceptable quality of the exposed architectural surface. Availability of the as-planned model as an underlying component allows specifications attached to the element to be extracted and used for quality control purposes. Providing an interactive zooming ability in this $D^4AR$ project allows participants to not only study the quality from a very close range, but also to carefully count for provisional factors. Such imagery can also serve as a proper contemporaneous record for an as-built project that could be useful for coordinating reworks especially under remote conditions.

Safety Management and Education

Another observed application of visualizing an as-built model using a corresponding point cloud model along with real-world imagery may be to facilitate offsite safety management and education. FIG. 30 also illustrates an example where rebar caps may need to be placed over wall reinforcement at the entrance of the jobsite. Such interactive zooming ability allows these cases to be remotely analyzed by safety inspectors and can potentially lessen frequency of on-site safety inspections. It can also be used as an effective safety education tool if enough photographs during safety irregularities are taken and those scenes are reconstructed. Another safety example is FIG. 31(a) wherein the trench area is reconstructed. In this case, a safety inspector may remotely measure the depth of the backfill from the reconstructed point cloud model and registered image, and if is identified to be in excess of an unsafe depth, may report to the site to restrict access to the area with safety barriers.

Site Layout Management/Analysis of Construction Operation Alternatives

The ability to observe a visual of the as-built scene together with animations of expected construction (either operational details or logistics of temporary resource locations and temporary structures) allows construction operations and site layout to be studied remotely. Although 4D models or visualization of discrete event simulated operations by themselves may serve for such purposes, using imagery in conjunction with those models not only allows photorealistic scenes to be rendered and studied realistically, but also minimizes the time and effort needed to create those models, which consequently makes their application more attractive. Hence, it potentially increases usability of such analysis.

Remote Decision-Making and Contractor Coordination Meetings

Other observed benefits of the $D^4AR$ modeling system in implementation of the prototype for Student Dining and Residence Hall projects include:

(1) Minimizing the Time Required to Discuss the As-Built Scene.

Project managers and superintendents spent less time discussing or explaining progress. Rather, they spent more time on how a control decision could be made. Furthermore, a reconstructed as-built scene and geo-registered images allow workspace logistics, and even productivity of workforce and machinery to be remotely analyzed. Such an as-built system was especially beneficial in weekly contractor coordination meetings as the workspace was navigated through the virtual world and consequently more time was spent on decision-making tasks as opposed to describing and explaining the situation using traditional 2D representation tools. An observed example of application of as-built models for facilitating discussions is illustrated in FIG. 31(b). In this case, a section of the foundation (pointed to within the circle) was not formed by the concrete contractor. Consequently, such an augmented image was generated by the construction management team to highlight the foundation sections that needed to be placed. The expectation was that this issue can potentially be a source of conflict but this simple visualization considerably facilitated the discussion to the extent that concrete foreman commented that "I can clearly see it now."

(4) Significant Cut in Travel Time and Cost of Project Executives and Architects.

Project executives and architects can study the reconstructed scene and geo-registered images, instead of spending time and money in traveling to the jobsite. For example, Turner Construction project executives need to supervise several projects at the same time. Thus, they need to frequently travel to these jobsites, which might not be in close proximity to their main offices. Such remote interactive tool becomes very effective as it allows them to stay in their offices, remotely walk through the site, and perform an overall visual supervision. It can also make such supervisory walk-through more frequent and keep the project on schedule. The reconstructed scene with as-built progress imagery can be even more beneficial, when the possibility of quickly adding new photographs to the system is considered. Even if a perspective of interest is not registered within the reconstructed scene and is not present in geo-registered image dataset, the user (i.e., owner, project executive, or the architect) can request the specific scene of interest to be photographed. Those photographs can be quickly and automatically geo-registered within the scene, significantly facilitating progress in communication and taking needed actions or corrections.

Integrated visualization of as-built and as-planned construction may enhance identification, processing and communication of progress discrepancies and may serve as a powerful remote project management tool allowing all sorts of on-site observations (quality control, safety management, site layout management) to be performed remotely. To that end, $D^4AR$ (4D Augmented Reality) models may be developed, and explored in detail herein includes the application of unsorted daily progress photograph collections available on any construction site as an easy and ready-to-use data collection technique.

Based on computing from the images themselves, photographer locations and orientations, along with a sparse 3D geometric representation of the as-built site makes possible use of daily (progress) photographs and superimposition of the reconstructed scene over as-planned 4D models. Within such an environment, progress photographs may be registered in the virtual as-planned environment, which allows a large, unstructured collection of daily construction images to be sorted, interactively browsed and explored. In addition, sparse reconstructed scenes may be superimposed over each other, generating 4D as-built models. Such 4D as-built models are in turn superimposed over 4D models, allowing site imagery to be geo-registered with the as-planned components. Such superimposition facilitates an all-integrated, sequential representation of construction to be generated; model-based computer vision recognition technique to be used and automatic extraction of progress/safety/quality data to be further explored. The $D^4AR$ may serve as a robust onsite and remote tool for contractor coordination and communication purposes. The preliminary results show observed and perceived benefits as well as future potential enhancement of this new technology in construction, in all fronts of remote onsite project management, automatic data collection, processing and communication.

Figure 32:
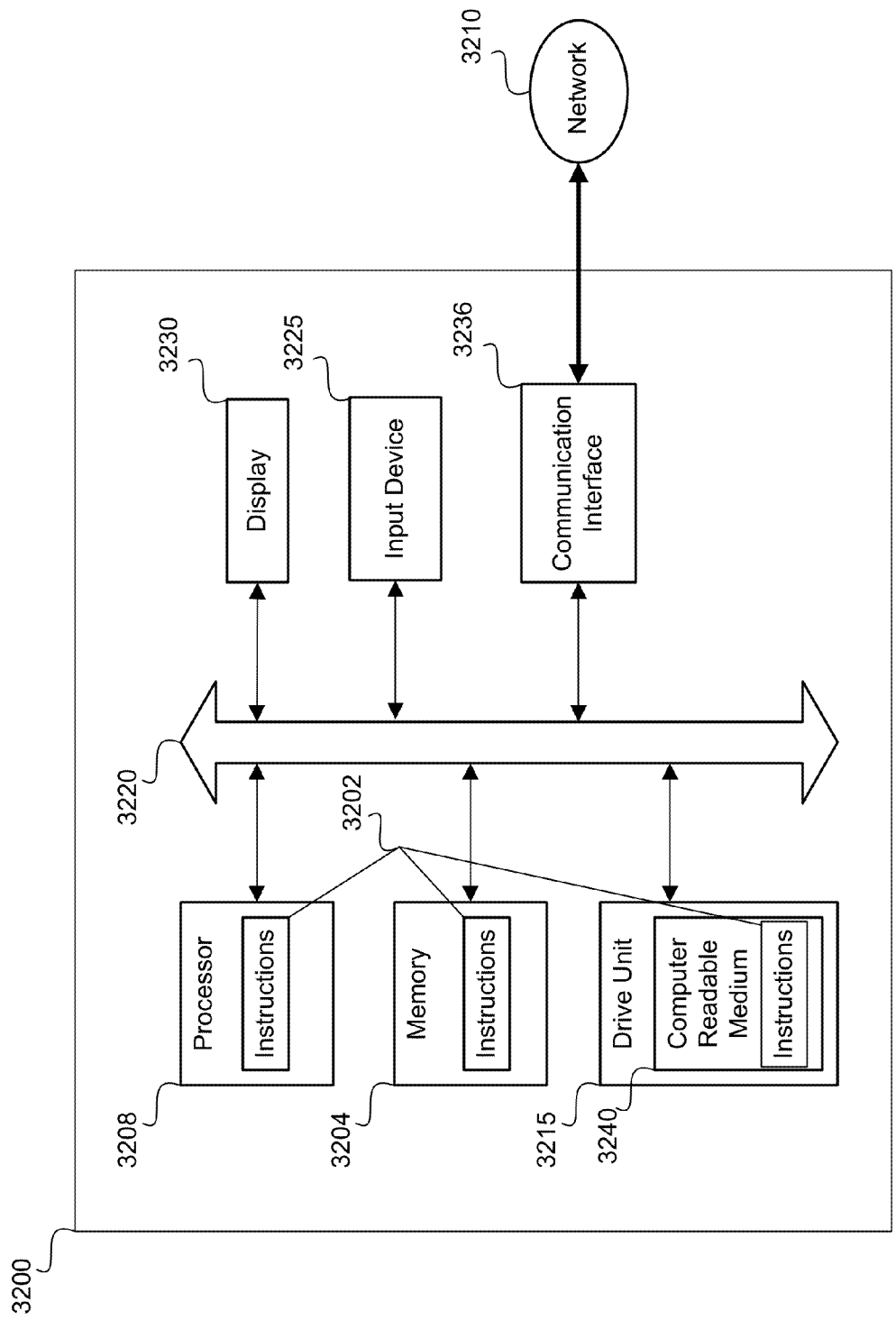
FIG. 32 illustrates a general computer system, which may represent any of the computing devices referenced herein.

FIG. 32 illustrates a general computer system 3200, which may represent the system 200 of FIG. 2 and/or the system 2000 of FIG. 20, or any other computing devices referenced herein. The computer system 3200 may include an ordered listing of a set of instructions 3202 that may be executed to cause the computer system 3200 to perform any one or more of the methods or computer-based functions disclosed herein. The computer system 3200 may operate as a stand-alone device or may be connected to other computer systems or peripheral devices, e.g., by using a network 3210.

In a networked deployment, the computer system 3200 may operate in the capacity of a server or as a client-user computer in a server-client user network environment, or as a peer computer system in a peer-to-peer (or distributed) network environment. The computer system 3200 may also be implemented as or incorporated into various devices, such as a personal computer or a mobile computing device capable of executing a set of instructions 3202 that specify actions to be taken by that machine, including and not limited to, accessing the interne or web through any form of browser. Further, each of the systems described may include any collection of subsystems that individually or jointly execute a set, or multiple sets, of instructions to perform one or more computer functions.

The computer system 3200 may include a memory 3204 on a bus 3220 for communicating information. Code operable to cause the computer system to perform any of the acts or operations described herein may be stored in the memory 3204. The memory 3204 may be a random-access memory, read-only memory, programmable memory, hard disk drive or any other type of volatile or non-volatile memory or storage device.

The computer system 3200 may include a processor 3208, such as a central processing unit (CPU) and/or a graphics processing unit (GPU). The processor 3208 may include one or more general processors, digital signal processors, application specific integrated circuits, field programmable gate arrays, digital circuits, optical circuits, analog circuits, combinations thereof, or other now known or later-developed devices for analyzing and processing data. The processor 3208 may implement the set of instructions 3202 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 3200 may also include a disk or optical drive unit 3215. The disk drive unit 3215 may include a computer-readable medium 3240 in which one or more sets of instructions 3202, e.g., software, can be embedded. Further, the instructions 3202 may perform one or more of the operations as described herein. The instructions 3202 may reside completely, or at least partially, within the memory 3204 and/or within the processor 3208 during execution by the computer system 3200. Accordingly, the databases displayed and described above with reference to FIGS. 2 and 20 may be stored in the memory 3204 and/or the disk unit 3215.

The memory 3204 and the processor 3208 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 3200 may include an input device 3225, such as a keyboard or mouse, configured for a user to interact with any of the components of system 3200. It may further include a display 3230, such as a liquid crystal display (LCD), a cathode ray tube (CRT), or any other display suitable for conveying information. The display 3230 may act as an interface for the user to see the functioning of the processor 3208, or specifically as an interface with the software stored in the memory 3204 or the drive unit 3215.

The computer system 3200 may include a communication interface 3236 that enables communications via the communications network 3210. The network 3210 may include wired networks, wireless networks, or combinations thereof. The communication interface 3236 network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents, now presented or presented in a subsequent application claiming priority to this application.

The invention claimed is:
1. A computer system comprising:
at least one processor;
non-transitory computer readable storage medium storing
 an unordered group of images obtained from photo- graphs taken at a site and instructions that, when executed by the at least one processor, cause the at least one processor to:

access the unordered group of images in the storage;

meld together the unordered group of images to reconstruct dense three-dimensional (3D) and four-dimensional (4D) as-built point cloud models ("as-built models") comprising merged pixels from the unordered group of images accessed over time, where time is a fourth dimension added to the three dimensions of the site captured from the unordered group of images;

transform the 3D as-built model to a site coordinate system to be jointly visualized with a 3D as-planned building information model ("as-planned model");

Integrate the merged pixels of the as-built models with pixels of the as-planned model to generate an integrated scene; and apply a probabilistic model that traverses the integrated scene of the site and labels different areas of the integrated scene according to as-built occupancy and as-planned visibility, wherein to cause the at least one processor to apply a probabilistic model comprises to cause the at least one processor to:

assign each of a plurality of voxels a set of labels including as-built and as-planned labels based on application of the probabilistic model; and assign a state to respective voxels with as-built labels based on a consistent visibility from projections of respective voxels onto the unordered group of images, the consistent visibility being between the merged pixels of respective voxels and a plurality of camera locations of cameras that provide the unordered group of images;

where to assign the set of labels and the state to respective voxels is performed in an order of increasing distance from the plurality of camera locations.

2. The computer system of claim 1, where the states are selected from the group consisting of occupied; empty; and blocked; and where the group of images comprise low-resolution images that are widely distributed in the site.

3. The computer system of claim 1, wherein the instructions are further executable by the at least one processor to register the unordered group of images, which are geo-tagged, with the 4D as-built model and the 3D as-planned model of the site in an augmented reality environment, where resultant registrations are usable for mutual spatial and temporal comparisons.

4. The computer system of claim 1, wherein the instructions are further executable by the at least one processor to:

link a project schedule to the 3D as-planned model to generate a 4D as-planned model that, when visualized overlaid with the 4D as-built model, is viewable with the integrated scene to provide clash detection and schedule quality control during building; and track building progress based on an application of the unordered group of images to which is iteratively added on a daily basis, to update the 3D as-built model as compared to the 4D as-planned model.

5. The computer system of claim 4, wherein the instructions are further executable by the at least one processor to:

color code building progress deviations of elements of the 4D as-planned model when compared with elements of the updated 3D as-built model, comprising applying different colors to elements in the 3D as-planned and as-built models according to a status of as-built progress detected within the 4D as-built model.

6. The computer system of claim 5, wherein the instructions are further executable by the at least one processor to:

generate a confidence metric comprising a probability that the color applied to an element to indicate as-built progress is correct, to provide additional data for more precise progress monitoring reports.

7. A computer-implemented method comprising:

storing in a non-transitory computer-readable storage medium multiple, unordered images obtained from photographs taken at a site and instructions executable by at least one processor;

melding, using at least one processor, the multiple images to reconstruct dense three-dimensional (3D) and four-dimensional (4D) as-built point cloud models ("as built models") comprising merged pixels from the multiple images in 3D space of the site, where time is a fourth dimension added to the three dimensions of the site captured from the unordered group of images;

integrating the merged pixels of the as-built models with pixels of the as-planned model to generate an integrated scene;

transforming the 3D as-built model to a site coordinate system existing within a 3D as-planned building information model ("as-planned model");

applying, using at least one processor, a probabilistic model that traverses the integrated scene and labels different areas of the integrated scene according to as-built occupancy and as-planned visibility, comprising:

assigning each of a plurality of voxels a set of labels including as-built and as-planned labels based on application of the probabilistic model; and assigning a state to respective voxels with as-built labels based on a consistent visibility from projections of respective voxels onto the unordered group of images, the consistent visibility being between the merged pixels of respective voxels and a plurality of camera locations of cameras that provide the unordered group of images;

where assigning the set of labels and the state to respective voxels is performed in an order of increasing distance from the plurality of camera locations.

8. The method of claim 7, where the states are selected from the group consisting of occupied, empty, and blocked, the method further comprising tracking temporal progress of the 3D as-built model as updated with new images obtained from newly taken photographs over time.

9. The method of claim 7, further comprising:

linking a project schedule to the 3D as-planned model to generate a 4D as-planned model that, when visualized overlaid with the 4D as-built model, is viewable with the integrated scene to provide clash detection and schedule quality control during building; and tracking building progress based on comparing the 4D as-built model to the 4D as-planned model over the passage of time.

10. The method of claim 9, further comprising registering the multiple images, which are geo-tagged, with the 4D as-built and as-planned models of the site in an augmented reality environment, where resultant registrations are usable for mutual spatial and temporal comparisons.

11. The method of claim 9, further comprising color coding building progress deviations of elements of the 4D as-planned model when compared with elements of the updated 3D as-built model, comprising applying different colors to elements in the 3D as-planned and as-built models according to a status of as-built progress detected within the 4D as-built model.

12. The method of claim 11, further comprising generating a confidence metric comprising a probability that the color applied to an element to indicate as-built progress is correct, to provide additional data for more precise progress monitoring reports.

13. The method of claim 9, further comprising applying a Bayesian probabilistic model to the 4D as-planned and as-built models of the site to recognize progress deviations by comparing measurements of progress with dynamic thresholds learned through a support vector machine (SVM) classifier.

14. A non-transitory computer-readable storage medium comprising a set of instructions for configuring a construction progress monitoring system executable by a computing device having a processor and memory, the computer-readable medium comprising instructions to direct the processor to:
store in the memory multiple unordered images obtained from photographs taken at a site in response to user inputs requesting to store the photographs;
meld the multiple images together to reconstruct dense three-dimensional (3D) and four-dimensional (4D) as-built point cloud models ("as built-models") comprising merged pixels from the multiple images in 3D space of the site, where time is a fourth dimension added to the three dimensions of the site captured from the unordered group of images;
transform the 3D as-built model to a site coordinate system existing within a 3D as-planned building information model ("as-planned model");
integrate the merged pixels of the as-built models with pixels of the as-planned model to generate an integrated scene; and
apply a probabilistic model that traverses the integrated scene and labels different areas of the integrated scene according to as-built occupancy and as-planned visibility, wherein to cause the at least one processor to apply a probabilistic model comprises to cause the at least one processor to:
assign each of a plurality of voxels a set of labels including as-built and as-planned labels based on application of the probabilistic model;
assign a state to respective voxels with as-built labels based on a consistent visibility from projections of respective voxels onto the unordered group if images, the consistent visibility being between the merged pixels of respective voxels and a plurality of camera locations of cameras that provide the unordered group of images;
where to assign the set of labels and the state to respective voxels is performed in an order of increasing distance from the plurality of camera locations.

15. The non-transitory computer-readable storage medium of claim 14, where the states are selected from the group consisting of occupied; empty; and
blocked, further comprising a set of instructions to direct the processor to track temporal progress of the 3D as-built model as updated with new images obtained from newly taken photographs over time.

16. The non-transitory computer-readable storage medium of claim 14, further comprising a set of instructions to direct the processor to:
link a project schedule to the 3D as-planned model to generate a 4D as-planned model that, when visualized overlaid with the 4D as-built model, is viewable with the integrated scene to provide clash detection and schedule quality control during building; and
track building progress based on comparing the 4D as-built model to the 4D as-planned model over the passage of time.

17. The non-transitory computer-readable storage medium of claim 16, further comprising a set of instructions to direct the processor to register the multiple images, which are geo-tagged, with the 4D as-built and as-planned models of the site in an augmented reality environment, where resultant registrations are usable for mutual spatial and temporal comparisons.

18. The non-transitory computer-readable storage medium of claim 16, further comprising a set of instructions to direct the processor to:
color code building progress deviations of elements of the 4D as-planned model when compared with elements of the updated 3D as-built model, comprising applying different colors to elements in the 3D as-planned and as-built models according to a status of as-built progress detected within the 4D as-built model; and
generate a confidence metric comprising a probability that the color applied to an element to indicate as-built progress is correct, to provide additional data for more precise progress monitoring reports.

19. The non-transitory computer-readable storage medium of claim 16, further comprising a set of instructions to direct the processor to apply a Bayesian probabilistic model to the 4D as-planned and as-built models of the site to recognize progress deviations by comparing measurements of progress with dynamic thresholds learned through a support vector machine (SVM) classifier.

20. The computer system of claim 4, wherein the instructions, when executed by the at least one processor, further cause the computer system to:
apply a Bayesian probabilistic model to the 4D as-planned and as-built models of the site to recognize progress deviations by comparing measurements of progress with dynamic thresholds learned through a support vector machine (SVM) classifier.

21. The computer system of claim 4, where the instructions are further executable by the at least one processor to identify milestones with reference to the as-planned model in relation to: (i) dates by which the milestones are to be met; and (ii) progress of the 4D as-built model.

22. The computer system of claim 1, where the instructions are further executable by the at least one processor to execute a multi-view stereo algorithm over a Euclidean sparse 3D version of the as-built point could model and Euclidean camera parameters of the cameras, to generate the dense 3D as-built point cloud model.

23. The computer system of claim 1, where, to apply the probabilistic model, the instructions are further executable by the at least one processor to:
mark as occupied, in an order of increasing distance from the plurality of camera locations, voxels that have at least one corner inside an intelligent frame correction element;
project voxels marked as occupied onto the group of unordered images that observed the voxels marked as occupied; and
mark, with a one (1), pixels corresponding to the voxels marked as occupied on a marking board for the as-planned model.

* * * * *